United States Patent [19]

Kruse

[11] Patent Number: 5,012,667

[45] Date of Patent: May 7, 1991

[54] APPARATUS AND METHOD FOR CALIBRATING A MEASURING DEVICE

[75] Inventor: Richard M. Kruse, Wichita, Kans.

[73] Assignee: Great Plains Industries, Inc., Wichita, Kans.

[21] Appl. No.: 484,044

[22] Filed: Feb. 22, 1990

Related U.S. Application Data

[62] Division of Ser. No. 170,315, Mar. 18, 1988, Pat. No. 4,918,973.

[51] Int. Cl.⁵ ............................................. G01D 18/00
[52] U.S. Cl. .................................. 73/1 R; 364/571.04
[58] Field of Search ............... 73/1 R, 3; 364/571.01, 364/571.02, 571.03, 571.04, 571.05, 571.06, 571.07, 571.08

[56] References Cited

U.S. PATENT DOCUMENTS

| | | | |
|---|---|---|---|
| 4,200,933 | 4/1980 | Nickel et al. | 364/571.04 |
| 4,290,297 | 9/1981 | Anderson | 73/1 R |
| 4,293,916 | 10/1981 | Del Re et al. | 73/1 R X |
| 4,446,715 | 5/1984 | Bailey | 364/571.02 X |
| 4,649,494 | 3/1987 | Rosas | 364/571.05 X |
| 4,700,579 | 10/1987 | Hall | 73/861.78 |
| 4,720,992 | 1/1988 | Hormel | 364/571.04 X |
| 4,779,446 | 10/1988 | Rowland | 73/1 R |
| 4,845,649 | 7/1989 | Eckart et al. | 364/571.01 X |
| 4,847,794 | 7/1989 | Hruses | 364/571.04 |
| 4,870,863 | 10/1989 | Duncan et al. | 364/571.04 X |

Primary Examiner—Tom Noland
Attorney, Agent, or Firm—Bill D. McCarthy

[57] ABSTRACT

A calibration apparatus includes a microcomputer-based calibrator unit, functioning separately from a measuring device to be calibrated, and a coupling coil, through which calibration information generated by the calibrator unit is electromagnetically transmitted to the measuring device to which the coil is strapped or otherwise connected. This permits the measuring device to be calibrated without the measuring device being removed from the environment in which it is to make measurements. The methodology of the apparatus permits the measuring device to be calibrated either with standard calibration data, such as whereby the measuring device is calibrated to a factory standard calibration, or with variable calibration data, such as whereby a then-current calibration of the measuring device is "tweaked".

14 Claims, 10 Drawing Sheets

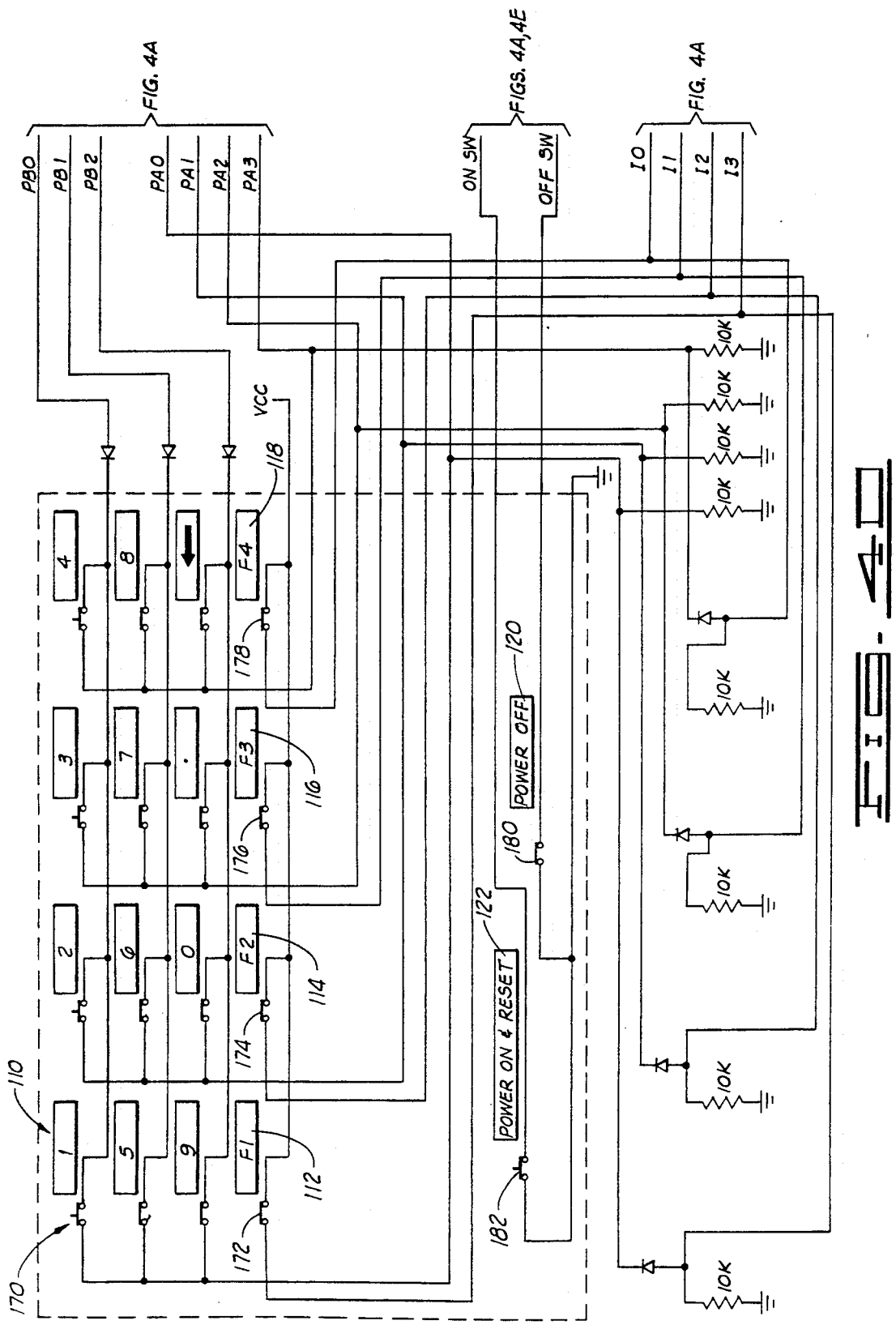

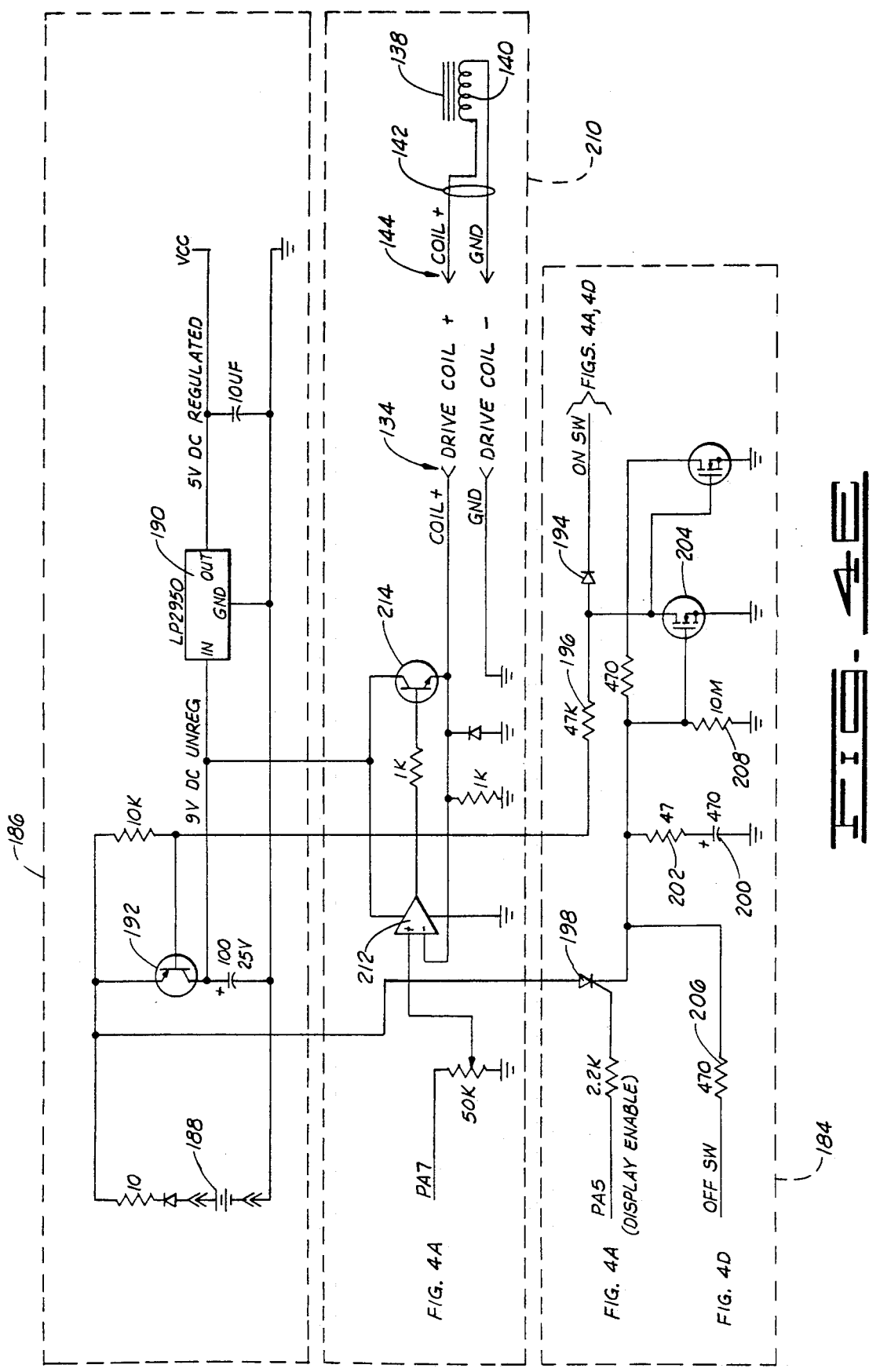

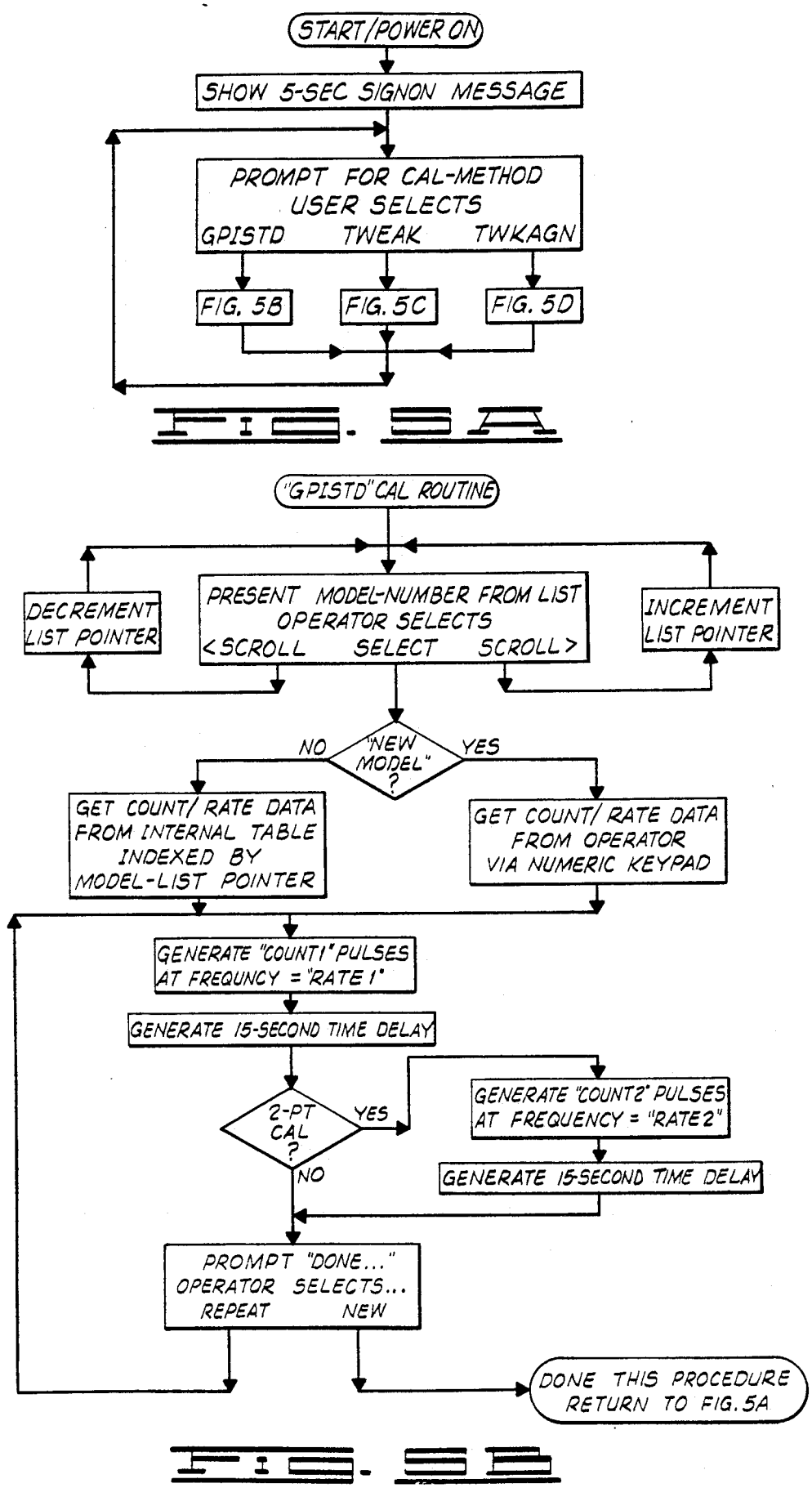

5,012,667

APPARATUS AND METHOD FOR CALIBRATING A MEASURING DEVICE

This is a divisional of copending application Ser. No. 0/170,315 filed on Mar. 18, 1988 and now U.S. Pat. No. 4,918,973.

BACKGROUND OF THE INVENTION

This invention relates generally to apparatus and methods for calibrating measuring devices and particularly, but not by way of limitation, to apparatus and methods for calibrating a flowmeter which includes a body and an electromagnetic member disposed in the body.

To measure a parameter with a measuring device, the parameter causes the measuring device to generate a measurement signal which is used to drive a display of the measuring device whereby the measure of the parameter is made known to an observer. By way of example, consider a fluid flowing through a pipe. The operator who is flowing the fluid commonly desires to measure how much of the fluid is flowing or has flowed. To make such a measurement, a flowmeter can be inserted in line with the pipe so that the flowing fluid impinges on a rotor of the flowmeter, thereby rotating the rotor and causing electrical pulses to be generated in a known manner within the flowmeter. Using an internal calibration factor, the flowmeter converts the number of pulses into the corresponding quantity of fluid and displays that quantity through the display.

As is readily apparent, the accuracy of the displayed value depends, at least in part, on the correctness of the calibration factor. The accuracy also depends on the stability of the electrical and mechanical operation of the flowmeter. Thus, if the electrical or mechanical operation changes, the calibration factor must also be changed to compensate for these other changes. Furthermore, for the specific example of a flowmeter, the correctness of the calibration factor can vary depending upon the type of fluid to be measured, or the plumbing configuration of the fluid circuit into which the flowmeter is connected, or the turbulence of the flow, or the presence of air in the fluid. Whatever the reason, however, it is apparent that to maintain an accurately operating measuring device, such as a flowmeter, one must be able to calibrate the device as needed. That is, one must be able to reset or adjust the calibration factor by which the measuring device correlates the measurement signal it generates to the actual parameter.

With respect to the example of a flowmeter, there is at least one type of flowmeter which can be internally calibrated by flowing a known quantity of fluid through the flowmeter. This type of calibration can, however, be an undesirable technique when, for example, the fluid is expensive or hazardous whereby one does not want to use the fluid merely for calibrating.

Again with respect to the example of a flowmeter, there is at least one type of flowmeter which has an ability to internally calibrate itself within certain preset data or controls contained in the flowmeter. Such preset data, however, do not encompass all the various changes to be calibration factor which a user of the flowmeter may wish to make. For example, the preset data may pertain only to a factory standard calibration which is optimum for only one type of fluid, whereas the flowmeter itself could be used to measure other types of fluids if the flowmeter could be optimally calibrated to such other types. Although such a flowmeter could be removed from the fluid circuit and rebuilt or reprogrammed or otherwise modified as needed to input the desired calibration factor, such removal may be impractical or otherwise undesirable for a specific application of the flowmeter (e.g., if the flowmeter has been permanently plumbed into the fluid circuit).

To overcome these specific exemplary shortcomings, there is the need for an apparatus and a method for calibrating such a flowmeter without having to create an actual flow of the fluid for which the calibration is to be made and without having to remove the flowmeter from the fluid circuit. It is comtemplated that other types of measuring devices can be calibrated by a comparable apparatus and method; therefore, more broadly, there is the need for an improved apparatus and method for calibrating measuring devices whereby the actual parameter to be measured need not be used and whereby the measuring device can be calibrated in situ (i.e., at the location where it is to do its measuring).

SUMMARY OF THE INVENTION

The present invention overcomes the above-noted and other shortcomings of the prior art by providing a novel and improved apparatus and method for calibrating a measuring device. This calibration occurs without the need of applying the actual parameter to be measured and without removing the measuring device from it measuring position. In a specific embodiment, the present invention can be used for calibrating a flowmeter without flowing a fluid through the meter during the calibration and while maintaining the flowmeter in situ within the fluid circuit.

The apparatus of the present invention broadly comprises: calibration signal generating means for generating, independently of the operation of the measuring device, a calibration signal; and communicating means for communicating the calibration signal to the measuring device without disassembling the measuring device.

With specific reference to calibrating a flowmeter which includes a body and an electromagnetic member disposed in the body, the apparatus of the present invention comprises: calibration means for providing a calibration signal characterized as electrical pulses; electromagnetic means, connected to the calibration means, for transmitting electromagnetic pulses in response to the electric pulses; and means for connecting the electromagnetic means to the body of the flowmeter so that the electromagnetic member of the flowmeter is responsive to the electromagnetic pulses.

The present invention also provides a method of calibrating a measuring device, which method comprises the steps of: generating, separately from the measuring device, a calibration signal; converting the calibration signal into electromagnetic energy; and coupling the electromagnetic energy to the measuring device.

Utilizing a calibration apparatus, which includes a calibration microcomputer having preset calibration data stored therein, a data entry means for entering data into the calibration microcomputer, and a coil connected to the calibration microcomputer, to calibrate a flowmeter connected into a line through which fluid can flow, which flowmeter includes a body and which flowmeter also includes the following disposed in the body: an electromagnetic member, a display, a flowmeter microcomputer connected to the electromagnetic member and the display, and control means for placing the flowmeter microcomputer in a calibration mode of operation, the present invention more specifically provides a method comprising the steps of: coupling the coil of the calibration appratus to the body of the flowmeter without removing the flowmeter from the line; operating the control means of the flowmeter to place the flowmeter microcomputer in the claibration mode; activating the calibration microcomputer; operating the data entry means of the calibration apparatus so that the calibration microcomputer generates a calibration signal; and transmitting the calibration signal through the coil of the calibration apparatus to the electromagnetic member of the flowmeter.

Therefore, from the foregoing, it is a general object of the present invention to provide a novel and improved apparatus and a novel and improved method for calibrating a measuring device. Other and further objects, features and advantages of the present invention will be readily apparent to those skilled in the art when the following description of the preferred embodiment is read in conjunction with the accompanying drawings.

BRIEF DESCRIPTION OF THE DRAWING

FIGS. 4A-4E are schematic circuit diagrams of electronic components of the calibrator apparatus shown in FIG. 3.

FIGS. 5A-5D are programming flow charts for operating the preferred embodiment calibrator apparatus depicted in FIGS. 3 and 4A-4E.

DETAILED DESCRIPTION OF THE PREFERRED EMBODIMENT

Figure 1:
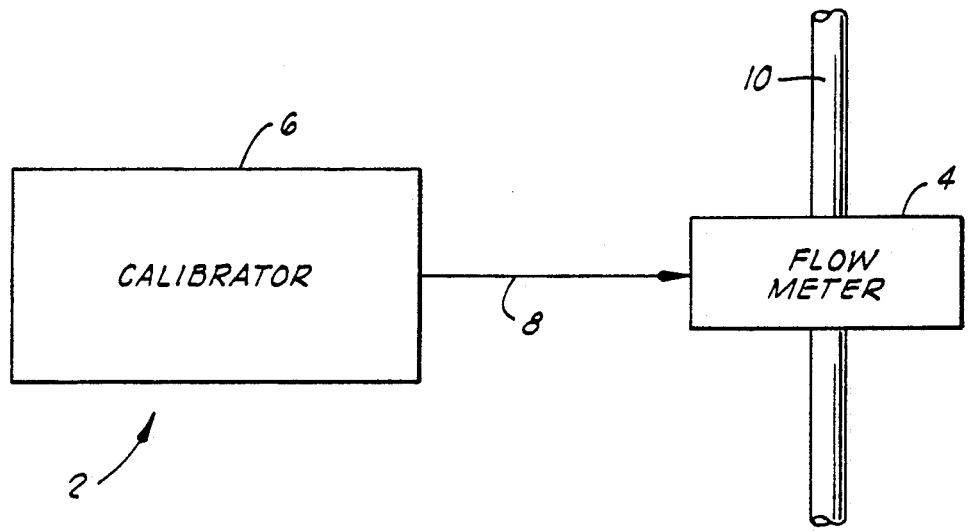
FIG. 1 is a block diagram of a calibrator apparatus for calibrating a flowmeter, which calibrator apparatus is constructed in accordance with the present invention.

The present invention generally provides an apparatus 2 for calibrating a measuring device which is specifically shown as a flowmeter 4 in FIG. 1. The apparatus 2 comprises a calibrator 6 providing means for generating a calibration signal, and the apparatus 2 also comprises communicating means 8 for communicating the calibration signal to the measuring device namely, the flowmeter 4 for the embodiment represented in FIG. 1. The calibrator 6 and the communicating means 8 are constructed and adapted so that they can be used with the flowmeter 4 without removing the flowmeter 4 from its in-line location or connection within a fluid circuit, a part of which is represented in FIG. 1 by a pipe or conduit 10. The apparatus 2 can also be used with the flowmeter 4 when the flowmeter 4 is not connected into a fluid circuit. Although the preferred embodiment of the calibrator 6 and the communicating means 8 will be described herein with reference to the flowmeter 4, it is contemplated that the present invention is applicable or adaptable to use with other types of measuring devices.

Figure 2:
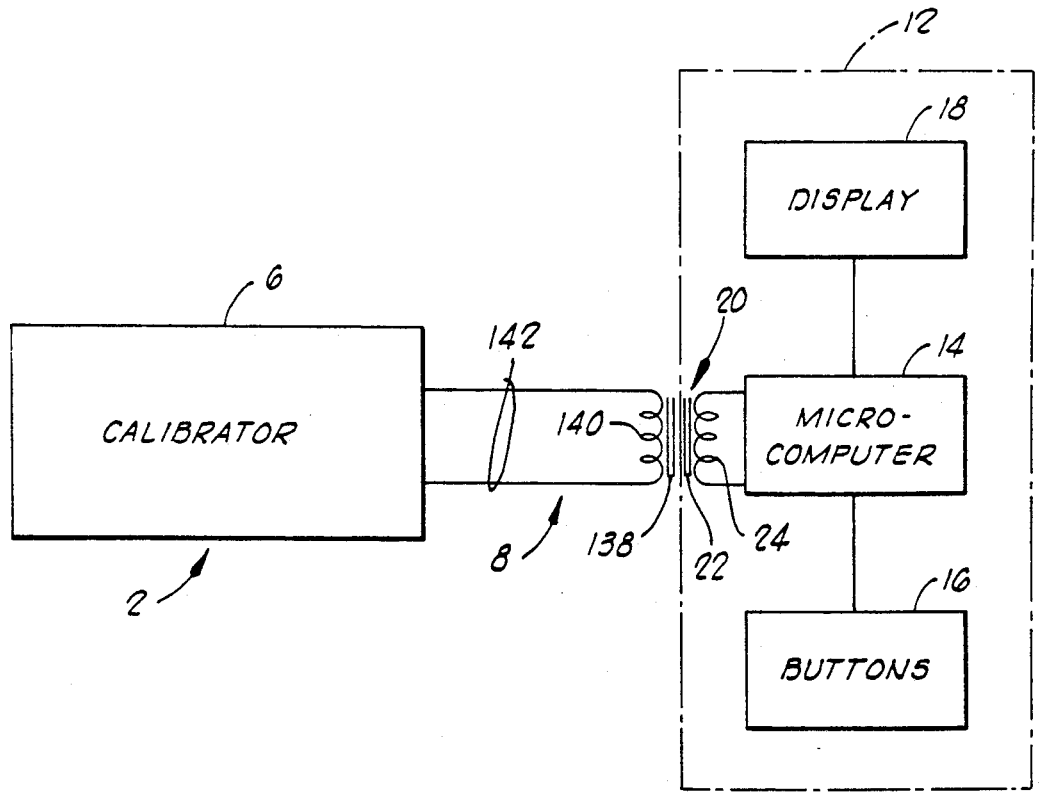
FIG. 2 is a block diagram showing certain components of a particular type of flowmeter with which the preferred embodiment calibrator apparatus of the present invention is adapted to be used.

In describing the preferred embodiment of the apparatus 2 with reference to its use with the flowmeter 4, this description is referenced to a particular type of flowmeter which includes, at least in part, components represented in FIG. 2. This particular type of flowmeter 4 includes a body 12 (see also FIG. 3) in which a microcomputer 14, control buttons 16, and a display 18 are disposed. The buttons 16 actuate switches (not shown) connected to the microcomputer 14 to control at least in part the operation of the flowmeter 4; included in this control is the ability to place the flowmeter 4 in a calibration mode of operation. The display 18 is connected to the microcomputer 14 so that the computed measurement of the measured parameter, for example, can be displayed through the display 18 by the microcomputer 14. The flowmeter 4 also includes an electromagnetic member 20, specifically a metallic core 22 and coil 24, which is connected to the microcomputer 14, as is also represented in FIG. 2. The electromagnetic member 20 generates electrical pulses, which are counted by the microcomputer 14, when a rotor carrying ferrous slugs (not shown) of the flowmeter is rotated relative to the member 20 in response to fluid flow through the conduit 10 and the flowmeter 4. An example of the type of flowmeter 4 just described in disclosed in U.S. Pat. No. 4,700,579 to Hall issued Oct. 20, 1987, and assigned to the assignee of the present invention, which patent is incorpoated herein by reference. Specific commercial models of flowmeters with which the preferred embodiment of the apparatus 2 can be used include calibratable models of the Electronic Digital Meters of Great Plains Industries, Inc. such as are described in the Great Plains Industries Product Bulletin No. 920614-1, which is also incorporated herein by reference.

Figure 3:
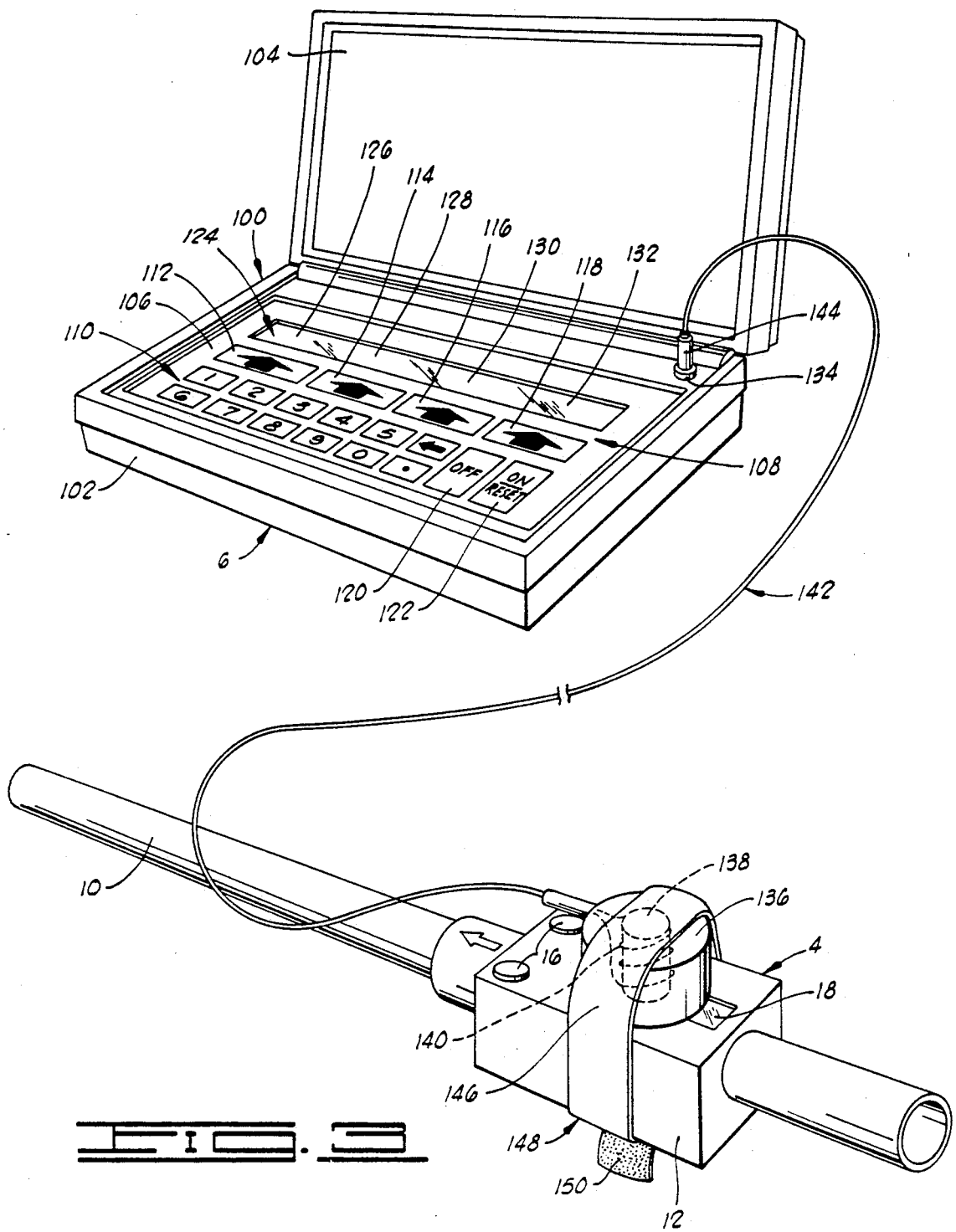
FIG. 3 is a perspective exterior view of the calibrator apparatus of the preferred embodiment of the present invention.

Referring to FIG. 3, the external appearance of the preferred embodiment of the apparatus 2, which includes both the calibrator 6 and the commencing means 8, will next be described.

The preferred embodiment of the calibrator 6 externally includes a portable housing 100 which is separate from the measuring device (i.e., the flowmeter 4 as illustrated). The housing 100 includes a rectangular receptacle portion 102 and a matching lid portion 104 hinged at its lower edge to the back edge of the receptacle portion 102. A faceplate 106 is mounted across the top of the receptacle portion 102. Mounted to or forming part of the faceplate 106 is a keypad 108 including keys 110 for digits 0 through 9, a decimal point (.), and cursor backspace (←). Also included are four function keys 112, 114, 116, 118. There are also an "OFF" key 120 and an "ON/RESET" key 122. All of these keys are associated with switches contained internally within a cavity of the receptacle portion 102 below the faceplate 106, which switches will be described hereinbelow with reference to the internal circuitry of the calibrator 6 shown in FIGS. 4A-4E.

In the preferred embodiment the keys are positioned as illustrated in FIG. 3; however, it is contemplated that other arrangements can be used. Of particular note, however, is that it is preferred that the four function keys 112, 114, 116, 118 be aligned and disposed adjacent a visual output display 124, which is also mounted in the faceplate 106, in the manner illustrated in FIG. 3. This positioning is of importance in the preferred embodiment because each of the function keys can have different functional significance as designated by different outputs which can be displayed through the display 124. That is, an output displayed through a portion 126 of the display 124 can be used to designate what function occurs when the function key 112 is pressed. Likewise, displays through areas 128, 130, 132 of the display 124 define the functions of the keys 114, 116, 118, respectively.

The external features of the calibrator 6 illustrated in FIG. 3 also include a connector jack 134.

For the embodiment shown in FIG. 3, the communicating means 8 includes a cylindrical container 136 made of a suitable material, such as plastic, which does not interfere with the transmission of the calibration signal as subsequently described. Retained within the container 136 is a metallic member 138, such as an iron core around which an electrical current conductive coil 140 is wound. The communicating means 8 also includes conductor means for connecting the coil 140 to the calibration means defined by the calibrator 6. In the preferred embodiment, the conductor means includes a pair of wires 142 (see also FIGS. 2 and 4E) connected to a plug 144 (which is insertable into the jack 134) so that the conductor 4136/core 138/coil 140 assembly can be extended from the calibrator 6 but remain connected thereto.

The communicating means 8 also includes means for connecting the container 136, with the core and coil assembly retained therein, to the body 12 of the flowmeter 4 so that the flowmeter 4 is responsive to the calibration signal transmitted through the core and coil within the container 136. In general, this connecting means is preferably of a type which allows the container 136 and its internal components to be connected to the measuring device so that the measuring device does not have to be disassembled, such as by being removed from the environment or position where it is to take measurements. That is, the connecting should be achieved so that the measuring device can be maintained in situ. In the preferred embodiment illustrated in FIG. 3, this connecting means includes a flexible strap 146 having two ends 148, 150. The container 136 is connected to the strap 146 intermediate the ends 148, 150 (i.e., any suitable location between the longitudinally spaced edges of the strap). The ends 148, 150 are adapted to be secured togehter after the strap 146 has been wrapped around the body 12 of the flowmeter 4 as shown in FIG. 3. A suitable conventional means of fastening or securing the ends includes a hook and pile fastener, such as of the type marketed under the mark VELCRO®. For the specific models of the Great Plains Industries Electronic Digital Meters with which the preferred embodiment of the present invention can be used as described herreinabove, the container 136 is strapped to the flowmeter so that the container 136 and its internal core and coil assembly are located on the face of such flowmeter where the control buttons 16 are located. This allows the flowmeter to be calibrated in-line with the pipe or conduit 10 as illustrated in FIGS. 1 and 3.

Internal components of the preferred embodiment calibrator 6 will next be described with reference to the schematic circuit diagrams shown in FIGS. 4A-4E.

Figure 4A:
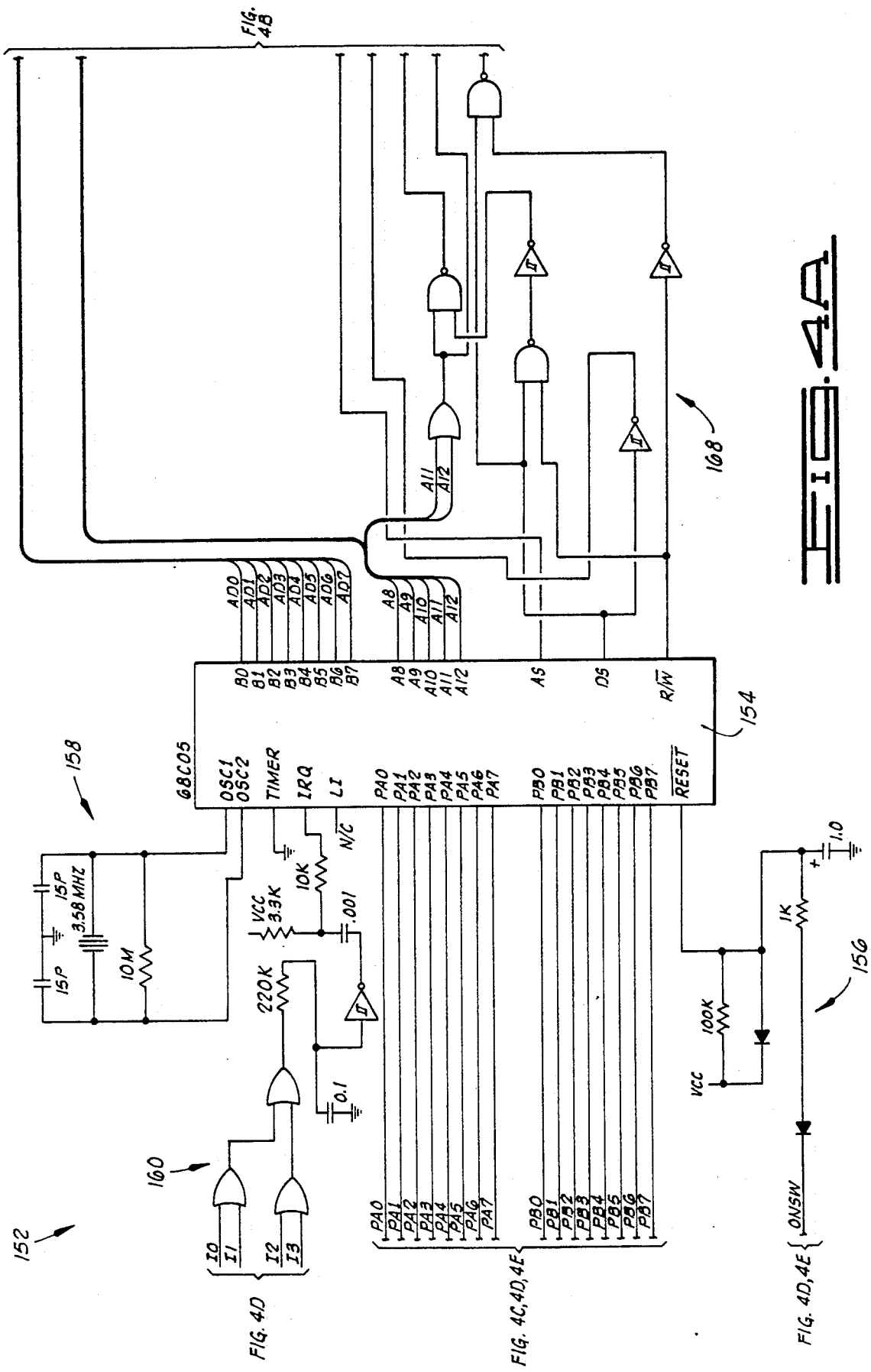
Figures 4A, 4B:
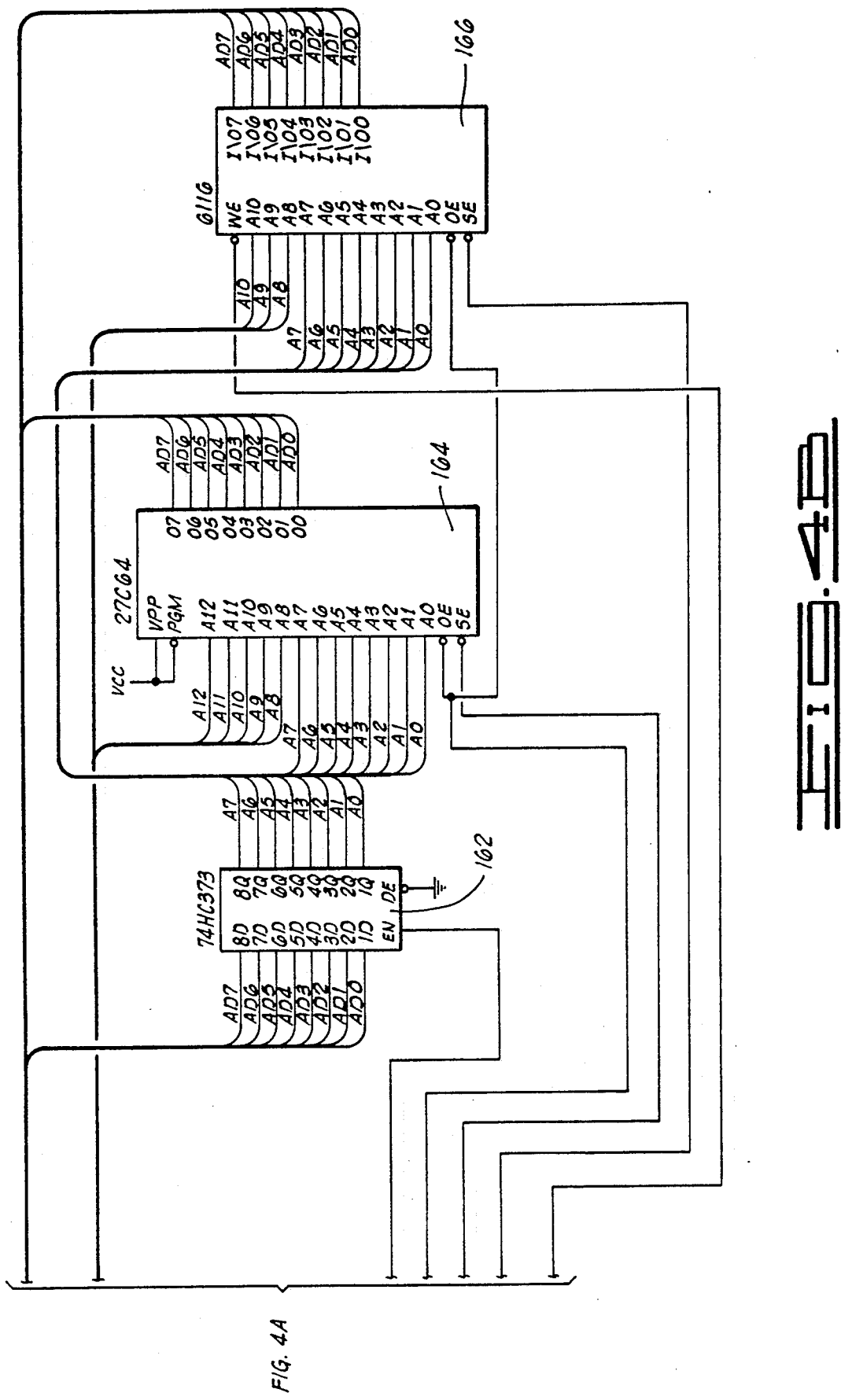

The internal components of the calibration means by which the calibration signal is generated include a microcomputer 152 having the circuitry illustrated in FIGS. 4A-4B. The microcomputer 152 includes a microprocessor 154 which is activated in response to the ON/RESET key 122 being pressed and which is reset, through a circuit 156 connected to the reset input of the microprocessor 154, each time the key 122 is pressed. The timing of the microprocessor 154 is controlled by an oscillator circuit 158. The microprocessor 154 responds to interrupt requests received through a circuit 160 from any of four interrupt signals 10-13 shown in FIG. 4D to be generated in response to pressing of any one of the four function keys 112-118.

Figure 4C:
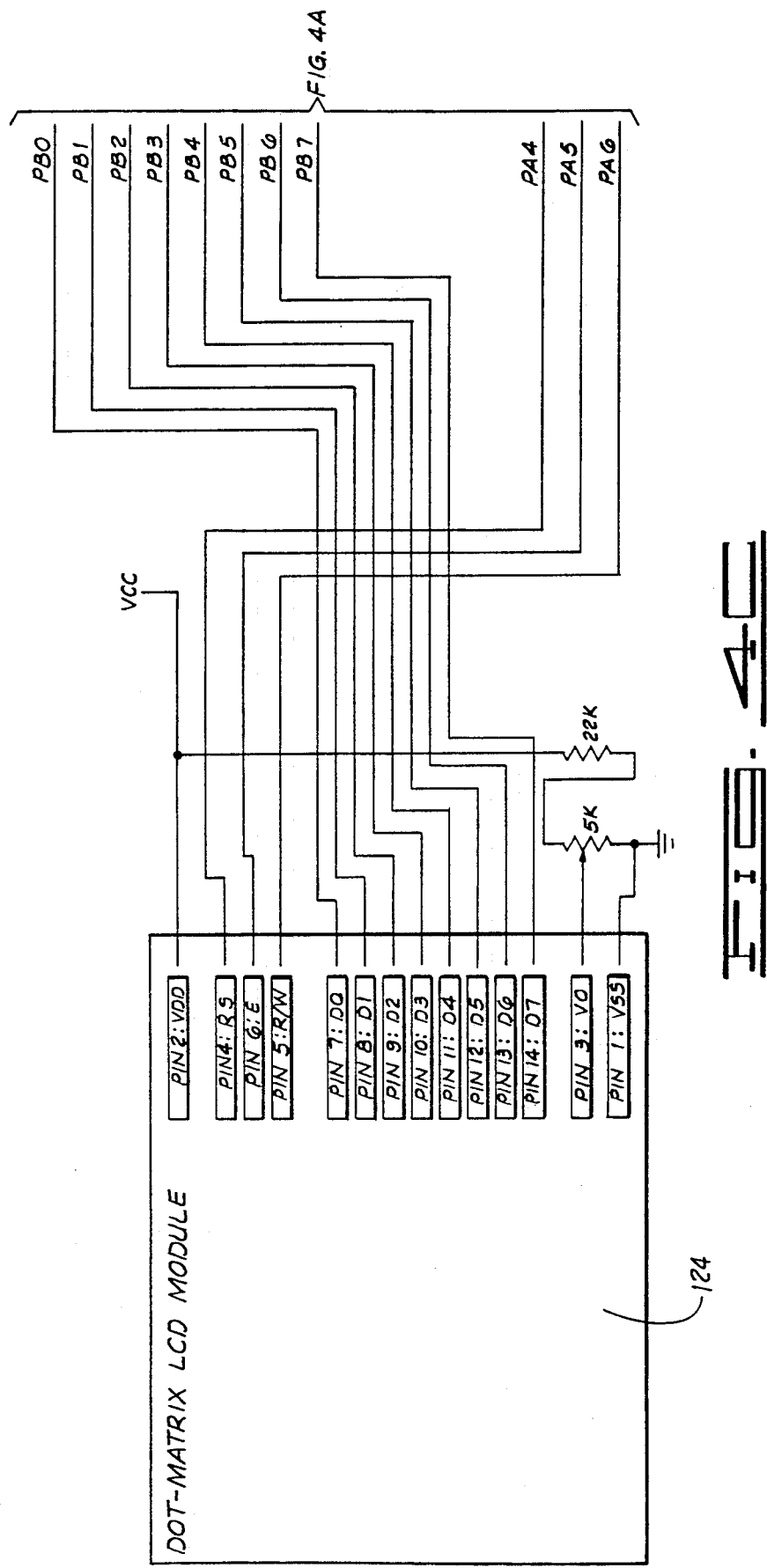

The microprocessor 154 has two 8-bit input-output ports PA0-PA7 and PB0-PB7 by which the microprocessor 154 communicates with the various other components to which these ports are connected as shown in FIGS. 4C-4E and subsequently described.

The microprocessor 154 includes an 8-bit address-/data port B0-B7 and additional address lines A8-A12. Through these terminals, the microprocessor 154 communicates with an address demultiplexer 162, and read only memory 164 and a random access memory 166 (FIG. 4B). The read only memory 164 contains the program of the microcomputer 152 which controls the operation of the microprocessor 154. A flow chart of the preferred embodiment of such program is set forth in FIGs. 5A-5D, which will be described subsequently. An example of a specific program implementing that shown in the flow chart is contained in the Appendix hereto; however, it is contemplated that any suitable type of program can be readily developed to operate the present invention consistent with its overall objectives and features described herein.

Forming another part of the microcomputer 152 illustrated in FIG. 4A is a logic circuit 168 providing chip enable or select signals to the chips 162, 164, 166, and a write enable signal to the random access memory 166.

The microcomputer 152 controls the operation of the display 124 which is observed through the faceplate 106 as shown in FIG. 3. The display 124 is also represented in FIG. 4C, where it is identified as a dot-matrix LCD module. A suitable specific type of such module is the Hitachi LM0185L two-line by forty-character display with integral controller, or its equivalent. As shown in FIG. 4C, the display 124 is controlled through the PB0-PB7 and PA4-PA6 lines of the input/output ports of the microprocessor 154.

The input/output ports of the microprocessor 154 are also used to interface the external keys 110-122 with the microprocessor 154. This interfacing is shown in FIG. 4D.

In FIG. 4D each of the keys 110 is shown associated with a respective one of a set of switches 170. When one of these keys is despressed, it closes the respective one of the switches 170. These switch closures are monitored by the microprocessor 154 through the PB0-PB2 and PA0-PA3 lines of the input/output ports as labeled in FIG. 4D.

As previously mentioned, the function keys 112-118 generate the interrupt signals 10-13. This occurs when one of the keys 112, 114, 116, 118 is pushed to close the associated respective switch 172, 174, 176, 178 shown in FIG. 4D.

As also shown in FIG. 4D, the OFF key 120 is associated with a switch 180, and the ON/RESET key 122 is associated with a switch 182. When the switch 180 is closed in response to pressing the OFF key 120, an "OFFSW" signal is provided to a power control circuit 184 shown in FIG. 4E and described subsequently hereinbelow. Pressing the ON/RESET key 122 closes the switch 182, thereby generating the labeled "ONSW" signal, which is provided both to the reset circuit 156 shown in FIG. 4A and to the power control circuit 184 shown in FIG. 4E.

The power control circuit 184 shown in FIG. 4E controls the operation of a power supply circuit 186 which provides electrical energy to the apparatus 2 (specifically, to the circuitry shown in FIGS. 4A-4E). The power supply circuit 186 includes a battery 188, a voltage regulator 190 and a power switching transistor 192 for switchably connecting the battery 188 to the voltage regulator 190 in response to the power control circuit 184. These elements are connected with the remaining conventional components as shown in FIG. 4E.

To turn the transistor 182 on, and thereby to connect the voltage from the battery 188 to the input of the voltage regulator 190, the switch 182 (FIG. 4D) is closed by pressing the ON/RESET key 122. This switch 182 closure provides the electrical ground ONSW signal to a diode 194 and a resistor 196 of the power control circuit 184 to pull the base of the transistor 192 low. When this power activation occurs, the microprocessor 154 generates a display enable signal through the PA5 input-output port line. This display enable signal is provided to the power control circuit 184 to turn on an SCR 198, which allows the voltage of the battery 188 to charge a capacitor 200 through a resistor 202. The charge maintained by the capacitor 200 turns a field effect transistor (FET) 204 on, which holds the junction between the diode 194 and the resistor 196 near electrical ground and thus maintains the transistor 192 in its power on condition.

To turn the power off, the OFF key 120 is pressed to close the switch 180, thereby generating the electrical ground OFFSW signal. This grounds one side of a resistor 206, the other side of which is connected to the resistor 202 as shown in FIG. 4E. This quickly discharges the capacitor 200 through the resistors 202, 206, thereby turning the FET 204 off, which in turn turns the transistor 192 off.

The power control circuit 184 also includes timer means, having a time period which expires if the time period is not restarted prior thereto, for automatically deactivating the power supply when the time period expires. In this preferred embodiment this timer means is implemented by the capacitor 200, the resistor 202 and a resistor 208. Once the capacitor 200 has been charged by the display enable signal received over the PA5 line, the capacitor 200 beings to discharge through the resistors 202, 208 (assuming the OFF switch 180 is not closed). The values of the components 200, 202, 208 are selected to achieve a desired discharge rate, which defines a desired time period before the power supply is turned off. At the end of this time period, the power supply is turned off because the capacitor 200 has sufficiently discharged through the resistors 202, 208 to lower the voltage applied to the gate terminal of the FET 204 sufficiently to switch the FET 204 off, thereby deactivating the power supply in the same manner as if the OFF switch 180 had been closed. In the preferred embodiment the timer means is continually reset each time there is a write to the display 124. That is, the capacitor 200 is recharged each time the display enable signal is generated by the microprocessor 154 and output over the PA5 line. Therefore, no automatic deactivation occurs in the preferred embodiment so long as the display enable signal is generated more frequently than the length of the time period set by the values of the capacitor 200 and the resistors 202, 208.

Also disclosed in FIG. 4E is a connector means 210 for connecting the microcomputer 152 to the conductor means of the communicating means 8 (namely, to the wires 142 and jack 144 as indicated in FIG. 4E). The connector means 210 of the preferred embodiment is a coil drive buffer. The buffer includes an amplifier 212 and a transistor 214 and the illustrated associated components. These elements are connected between the PA7 input/output port line, over which the calibration signal is transmitted from the microprocessor 154, and the jack 134 as shown in FIG. 4E.

Next, a general description of the method and operation of the apparatus 2 of the present invention will be given, following which a more detailed description will be given with reference to FIGS. 5A-5D.

The apparatus 2 generates, separately from the measuring device 4, a calibration signal. In the preferred embodiment the calibration signal is a series of electrical pulses which are generated within the calibrator 6 independently of the operation of the flowmeter 4, which exemplifies a particular type of measuring device. In general, the electricl pulses are generated within the computing means defined in the preferred embodiment by the microcomputer 152 disposed within the housing 100. The computing means performs its functions in response to data entered through the data entry means, which includes the various keys described hereinabove and shown in FIG. 3 for the preferred embodiment. The computing means also controls the display 124.

Within the microcomputer 152 of the preferred embodiment, there is contained preset calibration data stored within the read only memory 164, defining at least part of a data storage means. In one mode of operation, referred to herein as the standard calibration mode, the preset calibration data is used by the microcomputer 152 to compute and output the calibration signal; however, in an alternative mode of operation, referred to herein as the variable calibration mode, new calibration data entered through the keys depicted in FIG. 3 is used in computing and outputting the calibration signal. These modes of operation will be more particularly described hereinbelow with reference to FIGS. 5A-5D.

In the illustrated preferred embodiment, the microcomputer 152 also outputs text visually through the visual output display 124 to prompt an operator of the apparatus 2 to operate the various keys of the data entry means to achieve operation in one of the two aforementioned modes of operation. Part of the displayed output includes indicia designating specific functions to be selected upon actuation of the function keys 112-118. That is, at different times, text is output into one or more of the respective display regions 126, 128, 130, 132 to define the function to be performed upon actuation of the respective function keys 112, 114, 116, 118 located below the display 124.

The operation of the present invention also includes coverting the calibration signal into electromagnetic energy. In the preferred embodiment this conversion occurs in conducting the electrical pulses generated by the microcomputer 152 through the coil 140 so that the calibration signal is transmitted electromagnetically as electromagnetic pulses. Although the electromagnetic transmission of the preferred embodiment occurs by way of conducting pulses through a coil, this terminology is intended to encompass other forms of electromagnetic energy or radiation, such as light or photo-optical transmission or sound generated electromagnetically.

The method of the present invention also includes coupling the electromagnetic energy to the measuring device. In the preferred embodiment, this coupling is performed by connecting the container 136 and the electromagnetic means (including the core 138 and the coil 140) contained herein to the flowmeter 4 by means of the strap 146 as illustrated in FIG. 3. It is contemplated, however, that other types of coupling apparatus or techniques can likely be used.

To define more specifically the preferred embodiment of the aforemention method of the present invention, reference will next be made to FIGS. 5A-5D and to the use of the apparatus 2 with a specific type of flowmeter 4. This specific type of flowmeter 4 is any suitable model of Electronic Digital Meter of Great Plains Industries, referred to hereinabove. Each such flowmeter contains an internal microcomputer 14 (see FIG. 2) which is programmed so that when the microcomputer 14 is placed in the calibration mode, the number of pulses counted during a calibration sequence is internally set equal to five gallons of fluid. This is the only information needed by the flowmeter if it is one which has a linear response or uses a constant "k" factor (number of turbine revolutions per gallon of fluid) regardless of the flow rate of the fluid. This "one-point calibration" is usually adequate when a low viscosity fluid which does not significantly change the temperature is to be measured (e.g., gasoline or water). If a more viscous fluid is to be measured, for example, then a "two-point calibration" can be required. In this case, the microcomputer 14 of the exemplary flowmeter 4 sets a first count of pulses transmitted at a suitable low rate to five gallons and a second set of pulses transmitted at a suitably high rate also to five gallons, whereafter when actual flow is monitored, the appropriate calibration of a linear interpolation therefrom is used to calculate the actual flow. Both types of calibration have been previously, and are currently being, used internally within this type of flowmeter of Great Plains Industries when these flowmeters are being calibrated using actual fluid flow which creates actual turbine pulses from the turbine of the flowmeter 4 rotating in response to the flowing fluid.

Within this context, the preferred embodiment of the present invention operates in either a standard calibration mode or a variable calibration mode. The standard calibration mode is based on the specific model number of the flowmeter and preset or predetermined calibration information necessary to restore the flowmeters to factory calibration, which information is contained within the read only memory 164 of the calibrator 6. The variable calibration mode is used when a particular model number of the flowmeter to be calibrated is not contained within the read only memory 164 data. The variable calibration mode is also used when an existing calibration of a flowmeter is to be adjusted from its present setting to a new setting which is desired but which is different from the present data contained in the read only memory 164. For example, a flowmeter may be properly calibrated from a factory or standard calibration standpoint; however, when an actual known flow occurs, some error results such as due to fluid type or to mechanical or electrical changes in the flowmeter for which some small adjustment needs to be made. The details of these two modes of operation are shown in FIGS. 5A-5D.

As shown in FIG. 5A, when the ON/RESET key 122 is pressed, the apparatus 2 is energized and a five-second sign-on message appears. For example, there may be displayed a copyright notice, or information about the name of the program, or a warning to insure that some preliminary step or steps has or have been performed, such as strapping the container 136 to the body 12 of the flowmeter 4.

After the sign-on message has appeared, the method as shown in FIG. 5A then prompts the operator to select the desired calibration routine. In the preferred embodiment this is done by a suitable command displayed in the upper line of the two-line display 124 and by captioning the function keys 112, 114, 116 with the "GPISTD", "TWEAK" and "TWKAGAN" legends (see FIG. 5A) in the display spaces 126, 128, 130, respectively. The "GPISTD" legend designates the factory calibration set up by whomever has preset the apparatus 2 ("GPI" or Great Plains Industries, as the assignee of the present invention, is designated herein). The "TWEAK" and the "TWKSGN" legends designates two variable calibration mode routines within the preferred embodiment by which current calibrations of the flowmeters can be adjusted to calibrations other than the factory standards which are used within the "GPISTD" calibration routine. That is, these last two routines are used to slightly modify the flowmeter response, such as to compensate for measuring a fluid having a particular characteristic or effect on the flowmeter.

The "GPISTD" calibration routine is shown in FIG. 5B. When in this routine, the list model numbers stored in the read only memory 164 is displayed, one at a time, through the first line of the display 124. The second line of the display 124 is used to designate the function keys 112, 114, 116 a "SCROLL DOWN", "SELECT" and "SCROLL UP" functions, respectively. Using the SCROLL keys, the list of model numbers is incremented or decremented to the desired model number or to an entry referred to as "New model" indicates that the operator is going to calibrate a model of flow which is not contained within the preset list which has been loaded into the read only memory 164.

Once the model selection is made, the microcomputer 152 determines whether the selection has been for a new model. If not, the microcomputer 152 obtains the count/rate data from the internal table stored within the read only memory 164. If a new model is to be calibrated, the microcomputer 152 receives the count/rate data from the operator via the keys 110. This count/rate data can be made known to the operator such as by a chart updated to list new models and standard calibration data not contained or a two-point calibration is to be made is also entered via the keys 110. In the preferred embodiment, the count data for a particular model pertains to the number of the pulses which are to be transmitted to the flowmeter 4 to designate five gallons of fluid; the rate data pertains to the rate, or frequency, at which the pulses are to be transmitted to the flowmeter 4.

With the appropriate count/rate data, the microcomputer 152 generates the count of pulses which are to designate to the flowmeter 4 five gallons of fluid. This number of pulses is generated at a frequency equal to the rate associated with the count. These pulses are transmitted through the coil 140 to simulate the pulses which would otherwise be generated by the turbine of the flowmeter 4 if the calibration were being done by the "actual flow" prior art technique of calibration. It is to be noted that in the preferred embodiment, prior to generating the pulses, the microcomputer 152 prompts, through the display 124, the operator to place the flowmeter into its calibration mode (which, for a particular type of flowmeter, is accomplished by pressing both of the buttons 16 illustrated in FIG. 3).

Having generated and performed this initial calibration, the microcomputer 152 generates a fifteen second time delay to allow for an internal time delay of the exemplary type of flowmeter 4 referred to hereinabove. If necessary, the microcomputer 152 generates a second count of pulses at a second frequency if a two-point calibration is to be preformed. Whether a two-point calibration is to be performed within the "GPISTD" routine is determined either by what has been preset in the read only memory 164 to designate whether the known models of flowmeters require one-point or two-point calibration or by the information input by the operator for a new model of flowmeter to be calibrated.

During generation and transmission of the calibration pulses, a display, such as a disappearing string of asterisks, can be provided through the dispaly 124 to advise the operator about the durartion of this part of the calibration.

After the second calibration point pulses are sent and a fifteen-second time delay occurs, or if no two-point calibration is needed, the microcomputer 152 designates that the calibration has been done through a suitable prompt display in the first line of the display 124. The second line prompts either a "REPEAT" or "NEW" selection to either repeat the previous calibration or to return the calibrator 6 to the initial prompt-for-calibration-routine rountine step shown in FIG. 5A. A prompt to instruct the operator to return the flowmeter 4 to its normal operational mode can also be given.

Figure 5C:
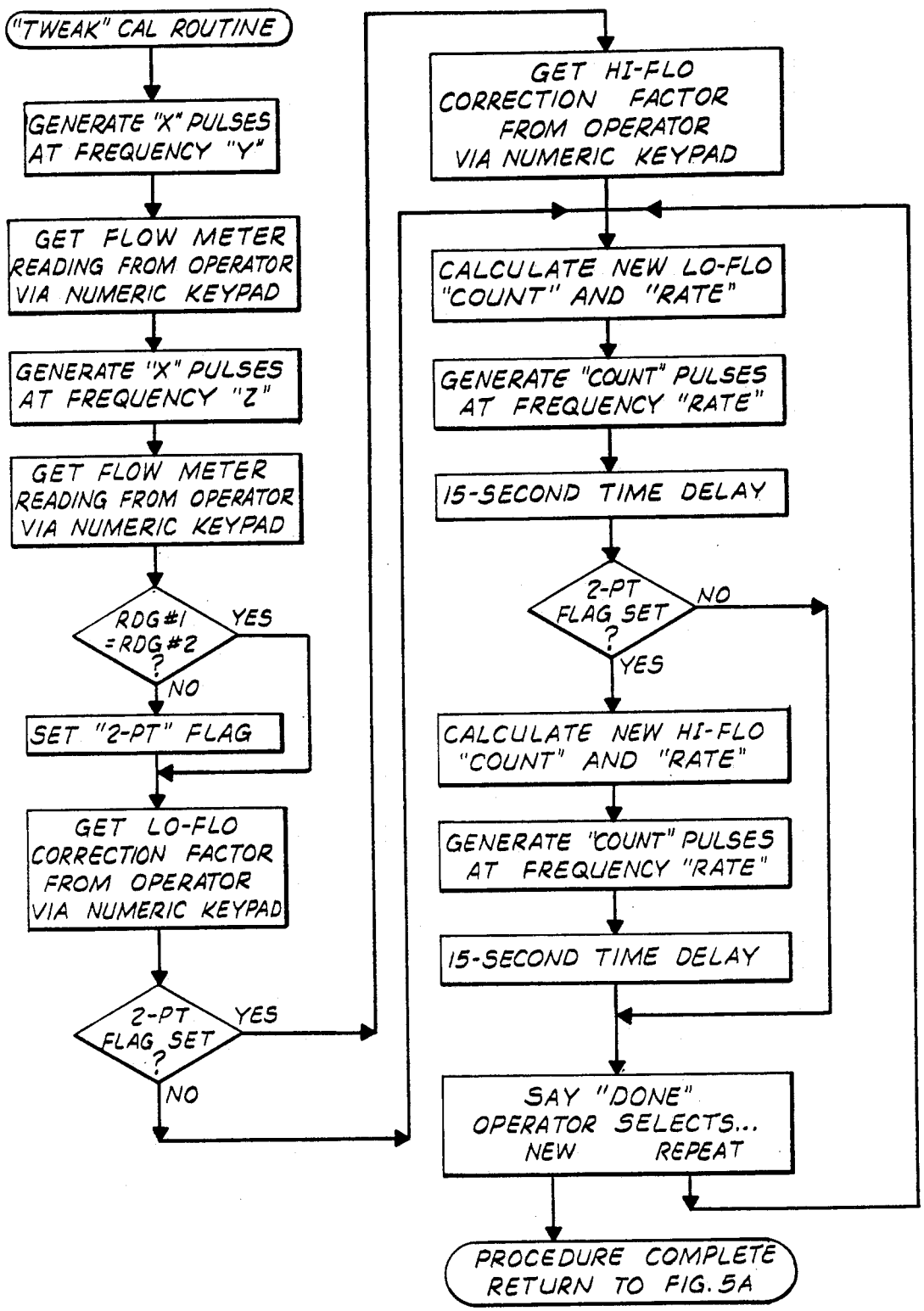

The TWEAK routine in FIG. 5C. To use the TWEAK routine, the operator knows that the flowmeter to be calibrated already has a calibration, and the operator also knows how much correction needs to be made to that calibration in order to give correct readings. This correction is input by the operator via the keys 110 of the calibrator 6. Before entering the correction, the apparatus 2 determines whether the flowmeter requires one-point or two-point calibration.

Following the steps shown in FIG. 5C, the microcomputer 152 generates a known number of pulses at a known first rate. This is done after the operator has been prompted to clear the total from the flowmeter 4. As the apparatus 2 is generating and inducing the known pulses at known pulses at the known first rate, the flowmeter is displaying an increasing count in its display 18.

After the pulses have been induced, the apparatus 2 prompts the operator to enter the displayed flowmeter reading. This is done by way of the keys 110 of the calibrator 6.

The microprocessor 152 prompts the operator to again clear the total from the flowmeter 4, which is again indicated to the microcomputer 152 by pressing one of the function keys 112-118 which gas been designated "OK". The microcomputer 152 then generates the same number of pulses but at a known second frequency. The flowmeter 4 again displays an increasing count through the display 18. The ultimate total is entered into the calibrator 6 by way of the keys 110.

The microcomputer 152 then compares the flowmeter readings which have been entered by the operator. If they are equal, the microcomputer knows that only a one-point calibration is needed, but if the two readings are unequal, the microcomputer 152 sets a "two-point" flag to designate that a two point calibration is needed.

The microcomputer 152 then prompts the operator to enter a low-flow correction factor. The correction factor in the preferred embodiment is the desired reading to be obtained from the flowmeter 4 divided by the actual reading which has been obtained when the known flow of fluid has been actually flowed through and measured by the flowmeter 4 prior to the present calibration routine. The correction factor will typically be a little smaller than, or a little greater than, unity. For example, the operator knows that prior to calibration, upon dispensing exactly ten gallons of fluid, the flowmeter 4 has displayed a reading of only 9.5 gallons. Thus, the correction factor is (10/9.5) or 1.0526 (in the preferred embodiment, the correction factor is internally rounded to three places to the right of the decimal point).

The microcomputer 152 next prompts the entry of the high flow correction factor if two-point calibration is to be performed. Once this has been done, or if only one-point calibration is to be performed, the microcomputer 152 then calculates the required count(s) and selects from two preset rates and generates the corresponding pulses at the respective rate or rates as specified in the remaining steps shown in FIG. 5C. This is, of course, performed after the operator has placed the flowmeter in its mode to receive the calibration, such as may be done in response to a prompt generated by the microcomputer 152 through the display 124.

In calculating the new counts, the microcomputer 152 has computed the current "k" factor at which the flowmeter is already calibrated. This computation is made from the known number of pulses that were generated to test for one-point calibration or two-point calibration and from the respective reading entered from the flowmeter. Using this current "k" factor and the respective entered correction factor, the microcomputer 152 computes the new, "k" factor. This gives a pulses-per-gallon number which is then multiplied by five to yield the count representing five gallons of fluid which the specific embodiment of the flowmeter needs for it to be calibrated.

Figure 5D:
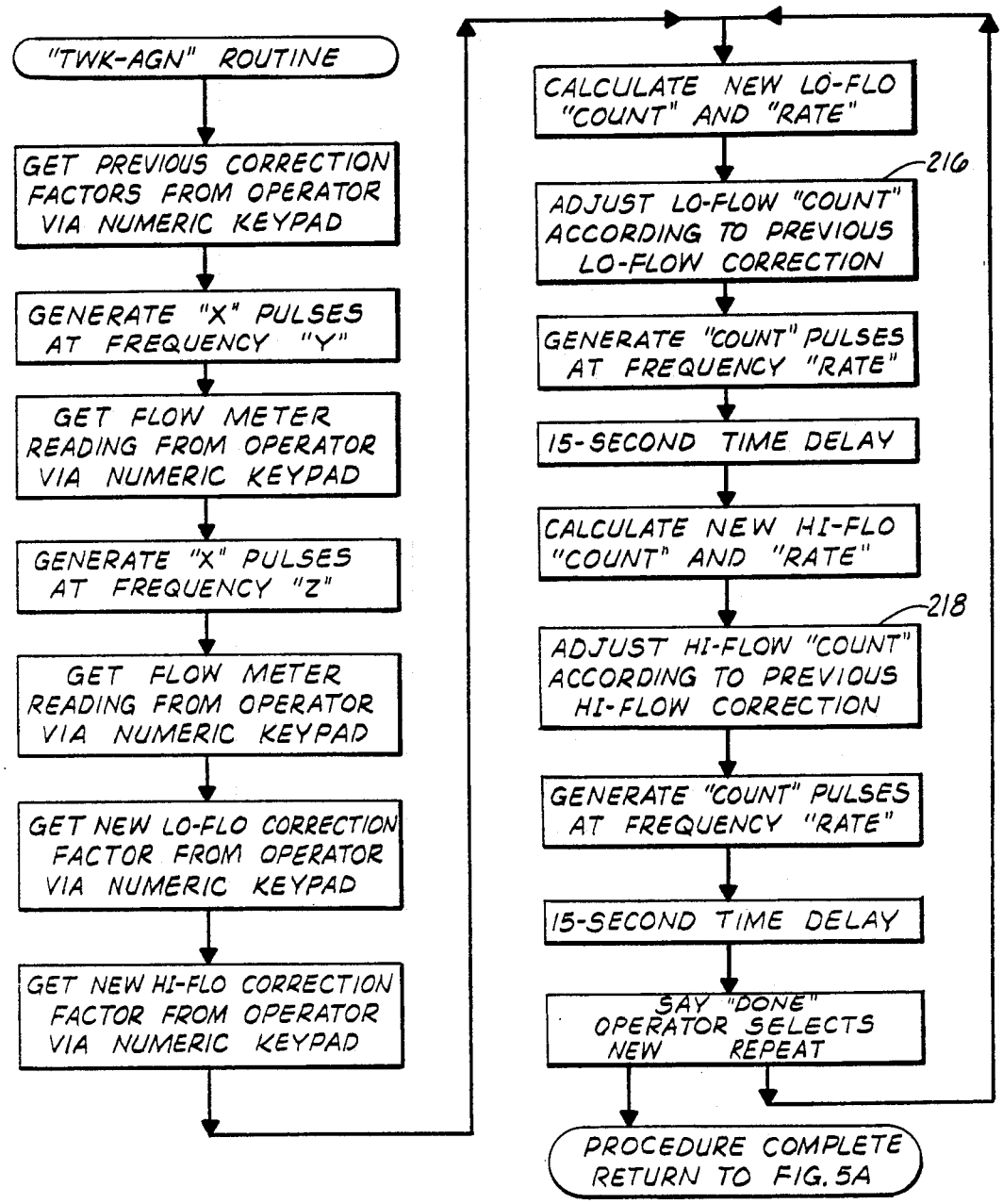

The tweak again ("TWKAGN") procedure is shown in FIG. 5D. This procedure is used only after the tweak procedure has been used. The purpose of the "tweak again" routine is to improve the accuracy of the new flowmeter calibration in fewer procedures than would likely be needed if the basic "TWEAK" routine shown in FIG. 5C were simply rerun enough times to obtain the desired accuracy. Thus, in the preferred embodiment, once the "TWEAK" routine of FIG. 5C has been run, further "tweaking" of that "tweak" is performed using the "TWKAGN" routine in FIG. 5D. The steps of the "TWKAGN" routine shown in FIG. 5D are believed to be self-explanatory in that they are identified as steps which are the same as comparable ones in the previous routines, except for the "ADJUST" steps (see FIG. 5D, reference numerals 216, 218).

In these two steps, namely adjusting the low flow count (#216) and the high flow count (#218), these adjustments are based on the previous corresponding corrections whereby the subsequent adjustments are more quickly focused to obtain the desired accuracy more quickly. More specifically, after the microcomputer 152 has calculated, in the manner described hereinabove, a new five-gallon pulse count as designated in the "TWKAGN" routine, it multiplies that new count by a factor inversely proportional to the difference between the previous correction factor and the new correction factor. Thus, the final, adjustment count can be significantly "increased" if the last tweak did not adjust far enough, or it can be significantly "decreased"

if the last tweak overshot the deisred reading, In the specific program set forth in the Appendix, the inversely proportional factor was experimentally or empirically chosen or derived from flow rate/readout/correction experiments or test to obtain a suitable rate of focusing or arriving at the desired accuracy.

The foregoing describes the preferred embodiment of the present invention; however, it is contemplated that the present invention can encompass other types of hardware and software and have ultility with other types of measuring devices. One specific contemplated modification with respect to further use with flowmeters is to permit calibration based upon fluid type. This calibration would be comparable to the "GPISTD" calibration except based upon fliud type rather than model type. Preset fluid type information would be stored in the read only memory 164, but new fluid type information could input through the keys 110. To implememt the latter, the operator would designate whether one-point or two-point calibration were needed (as in the GPSTD routine) and then the rate and count information would be entered such as taken from a fluid calibration table generated by the manufacturer of the apparatus 2.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. An apparatus for calibrating a measuring device, said apparatus comprising:
    calibration signal generating means for generating, independently of the operation of the measuring device, a calibration signal, the calibration signal generating means comprising:
        power supply means for providing electrical energy to said apparatus;
        switch for activating said power supply means; and
        timer means, having a time period which expires if the time period is not restarted prior thereto, for automatically deactivating said power supply means when said time period expires; and
    communicating means for communicating said calibration signal to the measuring device without disassembling the measuring device.

2. An apparatus as defined in claim 1, wherein:
    said calibration signal generating means includes:
        a microcomputer, including data storage means for storing predetermined calibration data; and
        data entry means for inputting new calibration data into said microcomputer and for instructing said microcomputer whether to use predetermined calibration data or new calibration data; and
    said microcomputer further includes means for computing and outputting said calibration signal in response to predetermined calibration data or new calibration data as instructed in response to said data entry means.

3. An apparatus as defined in claim 2, wherein said calibration signal generating means further includes a portable housing in which said microcomputer and said data entry means are disposed.

4. An apparatus as defined in claim 2, wherein:
    said calibration signal generating means further includes a visual output display connected to said microcomputer; and
    said microcomputer further includes means for outputting text visually through said visual output display to prompt an operator of said apparatus to operate said data entry means.

5. An apparatus as defined in claim 1, wherein said communicating means includes electromagnetic means for transmitting said calibration signal electromagnetically from said calibration signal generating means to the measuring device.

6. An apparatus as defined in claim 1, wherein:
    said calibration signal generating means includes:
        a microcomputer;
        a keypad connected to said microcomputer;
        a display connected to said microcomputer; and
        connector means for connecting said microcomputer to said communicating means; and
    said communicating means includes an electrical current conductive coil adapted for connecting to siad connector means.

7. An apparatus as defined in claim 6, wherein said calibration signal generating means further includes a portable housing, separate from the measuring from the measuring device, having said microcomputer, said keypad, said display and said connector means mounted therein.

8. An apparatus as defined in claim 1, wherein said calibration signal generating means includes:
    a display
    a function switch disposed adjavent said display; and
    means for outputting through said display adjacent said function switch one of a plurality of indicia designating a specific one of a plurality of functions to be selected upon actuation of said function switch.

9. An apparatus for calibrating a measuring device which is designed to have a preset calobration and which displays a measurement of a measured parameter in response to an existing calibration of the measuring device, said apparatus comprising:
    preset calibration means for generating a calibration signal to calibrate the measuring device to the preset calibration thereof;
    variable calibration means for genreating a calibration signal to calibrate the measuring device to a calibration both in response to a measurement by the measuring device displayed in response to the existing calibration and a magnitude of the measured parameter and in response to a measurement desired to be displayed by the measuring device in response to the same magnitude of the measured parameter;
    means for operating a selected one of said preset calibration means and said variable calibration means;
    means for communicating to the measuring device the calibration signal of the selected one of said preset calibration means and said variable calibration means;
    wherein said preset calibration means includes:
    memory means for storing data, said memory means having predetermined calibration data stored therein; and
    first computing means, responsive to said means for operating and said predetermined calibration data, for computing the calibration signal of said preset calibration means; and wherein said variable calibration means includes:

data entry means for entering into said variable calibration means responsive calibration data determined from the displayed measurement of the measuring device and the desires measurement; and second computing means, responsive to said means for operating and said responsive calibration data, for computing the calibration signal of said variable calibration means, 10. An apparatus as defined in claim 9, further comprising a housing, separate from the measuring device, having said preset calibration means, said variable calibration means and said means for operating disposed therein.

11. An apparatus as defined in claim 10, wherein said means for communicating includes:

a coil; and electrical conductor means, adapted for extending from said housing, for connecting said coil to said preset calibration means and said variable calibration means.

12. An apparatus as defined in claim 9, wherein said means for communicating includes:

an electrical coil adapted to be connected to the measuring device; and conductor means connecting said coil to said preset calibration means and said variable calibration means.

13. A method of calibrating a measuring device, said method comprising the steps of:

generating, separately from the measuring device, a calibration signal, said generating a calibration step including:

selecting a standard calibration mode or a variable calibration mode;

in response to selecting a standard calibration mode, generating a calibration count from preset calibration data;

in response to selecting a variable calibration mode, entering variable calibration mode calibration data and generating a calibration count from the entered variable calibration mode calibration data; and in response to selecting a variable calibration mode, determining whether the measuring device is adapted to receive one calibration count or two calibration counts;

converting the calibration signal into electromagnetic energy; and coupling the electromagnetic energy to the measuring device.

14. A method as defined in claim 13, wherein said step of determining whether the measuring device is adapted to receive one calibration count or two calibration counts includes:

generating a first set of a predetermined number of pulses and transmitting the pulses of the first set to the measuring device at a first frequency;

detecting a first reading output from the measuring device in response to the pulses transmitted at the first frequency;

generating a second set of the predetermined number of pulses and transmitting the pulses of the second set to the measuring device at a second frequency;

detecting a secon reading putput from the measuring device in response to the pulses transmitted at the second frequency;

comparing the first reading with the second reading to determine if the readings are equal;

designating the measuring device for one calibration count if the readings are equal; and designating the measuring device for two calibration counts if the readings are not equal.

* * * * *

UNITED STATES PATENT AND TRADEMARK OFFICE
CERTIFICATE OF CORRECTION

PATENT NO. : 5,012,667
DATED : May 7, 1991
INVENTOR(S) : Richard M. Kruse

It is certified that error appears in the above-identified patent and that said Letters Patent is hereby corrected as shown below:

Cover Sheet, References Cited, U.S. PATENT DOCUMENTS, insert the following references:

```
--3,517,308    6/1970    Mirdadian        324/68
  3,633,401    1/1972    Wada             73/3
  3,783,248    1/1974    Sugden, Jr.      235/92FL
  3,795,131    3/1974    Wade et al.      73/3
  3,823,310    7/1974    Kalotay et al.   235/151.34
  4,509,373    4/1985    Brown            73/861.28
  4,520,650    6/1985    Palmer et al.    73/3
  4,676,112    6/1987    Uematsu et al.   73/861.17--
```

Cover Sheet, References Cited, add, --FOREIGN PATENT DOCUMENTS--, and insert the following references:

```
--5411765      Japan       73/3
  5451562      Japan       73/3
  54113359     Japan       73/3
  5523443      Japan       73/3
  1027528      U.S.S.R.    73/3
  61202119     Japan       73/3--
```

Cover Sheet, References Cited, add --OTHER PUBLICATIONS--, and insert the following reference:

--Great Plains Industries, Inc., Product Bulletin No. 920614-1, "Electronic Digital Meters by GPI", 4 pages, 11-1986.--

Cover Sheet, References Cited, U.S. PATENT DOCUMENTS, after "4,847,794   7/1989" delete "Hruses" and substitute therefor --Hrubes--;

UNITED STATES PATENT AND TRADEMARK OFFICE
CERTIFICATE OF CORRECTION

PATENT NO. : 5,012,667

DATED : May 7, 1991

INVENTOR(S) : Richard M. Kruse

It is certified that error appears in the above-identified patent and that said Letters Patent is hereby corrected as shown below:

```
Column 2, line 47, delete "electric" and substitute
     therefor --electrical--;

Column 3, line 4, delete "appratus" and substitute
     therefor --apparatus--;

Column 3, line 7, delete "claibration" and substitute
     therefor --calibration--;

Column 3, line 22, delete "DRAWING" and substitute
     therefor --DRAWINGS--;

Column 3, line 49, delete "device namely," and
     substitute therefor --device, namely--;

Column 5, line 16, delete "conductor 4136/core" and
     substitute therefor --container 136/core--;

Column 5, line 23, after the word "coil" and before
     the word "within" insert --assembly--;

Column 5, line 38, delete "togehter" and substitute
     therefor --together--;

Column 5, line 66, delete "10-13" and substitute
     therefor --I0-I3--;

Column 6, line 9, delete "and read" and substitute
     therefor --a read--;
```

UNITED STATES PATENT AND TRADEMARK OFFICE
CERTIFICATE OF CORRECTION

PATENT NO. : 5,012,667
DATED : May 7, 1991
INVENTOR(S) : Richard M. Kruse

It is certified that error appears in the above-identified patent and that said Letters Patent is hereby corrected as shown below:

Column 6, line 15, delete "FIGs." and substitute therefor --FIGS.--;

Column 6, line 31, delete "LM0185L" and substitute therefor --LM018L--;

Column 6, line 42, delete "despressed," and substitute therefor --depressed,--;

Column 6, line 48, delete "10-13." and substitute therefor --I0-I3.--;

Column 7, line 6, delete "182" and substitute therefor --192--;

Column 7, line 40, delete "beings" and substitute therefor --begins--;

Column 9, line 4, delete "aforemention" and substitute therefor --aforementioned--;

Column 9, line 29, delete "of" and substitute therefor --or--;

Column 9, line 51, delete "present" and substitute therefor --preset--;

Column 10, line 7, delete ""TWKAGAN"" and substitute therefor --"TWKAGN"--;

UNITED STATES PATENT AND TRADEMARK OFFICE
CERTIFICATE OF CORRECTION

PATENT NO. : 5,012,667

DATED : May 7, 1991

INVENTOR(S) : Richard M. Kruse

It is certified that error appears in the above-identified patent and that said Letters Patent is hereby corrected as shown below:

Column 10, line 13, delete ""TWKSGN"" and substitute therefor --"TWKAGN"--;

Column 10, lines 13 and 14, delete "designates" and substitute therefor --designate--;

Column 10, line 28, delete the word "a" and substitute therefor --as--;

Column 10, line 32, delete "as "New model" and substitute therefor --as "new model."--;

Column 10, line 33, delete "flow" and substitute therefor --flowmeter--;

Column 10, line 45, after the word "contained" and before the word "or" insert --in the read only memory 164. Whether a one-point calibration--;

Column 11, line 7, delete "preformed." and substitute therefor --performed.--;

Column 11, line 17, delete "durartion" and substitute therefor --duration--;

Column 11, line 27, delete "rountine"

Column 13, line 43 (claim 1), after the word "switch" and before the word "for" insert --means--;

UNITED STATES PATENT AND TRADEMARK OFFICE
CERTIFICATE OF CORRECTION

PATENT NO.  : 5,012,667

DATED       : May 7, 1991

INVENTOR(S) : Richard M. Kruse

It is certified that error appears in the above-identified patent and that said Letters Patent is hereby corrected as shown below:

Column 13, line 5, delete "test" and substitute therefor
--tests--

Column 14, line 21 (claim 6), delete "siad" and substitute
therefor --said--;

Column 14, line 25 (claim 7), after "separate" delete
"from the measuring";

Column 14, line 31 (claim 8), delete "a display" and
substitute therefor -- a display;--;

Column 14, line 32 (claim 8), delete "adjavent" and
substitute therefor --adjacent--;

Column 14, line 39 (claim 9), delete "calobration"
and substitute therefor --calibration--; and

UNITED STATES PATENT AND TRADEMARK OFFICE
CERTIFICATE OF CORRECTION

PATENT NO. : 5,012,667

DATED : May 7, 1991

INVENTOR(S) : Richard M. Kruse

It is certified that error appears in the above-identified patent and that said Letters Patent is hereby corrected as shown below:

Column 13, line 33, after "invention as defined by the appended claims." insert pages A1-A53 of the APPENDIX as shown on the attached sheets.

Signed and Sealed this

Twenty-fourth Day of December, 1991

Attest:

HARRY F. MANBECK, JR.

*Attesting Officer*  *Commissioner of Patents and Trademarks*

```
;
FALSE   EQU     0
TRUE    EQU     NOT FALSE
;
UDL     EQU     FALSE           ;SET TRUE FOR TEST ON UDL ONLY
FLUID   EQU     FALSE           ;SET TRUE IF USED FOR FLUID-TYPES
;
;This 6805 firmware is for use in the GPI "supercalibrator" for EDMs.
;
;               ****************************************
;               *   COPYRIGHT 1987, 1988 GPI INC.      *
;               ****************************************
;
;--------------------------------------------------------------------
;THE FOLLOWING information deals with address decoding for this system:
;--------------------------------------------------------------------
;in addition to on-chip I/O and RAM facilities, the design has
;the following external address map:
;       $0080-$07FF     =standard 2K system RAM
;       $0800-$1FFF     =standard 6K system ROM incl. vectors
;
;-----------------------------------------------
;DETAILS REGARDING INTERNAL/EXTERNAL RAM:
;-----------------------------------------------
;The supercal 2K RAM space is linearly addressed as a contiguous
;2048 bytes. It is divided in hardware between the lowest 128 bytes
;and the rest: The lowest 128 bytes (i.e. bottom half of page0) are
;ram and I/O registers inside the 6805, and are shadowed in external
;RAM. The rest is external RAM in the 6116. Note that the R/M/W in-
;structions of the 6805 can only access page 0 (both internal and
;external). No bank switching is used in this system. All of the
;I/O is accomplished by the standard processor PA and PB ports.
;
;(note:$0000-$000F is on-chip registers. Writes to this area go
;       also to the same address in external RAM, but this external RAM
;       data is ignored on reads.)
;
;-----------------------------------------------------------
;DETAILS REGARDING FORMAT OF DATA STORED IN ROM:
;-----------------------------------------------------------
;The 2 ROM tables will now be:
;
;.FTM (Table, ASCII-Fluid/Model-Name) will contain a variable-length fluid-
;name or model-name designation, in ASCIIZ, that will appear on the display.
;
;.TFND (Table, Fluid/Model Numerical Data) will contain the corresponding
;2-byte binary values for COUNT1, RATE1, COUNT2, and RATE2.
;
;There are also ROM tables for miscellaneous messages for the display
;upper line (".ULM") and for the display lower line (".FLM"). These
;messages are also ASCIIZ and variable length.
```

APPENDIX

A1

```
;
;*** Above changes identified as V1.1...RMK...12/87
;
;+++++ MORE REVISIONS +++++
;***** In this revision of the calibrator firmware, some "ease-of-use"
;factors have been considered. Mainly, provision has been added for a set
;of "shadow" registers for the COUNT and RATE data, so that a calibration-
;run can be repeated with the same values, without having to go through
;the entire data-entry process.
;
;*** all above revisions identified as V1.2...RMK...12/87
;
;+++++ MORE REVISIONS +++++
;Discovered error in original TWEAK routines. TWEAK did not account for the
;presence of a X10 or a X100 strap on the EDM being calibrated. In this re-
;vision, after entry of the 'CAL-CHECK' EDM readings, the program determines
;if a strap is present by looking at the position of the DP in the entered
;value: If was entered as N.NN, then is normal X1, and readings used as be-
;fore. If was entered as NN.N, then has X10 strap, and readings are divided
;by 10 before use. If was entered as NNN, then has X100 strap, and readings
;are divided by 100 before use.
;
;*** with all above revisions identified as V1.3...RMK...1/88
;
;----------------------------------------------------------------
;the following equates echo the above ADDRESSING information...
;(AS APPLIED TO THE 6805, SEE ITS DATA FOR MORE DETAILS)
;----------------------------------------------------------------
;
CIOBAS   EQU   0                ;ON-CHIP I/O ALL HERE
PPA      EQU   CIOBAS           ;PARL PORT A DATA
PPB      EQU   PPA+1            ;PARL PORT B DATA
DDRA     EQU   CIOBAS+4         ;DDR FOR PPA
DDRB     EQU   DDRA+1           ;DDR FOR PPB
TIMDAT   EQU   CIOBAS+8         ;TIMER DATA REG
TIMCTL   EQU   TIMDAT+1         ;TIMER CONTROL DATA
IRAMB    EQU   $10              ;FIRST BYTE OF ON-CHIP RAM
IRAMT    EQU   $7F              ;LAST BYTE OF ON-CHIP RAM
ERAMB    EQU   $80              ;FIRST BYTE OF EXTERNAL RAM
PAGE1    EQU   $100             ;PAGE 1 OF EXTERNAL RAM
PAGE2    EQU   $200             ;PAGE 2 OF EXTERNAL RAM
PAGE3    EQU   $300             ;PAGE 3 OF EXTERNAL RAM
ERAMT    EQU   $3FF             ;LAST BYTE OF EXTERNAL RAM
ROMBAS   EQU   $800             ;first byte of system ROM
IVBAS    EQU   $1FF6            ;BASE OF INTRPT VECTORS
TIMWV    EQU   IVBAS            ;VECTORS...TIMER FRM WAIT
TIMIV    EQU   IVBAS+2          ;TIMER ELSE
EXTIV    EQU   IVBAS+4          ;HDWE INTERRUPT (IRQ)
SWIIV    EQU   IVBAS+6          ;SFTWE INTERRUPT
RESTV    EQU   IVBAS+8          ;PWR-UP/HDWE RESET
;
```

A2

```
                    ;
                    ;----------------------------------------
                    ;SOME CONSTANTS USED THRUOUT PROGRAM...
                    ;----------------------------------------
0028        LL      EQU     40              ;LENGTH OF DISPLAY LINE
0027        LLM1    EQU     LL-1            ;VARIATION THEREOF
0008        NDGTS   EQU     8               ;DIGITS USED IN INTERNAL CALCULATIONS
0007        NDGM1   EQU     NDGTS-1         ;VARIATION OF ABOVE
0006        NDGM2   EQU     NDGTS-2         ;ALSO
000D        TC32    EQU     %00001101       ;TIME CTRL VALUE FOR /32 AND RESET
000E        TC64    EQU     %00001110       ;DITTO FOR /64 AND RESET
000F        TC128   EQU     %00001111       ;DITTO FOR /128 AND RESET
0038        TK10    EQU     56              ;TIME-COUNT VALUE FOR 10-MSEC TICK @/128
                    ;
                    ;----------------------------------------
                    ;NO VARIABLES ARE STORED IN THE *** INTERNAL *** RAM AREA (WHICH
                    ;IS BOTTOM HALF OF PAGE0). IT IS RESERVED FOR STACK USE ONLY.
                    ;----------------------------------------
                    ;
                    ;----------------------------------------
                    ;NOW *** EXTERNAL RAM BUT STILL PG0 ***. ALL SINGLE-BYTE WORKING
                    ;VARIABLES ARE STORED HERE:
                    ;----------------------------------------
0080        MTA0    EQU     ERAMB           ;ALL OF THE MXXXX VARIABLES ARE USED
0081        MTA1    EQU     MTA0+1          ; AND SHARED AMONG THE MATH PROCESSORS
0082        MTA2    EQU     MTA1+1
0083        MTX0    EQU     MTA2+1
0084        MTX1    EQU     MTX0+1
0085        MTX2    EQU     MTX1+1
0086        MTX3    EQU     MTX2+1
0087        MC0     EQU     MTX3+1
0088        MC1     EQU     MC0+1
0089        MC2     EQU     MC1+1
008A        MF0     EQU     MC2+1
008B        MF1     EQU     MF0+1
008C        MF2     EQU     MF1+1
008D        MF3     EQU     MF2+1
                    ;
008E        BDT     EQU     MF3+1           ;BINARY TEMP USED IN MATH OPS (2 BYTES)
0090        CNT1    EQU     BDT+2           ;NOW BINARY WORK REGISTERS (2 BYTES EA)
0092        RAT1    EQU     CNT1+2          ; THESE MUST BE SEQUENTIAL!
0094        CNT2    EQU     RAT1+2
0096        RAT2    EQU     CNT2+2
                    ;
0000                *** new ***
0098        OOC1    EQU     RAT2+2          ;SHADOWS FOR ABOVE
009A        OOR1    EQU     OOC1+2
009C        OOC2    EQU     OOR1+2
009E        OOR2    EQU     OOC2+2
                    ;
00A0        AITMP   EQU     OOR2+2          ;ADDTL 2-BYTE BINARY TEMPS
```

```
00A2        AIMSK    EQU    AITMP+2
00A4        GBT      EQU    AIMSK+2
            ;
00A6        FKEYS    EQU    GBT+2        ;1-BYTE TEMPS: IRQ HNDLR PUTS FKEYS HERE
00A7        FKF      EQU    FKEYS+1      ;AND A FLAG FOR IT TOO
00A8        FLTP     EQU    FKF+1        ;INTERNAL fluid/model TYPE #
00A9        GPT0     EQU    FLTP+1       ;TEMP SHARED SEVERAL PLACES
00AA        GPC0     EQU    GPT0+1       ;COUNTER SHARED SEVERAL PLCS
00AB        NNDX     EQU    GPC0+1       ;NUMERICAL fluid/model-DATA INDEX
00AC        ANDX     EQU    NNDX+1       ;ASCII fluid/model-DATA INDEX
00AD        NPTS     EQU    ANDX+1       ;FLAG FOR 1PT/2PT CAL TYPE
00AE        WDGK     EQU    NPTS+1       ;FOR NKEY SCAN, HOLDS KEY CODE
00AF        CTXT     EQU    WDGK+1       ;USED DURING CAL RUNS
00B0        LXT0     EQU    CTXT+1       ;USED WHILE WAITING FOR LCD NBSY
00B1        ADT0     EQU    LXT0+1       ;USED DURING TIME DELAYS
00B2        ADT1     EQU    ADT0+1       ;DITTO
00B3        MNO      EQU    ADT1+1       ;DSP MSG# TEMP
00B4        KLN      EQU    MNO+1        ;ANOTHER ONE
00B5        MLG      EQU    KLN+1        ;DSP MSG LNGTH TEMP
00B6        DCP      EQU    MLG+1        ;DSP CTR POS TEMP
00B7        AICNT    EQU    DCP+1        ;ACT.IND. COUNTER
00B8        TCTL     EQU    AICNT+1      ;DIVISOR PRIVATE FOR TIMER
00B9        TDAT     EQU    TCTL+1       ;COUNTDOWN PRIVATE FOR TIMER
00BA        IDPP     EQU    TDAT+1       ;DP POSITION/FLAG FOR NUM ENTRY
00BB        IDP1     EQU    IDPP+1       ;SHADOW FOR ABOVE
00BC        TAF      EQU    IDP1+1       ;FLAG FOR TWK-AGAIN PROCEDURE
            ;
            ;
            ;------------------------------------------------------
            ;THE FOLLOWING ARE ADDRESSES IN *PAGE 1 OF THE EXTERNAL RAM AREA*.
            ;ALL OF THE BCD MATH OPERATIONS ARE CARRIED OUT ON THESE.
            ;------------------------------------------------------
0100        DUMMY    EQU    PAGE1
0108        RG0      EQU    DUMMY+NDGTS  ;NINE WORKING BCD REGISTERS...
0110        RG1      EQU    RG0+NDGTS
0118        RG2      EQU    RG1+NDGTS
0120        RG3      EQU    RG2+NDGTS
0128        RG4      EQU    RG3+NDGTS
0130        RG5      EQU    RG4+NDGTS
0138        RG6      EQU    RG5+NDGTS
0140        RG7      EQU    RG6+NDGTS
0148        RG8      EQU    RG7+NDGTS
            ;
0150        MLPLR    EQU    RG8+NDGTS    ;...AND 4 SHARED BCD TEMPS
0150        DIVSR    EQU    MLPLR
0150        BTAT0    EQU    MLPLR
0158        MLCND    EQU    MLPLR+NDGTS
0158        DIVDD    EQU    MLCND
0158        BTAT1    EQU    MLCND
0160        PPROD    EQU    MLCND+NDGTS
0160        PQUOT    EQU    PPROD
```

```
0168              FPROD   EQU     FPROD+NDGTS
0168              FQUOT   EQU     FPROD
                  ;
                  ;
                  ;
                  ;--------------------------------------------------------------
                  ;IN THE FOLLOWING CODE THE SIGNIFICANCE OF SYMBOLS BEGINNING WITH
                  ;"." IS THAT THEY (ONLY) WILL BE PASSED ON TO THE UDL ANALYZER SYSTEM.
                  ;All symbols are treated identically by the assembler.
                  ;--------------------------------------------------------------
                  ;
                  ;
                  ;--------------------------------------------------------------
                  ;FOR DISPLAY SUBROUTINE THAT WILL BE MOVED INTO RAM...
0200              .IILA   EQU     PAGE2
                  ;--------------------------------------------------------------
                  ;
                  ;--------------------------------------------------------------
                  ;A LOT OF THIS PROGRAM IS LEFT IN 'INCLUDE' FILES WHICH WILL BE
                  ;GATHERED BY THE ASSEMBLER. THIS IS TO KEEP THE INDIVIDUAL DISK
                  ;FILES DOWN TO A MANAGEABLE SIZE FOR EDITING.
                  ;--------------------------------------------------------------
                  ;
                  ;--------------------------------------------------------------
                  ;assembler actually starts generating obj code here...
                  ;--------------------------------------------------------------
0800                      ORG     ROMBAS          ;BOTTOM OF ROM AREA
                  ;
                  ;
                  ;***********************************************
                  ;FIRST AN AREA FOR GENERIC DATA TABLES...
                  ;***********************************************
                           INCLUD  C:SCGNDAT.INC   ;DATA TABLES for dsply etc
                  ;This is table-related data to be included in the SUPERCALIBRATOR
                  ;program-storage space.
                  ;
                  ;legal copyright notice...
                  ;this will be first programmed bytes in EPROM
0800 434F5059             DB      'COPYRIGHT 1987,1988 GFI INC.'
                  ;
                  ;THIS IS THE TIME, AS SEC E-7, OF THE BASIC TIME TICK
081C 00000000     BTICK   DB      0,0,0,0,0,4,4,7         ;FOR CLOCK/32
                  ;
                  ;ONE SET OF FLUID/model DATA, FOR RUNNING CAL CHECK...
                  ;2 RUNS, SAME PULSECOUNT, DFRNT PULSERATES...
0824 0BB8001E     TCCK:   DW      3000,30,3000,300
                  ;
                  ;same value as above TCCK pulsecount but as E-3...
082C 00030000     DCCT    DB      0,3,0,0,0,0,0,0
                  ;
                  ;used to make (5x) total pulsecount for cal runs...
0834 00000000     DCNU    DB      0,0,0,0,0,0,0,5
```

```
                    ;
                    ;
                    ;GENERIC UPPER-LINE DISPLAY MESSAGES
                    ;MESSAGES ARE VARIABLE LENGTH (MAX 40), ASCIIZ
                    ;----------------------------------------
083C 53454C45  .ULM:  DB      "SELECT CALIBRATION METHOD",0           ;MSG#0
0856 504C4143         DB      "PLACE EDM INTO *CAL* MODE",0           ;1
0870 52554E4E         DB      "RUNNING #1 OF 1... STAND BY",0         ;2
088C 52554E4E         DB      "RUNNING #1 OF 2... STAND BY",0         ;3
08A8 52554E4E         DB      "RUNNING #2 OF 2... STAND BY",0         ;4
08C4 444F4E45         DB      "DONE... RESTORE EDM TO NORMAL MODE",0  ;5
09E7 585800           DB      "XX",0                                  ;6
08EA 53454C45         DB      "SELECT CALIBRATION TYPE",0             ;7
0902 454E5445         DB      "ENTER NEW >COUNT-1< VALUE...",0        ;8
091F 454E5445         DB      "ENTER NEW >RATE-1< VALUE...",0         ;9
093B 454E5445         DB      "ENTER NEW >COUNT-2< VALUE...",0        ;A
0958 454E5445         DB      "ENTER NEW >RATE-2< VALUE...",0         ;B
0974 434C4541         DB      "CLEAR (ZERO) EDM BATCH TOTAL",0        ;C
0991 52554E4E         DB      "RUNNING CAL CHECK... STAND BY",0       ;D
09AF 454E5445         DB      "ENTER DISPLAYED EDM READING",0         ;E
09CB 454E5445         DB      "ENTER NEW CORRECTION FACTOR",0         ;F
09E7 454E5445         DB      "ENTER NEW LO-FLOW CORRECTION FACTOR",0 ;10
0A0B 454E5445         DB      "ENTER NEW HI-FLOW CORRECTION FACTOR",0 ;11
0A2F 54494D45         DB      "TIME DELAY... STAND BY",0              ;12
0A46 594F5527         DB      "YOU'LL NEED PREVIOUS CORRECTION FACTORS!",0  ;13
0A6F 454E5445         DB      "ENTER PREVIOUS LO-FLOW CORRECTION FACTOR",0  ;14
0A9B 454E5445         DB      "ENTER PREVIOUS HI-FLOW CORRECTION FACTOR",0  ;15
                    ;
                    ;KEY-LABEL MESSAGES FOR DSPLY LOWER LINE
                    ;MESSAGES ARE VARIABLE LENGTH (MAX 10), ASCIIZ
0AC1 202000    .KLM:  DB      "  ",0                                  ;MSG#0
0AC4 47504953         DB      "GPIStd",0                              ;1
0ACB 54776561         DB      "Tweak",0                               ;2
0AD1 4F6B00           DB      "Ok",0                                  ;3
0AD4 3C3C3C00         DB      "<<<",0                                 ;4
0AD8 53656C65         DB      "Select",0                              ;5
0ADF 3E3E3E00         DB      ">>>",0                                 ;6
0AE3 312D706F         DB      "1-point",0                             ;7
0AEB 322D706F         DB      "2-point",0                             ;8
0AF3 456E7465         DB      "Enter",0                               ;9
0AF9 436C6561         DB      "Clear",0                               ;A
0AFF 54776B41         DB      "TwkAgain",0                            ;B
0B08 4E657700         DB      "New",0                                 ;C
0B0C 52657065         DB      "Repeat",0                              ;D
                    ;
                    ;
                          END     ;OF INCLUDE
                    ;
                    ;
```

```
;*****************************************
;NOW AN AREA FOR fluid/model-TYPE DATA TABLES...
;*****************************************
        INCLUD  C:SCFTDAT.INC   ;DATA TABLES for fluid/models
;This special file contains the EDM-FLUID/MODEL data that is stored
;in the SUPERCAL EPROM. This file, AND ONLY THIS FILE, must be updated
;when changing the FLUID/model tables! After this file is updated, the
;entire SUPERCAL program must be re-assembled. Presumably a new EPROM
;release will then be generated.
;
;*********************************************************************
;*      STEP-BY-STEP INSTRUCTIONS FOR ADDING A NEW FLUID/MODEL:      *
;*-------------------------------------------------------------------*
;* 1. Determine the NAME of the FLUID/model as it will be displayed on *
;*    THE upper LCD line during selection. This may include almost any- *
;*    THING, but the MAXIMUM LENGTH IS 40 CHARACTERS.                *
;*                                                                    *
;* 2. Determine the "COUNT" AND "PULSERATE" numbers for the (first)  *
;*    calibration run for the new FLUID/model. "COUNT" is the number of *
;*    simulated "PICKUP PULSES" (4X the number of turbine revs), "RATE" *
;*    is the FREQUENCY, IN PULSES-PER-SECOND, of the simulated "PICKUP *
;*    PULSES" (4X THE turbine rotation SPEED in REVS/SEC).           *
;*                                                                    *
;* 3. If this is to be a "2-POINT" calibration, determine a SECOND set *
;*    of "COUNT" and "PULSERATE" numbers, as above, but to be used   *
;*    during the SECOND "cal run."                                   *
;*                                                                    *
;* 4. In the ".FTM" table below, immediately after the last valid FLUID/ *
;*    MODEL name, but before the "NEW FLUID/MODEL" message, add a "DB" *
;*    statement with the new name. Use EXACTLY the same pattern as the *
;*    other names in the table, INCLUDING THE SPACING AND THE SINGLE- *
;*    QUOTE MARKS (') and the TERMINATING "0" CHARACTER.             *
;*                                                                    *
;* 5. In the ".TFND" table below, immediately after the last existing *
;*    "DW" statement, add a new "DW" statement defining the new values *
;*    for "COUNT(1)", "RATE(1)", "COUNT(2)", AND "RATE(2)".          *
;*    * NOTE: ALL FOUR VALUES MUST ALWAYS BE INCLUDED IN THE DW STATE- *
;*            MENT! If this is to be a 1-POINT CAL procedure, enter   *
;*            "0" values FOR "COUNT(2)" and "RATE(2)" positions!      *
;*    Use EXACTLY THE SAME PATTERN as the other table entries, including *
;*    the spacing and the commas (,) seperating numeric values.      *
;*                                                                    *
;* 6. Update the "MAXFT" variable, immediately below, to reflect the new *
;*    NUMBER OF DEFINED FLUIDS/MODELS in the new table.              *
;*                                                                    *
;* 7. If desired, update the "SOL" message near the end of this file *
;*    with a new release # and date. This is the message that appears *
;*    on the supercal LCD for 5 seconds following power-up or reset. *
;*    THE TOTAL LENGTH OF THIS MESSAGE (BETWEEN "'" CHARACTERS) MUST *
;*    REMAIN EXACTLY 40 CHARACTERS! This message doesn't affect the *
;*    calibrator operation in any way, but should be updated after any *
```

```
                        ;*      change for the sake of documentation.
                        ;*************************************************************
                        ;
                        ;
                        ;--->YOU MUST UPDATE THIS VARIABLE WHEN ADDING/DELETING FLUIDS/MODELS!
                        ;IT IS JUST THE CURRENT NUMBER OF FLUIDS/MODELS IN THE TABLE, NOT
                        ;INCLUDING THE "NEW FLUID/MODEL" NAME...
0018                    MAXFT   EQU     24                      ;# KNOWN FLUIDS/MODEL #S
                        ;
                        ;
                        ;FOR EACH FLUID-MODEL, THERE IS AN ASCIIZ NAME IN ONE TABLE,
                        ;AND A CORRESPONDING SET OF NUMERIC data IN A SECOND TABLE...
                        ;
                        ;FLUID/MODEL-TABLE 1: FLUID/MODEL NAMES FOR UPPER DISPLAY LINE:
0B13                    ;Messages are variable length (max 40), ASCIIZ.
                        .FTM:
0B13 4D6F6465                   DB      'Model :A30G:',0        ;model# 0, ALUM LO-FLO GALLON
0B20 4D6F6465                   DB      'Model :B30G:',0        ;1, TEFLON LO-FLO GALLON
0B2D 4D6F6465                   DB      'Model :S30G:',0        ;2, SS LO-FLO GALLON
0B3A 4D6F6465                   DB      'Model :V30G:',0        ;3, PVDF LO-FLO GALLON
0B47 4D6F6465                   DB      'Model :N30G:',0        ;4, NYLON LO-FLO GALLON
0B54 4D6F6465                   DB      'Model :A31G:',0        ;model# 5, ALUM 1-INCH GALLON
0B61 4D6F6465                   DB      'Model :B31G:',0        ;6, TEFLON 1-INCH GALLON
0B6E 4D6F6465                   DB      'Model :S31G:',0        ;7, SS 1-INCH GALLON
0B7B 4D6F6465                   DB      'Model :V31G:',0        ;8, PVDF 1-INCH GALLON
0B88 4D6F6465                   DB      'Model :N31G:',0        ;9, NYLON 1-INCH GALLON
0B95 4D6F6465                   DB      'Model :A32G:',0        ;model# 10, ALUM 2-INCH GALLON
0BA2 4D6F6465                   DB      'Model :S32G:',0        ;11, SS 2-INCH GALLON
0BAF 4D6F6465                   DB      'Model :A11L:',0        ;model# 12, ALUM LO-FLO LITER
0BBC 4D6F6465                   DB      'Model :B11L:',0        ;13, TEFLON LO-FLO LITER
0BC9 4D6F6465                   DB      'Model :S11L:',0        ;14, SS LO-FLO LITER
0BD6 4D6F6465                   DB      'Model :V11L:',0        ;15, PVDF LO-FLO LITER
0BE3 4D6F6465                   DB      'Model :N11L:',0        ;16, NYLON LO-FLO LITER
0BF0 4D6F6465                   DB      'Model :A12L:',0        ;model# 17, ALUM 1-INCH LITER
0BFD 4D6F6465                   DB      'Model :B12L:',0        ;18, TEFLON 1-INCH LITER
0C0A 4D6F6465                   DB      'Model :S12L:',0        ;19, SS 1-INCH LITER
0C17 4D6F6465                   DB      'Model :V12L:',0        ;20, PVDF 1-INCH LITER
0C24 4D6F6465                   DB      'Model :N12L:',0        ;21, NYLON 1-INCH LITER
0C31 4D6F6465                   DB      'Model :A13L:',0        ;model# 22, ALUM 2-INCH LITER
0C3E 4D6F6465                   DB      'Model :S13L:',0        ;23, SS 2-INCH LITER
                        ;(... ETC ... NEW FLUIDS/MODELS GO HERE. DONT ERASE FOLLOWING MSG.)
                        ;
0C4B 4E455720                   DB      'NEW MODEL',0
                        ;
                        ;FLUID/MODEL-TABLE 2: CORRESPONDING NUMERIC DATA.
                        ;EACH LINE BELOW MATCHES THE CORRESPONDING LINE ABOVE.
                        ;FOUR NUMERIC VALUES FOR EACH FLUID/MODEL ARE:
                        ;PULSECOUNT(1), PULSERATE(1), PULSECOUNT(2), PULSERATE(2).
                        ;PULSECOUNT(2) NON-ZERO IS FLAG FOR 2-POINT CAL THIS FLUID/MODEL.
0C55                    .TFND:
0C55 2BA10019                   DW      11169,25,11309,100      ;model# 0, ALUM LO-FLO GALLON
```

```
0C5D 2D1F0019         DW      11551.25,11880.100      ;1. TEFLON LO-FLO GALLON
0C65 2A710019         DW      10865.25,11172.100      ;2. SS LO-FLO GALLON
0C6D 2D350019         DW      11573.25,11770.100      ;3. PVDF LO-FLO GALLON
0C75 2D160019         DW      11542.25,11637.100      ;4. NYLON LO-FLO GALLON
0C7D 0DB5004B         DW      3509.75,3549.300        ;model# 5. ALUM 1-INCH GALLON
0C85 0DF6004B         DW      3574.75,3609.300        ;6. TEFLON 1-INCH GALLON
0C8D 0D90004B         DW      3472.75,3518.300        ;7. SS 1-INCH GALLON
0C95 0E92004B         DW      3730.75,3787.300        ;8. PVDF 1-INCH GALLON
0C9D 0E2B004B         DW      3627.75,3707.300        ;9. NYLON 1-INCH GALLON
0CA5 0D91004B         DW      3473.75,3639.300        ;model# 10. ALUM 2-INCH GALLON
0CAD 0D99004B         DW      3481.75,3630.300        ;11. SS 2-INCH GALLON
0CB5 0B870019         DW      2951.25,2988.100        ;model# 12. ALUM LO-FLO LITER
0CBD 0BEC0019         DW      3052.25,3141.100        ;13. TEFLON LO-FLO LITER
0CC5 0B360019         DW      2870.25,2951.100        ;14. SS LO-FLO LITER
0CCD 0BF10019         DW      3057.25,3109.100        ;15. PVDF LO-FLO LITER
0CD5 0BE90019         DW      3049.25,3074.100        ;16. NYLON LO-FLO LITER
0CDD 2434004B         DW      9268.75,9375.300        ;model# 17. ALUM 1-INCH LITER
0CE5 24E1004B         DW      9441.75,9534.300        ;18. TEFLON 1-INCH LITER
0CED 23D4004B         DW      9172.75,9294.300        ;19. SS 1-INCH LITER
0CF5 267E004B         DW      9854.75,10003.300       ;20. PVDF 1-INCH LITER
0CFD 256E004B         DW      9582.75,9792.300        ;21. NYLON 1-INCH LITER
0D05 23D7004B         DW      9175.75,9610.300        ;model# 22. ALUM 2-INCH LITER
0D0D 23EB004B         DW      9195.75,9590.300        ;23. SS 2-INCH LITER
                      ;(... ETC ...)
                      ;
                      ;
                      ;SPECIAL MESSAGES FOR SIGN-ON, FIXED LENGTH
0D15 20202020  SOU:   DB           '---- EDM CALIBRATION SYSTEM ----'
0D1D 2056312E  SOL:   DB           ' V1.3 R001  Copyright 1987,1988 GFI Inc'
                      ;
                      ;
                      END                     ;OF INCLUDE
                      ;
                      ;
```

```
;************************************
;BCD MATH SUBROUTINES FOR THE 6805
;************************************
        INCLUD  C:SCMATH.INC    ;ALL BCD MATH ROUTINES
;THE FOLLOWING ROUTINES DO BCD ARITHMETIC ON RAM-BASED REGISTERS
;WHICH ARE ASSUMED 8 BYTES LONG, WITH 1 BCD DIGIT PER BYTE. WITHIN
;EACH REGISTER THE MSD IS AT THE LOWEST ADDRESS, WITH DIGITS IN DES-
;CENDING ORDER SO THAT THE LSD IS AT THE HIGHEST ADDRESS.
;EXAMPLE: 12345 IS STORED AS    BASE    BYTE 00h
;                               BASE+1  BYTE 00h
;                               BASE+2  BYTE 00h
;                               BASE+3  BYTE 01h
;                               BASE+4  BYTE 02h
;                               BASE+5  BYTE 03h
;                               BASE+6  BYTE 04h
;                               BASE+7  BYTE 05h
;
;ADDITIONALLY, THE BINARY-TO-BCD ROUTINE EXPECTS THE BINARY VALUE TO
;LIVE IN A 2-BYTE REGISTER, AND USES ANOTHER 2-BYTE REGISTER FOR
;TEMPORARY WORK. BINARY VALUES ARE STORED IN THESE REGISTERS AS
;STRAIGHT 16-BIT CODE. THE LSD IS AT THE LOW END OF THE HIGHEST
;ADDRESS. EXAMPLE: 1234h IS     BASE    BYTE 12h
;                               BASE+1  BYTE 34H
;
;ALL BCD REGISTERS ARE ASSUMED TO BE IN PAGE-1 RAM SO AS TO
;BE ADDRESSABLE VIA "100,X" INSTRUCTIONS.
;ALL BINARY REGISTERS ARE ASSUMED TO BE IN PAGE-0 RAM SO AS TO
;BE ADDRESSABLE VIA ",X" INSTRUCTIONS.
;
;WHEN A SINGLE OPERAND IS NEEDED, THE REG INDEX IS PASSED IN X.
;IF A SECOND OPERAND IS NEEDED, ITS REG INDEX IS PASSED (ALSO) IN A.
;TERMINOLOGY:   R(A) MEANS REGISTER ADDRESSED BY ACC
;               R(X) MEANS REGISTER ADDRESSED BY X
;
;
;****************************
;NOW THE ACTUAL BCD ROUTINES
;****************************
;THIS COPIES ANY PG1 R(X) INTO ANY PG1 R(A).
;USES MTA0,MC0,MTX0 TEMPS, NO OTHER SRS.
;--------------------------------------
0D65 B780       .XCPYA: STA     MTA0
0D67 A607               LDA     #NDGM1          ;TO DO ALL DIGITS
0D69 B787               STA     MC0
0D6B BF83               STX     MTX0
0D6D BE83       XCYA1:  LDX     MTX0
0D6F D60100             LDA     PAGE1,X         ;GET SOURCE BYTE
0D72 BE80               LDX     MTA0
0D74 D70100             STA     PAGE1,X         ;PUT IT IN DESTINATION
0D77 3C83               INC     MTX0
0D79 3C80               INC     MTA0
```

```
0D7B 3A87              DEC    MC0          ;LOOP FOR ALL DIGITS
0D7D 2AEE              BPL    XCYA1
0D7F 81                RTS
                ;
                ;
                ;--------------------------------------
                ;THIS ALSO COPIES R(X) TO R(A), BUT ASSUMES R(Y) IN FIRST PAGE
                ;OF ROM, R(A) IS IN RAM. (IE LOAD A CONSTANT INTO RAM).
                ;USES SAME VARIABLES AS XCPYA ABOVE
                ;--------------------------------------
0D80 B780       .XROMA: STA   MTA0
0D82 A607              LDA    #NDGM1       ;TO DO ALL DIGITS
0D84 B787              STA    MC0
0D86 BF83              STX    MTX0
0D88 BEB3       XRMA1: LDX    MTX0
0D8A D60800            LDA    ROMBAS,X
0D8D BE80              LDX    MTA0
0D8F D70100            STA    PAGE1,X
0D92 3C83              INC    MTX0
0D94 3C80              INC    MTA0
0D96 3A87              DEC    MC0          ;LOOP FOR ALL DIGITS
0D98 2AEE              BPL    XRMA1
0D9A 81                RTS
                ;
                ;
                ;       PAGE   6
                ;--------------------------------------
                ;ANOTHER COPIER, THIS TIME FROM PAGE2 (INDEXED BY X)
                ;TO PAGE1 (INDEXED BY A). USES SAME TEMPS AS ABOVE...
                ;--------------------------------------
                ;.X2A1  STA    MTA0
                ;       LDA    #NDGM1       ;TO DO ALL DIGITS
                ;       STA    MC0
                ;       STX    MTX0
                ;X211:  LDX    MTX0
                ;       LDA    PAGE2,X      ;GET SOURCE BYTE
                ;       LDX    MTA0
                ;       STA    PAGE1,X      ;PUT IT IN DESTINATION
                ;       INC    MTX0
                ;       INC    MTA0
                ;       DEC    MC0          ;LOOP FOR ALL DIGITS
                ;       BPL    X211
                ;       RTS
                ;
                ;
                ;       PAGE   6
                ;--------------------------------------
                ;AND THE REVERSE OF ABOVE... COPY FROM PAGE1 (INDEXED BY X)
                ;TO PAGE2 (INDEXED BY A). USES SAME TEMPS AS ABOVE...
                ;--------------------------------------
                ;.X1A2  STA    MTA0
```

A11

```
        ;       LDA     #NDGM1          ;TO DO ALL DIGITS
        ;       STA     MC0
        ;       STX     MTX0
        ;X121:  LDX     MTX0
        ;       LDA     PAGE1,X         ;GET SOURCE BYTE
        ;       LDX     MTA0
        ;       STA     PAGE2,X         ;PUT IT IN DESTINATION
        ;       INC     MTX0
        ;       INC     MTA0
        ;       DEC     MC0             ;LOOP FOR ALL DIGITS
        ;       BPL     X121
        ;       RTS
        ;
        ;
        ;       PAGE    6
        ;----------------------------------------------------
        ;YET ANOTHER COPIER, THIS TIME FROM PAGE3 (INDEXED BY X)
        ;TO PAGE1 (INDEXED BY A). USES SAME TEMPS AS ABOVE...
        ;----------------------------------------------------
        ;.X3A1  STA     MTA0
        ;       LDA     #NDGM1          ;TO DO ALL DIGITS
        ;       STA     MC0
        ;       STX     MTX0
        ;X311:  LDX     MTX0
        ;       LDA     PAGE3,X         ;GET SOURCE BYTE
        ;       LDX     MTA0
        ;       STA     PAGE1,X         ;PUT IT IN DESTINATION
        ;       INC     MTX0
        ;       INC     MTA0
        ;       DEC     MC0             ;LOOP FOR ALL DIGITS
        ;       BPL     X311
        ;       RTS
        ;
        ;
        ;       PAGE    6
        ;----------------------------------------------------
        ;AND THE REVERSE OF ABOVE... COPY FROM PAGE1 (INDEXED BY X)
        ;TO PAGE3 (INDEXED BY A). USES SAME TEMPS AS ABOVE...
        ;----------------------------------------------------
        ;.X1A3  STA     MTA0
        ;       LDA     #NDGM1          ;TO DO ALL DIGITS
        ;       STA     MC0
        ;       STX     MTX0
        ;X131:  LDX     MTX0
        ;       LDA     PAGE1,X         ;GET SOURCE BYTE
        ;       LDX     MTA0
        ;       STA     PAGE3,X         ;PUT IT IN DESTINATION
        ;       INC     MTX0
        ;       INC     MTA0
        ;       DEC     MC0             ;LOOP FOR ALL DIGITS
        ;       BPL     X131
```

A12

```
                         ;       RTS
                         ;
                         ;
                         ;----------------------------------------
                         ;TEST R(X) FOR ALL-0. RTN A=0 AND Z SET IF TRUE
                         ;USES MC0 TEMP. CALLS NO OTHER SRS.
                         ;----------------------------------------
   0D9B A607     .XCHK0: LDA     #NDGM1            ;FOR ALL DIGITS
   0D9D B787             STA     MC0
   0D9F 4F               CLRA
   0DA0 DA0100   XC01:   ORA     PAGE1,Y           ;A WILL GET RESULT
   0DA3 5C               INCY                      ;NEXT DIGIT
   0DA4 3A87             DEC     MC0
   0DA6 2AF8             BPL     XC01
   0DA8 AA00             ORA     #0
   0DAA 81               RTS
                         ;
                         ;
                         ;----------------------------------------
                         ;CLEAR THE R(X) TO ALL ZERO.
                         ;USES MC0 TEMP. NO OTHER SRS CALLED.
                         ;----------------------------------------
   0DAB A607     .XCLR:  LDA     #NDGM1            ;FOR ALL DIGITS
   0DAD B787             STA     MC0
   0DAF 4F               CLRA
   0DB0 D70100   XCL2:   STA     PAGE1,X           ;CLEAR A BYTE
   0DB3 5C               INCX                      ;RDY FOR NEXT
   0DB4 3A87             DEC     MC0               ;SEE IF MORE
   0DB6 2AF8             BPL     XCL2              ;THEN REPEAT
   0DB8 81               RTS
                         ;
                         ;
                         ;----------------------------------------
                         ;increment a BCD register R(X) IN PLACE.
                         ;return Z for Zero result, C for overflow result
                         ;USES MC0 TEMP. NO OTHER SRS CALLED.
                         ;----------------------------------------
   0DB9 A607     .XINC:  LDA     #NDGM1            ;WILL DO LOOP ALL TIMES
   0DBB B787             STA     MC0
   0DBD D60107   XIN1:   LDA     PAGE1+NDGM1,X
   0DC0 4C               INCA
   0DC1 A109             CMP     #9
   0DC3 2205             BHI     XIN3
   0DC5 D70107           STA     PAGE1+NDGM1,X
   0DC8 98               CLC
   0DC9 81               RTS                       ;NORMAL EXIT. RETURN NX AND NC
   0DCA 4F       XIN3:   CLRA
   0DCB D70107           STA     PAGE1+NDGM1,X
   0DCE 5A               DECX
   0DCF 3A87             DEC     MC0
   0DD1 2AEA             BPL     XIN1
```

A13

```
0DD3 4F              CLRA                       ;OVERFLOW IF HERE. SET Z & C
0DD4 99              SEC
0DD5 81              RTS
                ;
                ;
                ;------------------------------------------------------------
                ;DECREMENT a BCD register R(X) IN PLACE.
                ;return Z for Zero result. C for UNDERflow result.
                ;USES MC0 AND MTX0 TEMPS. AND MAY CALL XCHK0 ROUTINE.
                ;------------------------------------------------------------
                ;.XDEC: LDA   #NDGM1              ;WILL DO LOOP ALL TIMES
                ;       STA   MC0
                ;       STX   MTX0
                ;XDE1:  LDA   PAGE1+NDGM1,X
                ;       DECA
                ;       BMI   XDE3
                ;       STA   PAGE1+NDGM1,X
                ;       LDX   MTX0                ;NORMAL EXIT.
                ;       JSR   .XCHK0              ;MUST CHK RSLT FOR ALL ZERO
                ;       CLC                       ;AND BE SURE NC
                ;       RTS
                ;XDE3:  LDA   #9
                ;       STA   PAGE1+NDGM1,X
                ;       DECX
                ;       DEC   MC0
                ;       BPL   XDE1
                ;       SEC                       ;UNDERFLOW IF HERE. SET C.
                ;       RTS
                ;
                ;
                ;------------------------------------------------------------
                ;SHIFT R(X) LEFT ONE DIGIT (I.E. MULT X 10).
                ;LSD BECOMES 0. OVERFLOW, IF ANY, IS RETURNED IN A.
                ;SEE REGISTER USE FOR XROL, WHICH IS PART OF THIS.
                ;------------------------------------------------------------
0DD6 4F         .XSHL:  CLRA
                ;SAME BUT LO NYBBLE OF A GOES INTO LSD OF R(X).
                ;USES TEMPS MTX0,MC0,MTA0. NO OTHER SRS CALLED.
                ;------------------------------------------------------------
0DD7 B783       .XROL:  STA   MTX0                ;WILL USE LATER
0DD9 A607               LDA   #NDGM1              ;FOR ALL DIGITS
0DDB B787               STA   MC0
0DDD D60100             LDA   PAGE1,X
0DE0 B780               STA   MTA0                ;STASH CURRENT MSD
0DE2 D60101     XRL2:   LDA   PAGE1+1,X
0DE5 D70100             STA   PAGE1,X
0DE8 5C                 INCX
0DE9 3A87               DEC   MC0
0DEB 26F5               BNE   XRL2                ;CUZ ONLY 9 TIMES HERE
0DED B683               LDA   MTX0                ;PUT A IN LSD
0DEF D70100             STA   PAGE1,X
```

A14

```
0DF2 B680            LDA     MTA0            ;RETN WITH OLD MSD
0DF4 81              RTS
                ;
                ;
                ;----------------------------------------------------------------
                ;SHIFT R(X) RIGHT ONE DIGIT (I.E. DIV X 10).
                ;MSD BECOMES 0. UNDERFLOW, IF ANY, IS RETURNED IN A
                ;SEE REG USE FOR XROR, WHICH IS PART OF THIS.
                ;----------------------------------------------------------------
0DF5 4F         .XSHR:  CLRA
                ;SAME BUT LO NYBBLE OF A GOES INTO MSD OF R(X)
                ;USES TEMPS MTX0,MC0,MTA0. NO OTHER SRS CALLED.
                ;----------------------------------------------------------------
0DF6 B783       .XROR:  STA     MTX0
0DF8 A607               LDA     #NDGM1          ;FOR ALL DIGITS
0DFA B787               STA     MC0
0DFC D60107             LDA     PAGE1+NDGM1,X   ;STASH THE CURRENT LSD
0DFF B780               STA     MTA0
0E01 D60106     XRR2:   LDA     PAGE1+NDGM2,X
0E04 D70107             STA     PAGE1+NDGM1,X   ;X/C GO OTHER WAY
0E07 5A                 DECX
0E08 3A87               DEC     MC0
0E0A 26F5               BNE     XRR2            ;NINE TIMES
0E0C B683               LDA     MTX0            ;PUT A IN MSD
0E0E D70107             STA     PAGE1+NDGM1,X
0E11 B680               LDA     MTA0            ;RETURN WITH OLD LSD
0E13 81                 RTS
                ;
                ;
                ;----------------------------------------------------------------
                ;COMPARE R(X) - R(A). NO CHANGE EITHER. RET CY/Z PER RESULT JUST
                ;LIKE CPU CMP INSTRUCTION. DON'T DISTURB ANY BCD REGISTERS.
                ;USES TEMPS MTA0,MTX0,C8XA. NO OTHER SRS CALLED.
                ;----------------------------------------------------------------
0E14 B780       .XCMPA: STA     MTA0            ;SAVE INPUT REG#S
0E16 BF83               STX     MTX0
0E18 A607               LDA     #NDGM1          ;FOR ALL DIGITS
0E1A B787               STA     MC0
0E1C BE83       XCMA1:  LDX     MTX0
0E1E D60100             LDA     PAGE1,X         ;GET A DGT OF R(X)
0E21 BE80               LDX     MTA0
0E23 D10100             CMP     PAGE1,X         ;CMP W/DGT OF R(A)
0E26 2701               BEQ     XCA2            ;CONTINUE IF EQUAL
0E28 81                 RTS                     ;ELSE CAN RETURN NOW.
0E29 3C80       XCA2:   INC     MTA0
0E2B 3C83               INC     MTX0
0E2D 3A87               DEC     MC0
0E2F 2AEB               BPL     XCMA1           ;MORE DIGITS?
0E31 4F                 CLRA                    ;THEN DO THEM
0E32 81                 RTS                     ;IF HERE ALL EQUAL
                ;                               ;RETURN ACCORDINGLY.
```

A15

```
                    ;
                    ;-----------------------------------------------------------
                    ;DO R(X) + R(A), RSLT TO R(X). RET CY/Z PER RSLT.
                    ;USES TEMPS MTA0,MTX0,MTX1,MC1,MF0, AND CALLS XCHK0 SR.
                    ;-----------------------------------------------------------
 0E33 B780  .XADDA: STA     MTA0
 0E35 BF83          STX     MTX0
 0E37 BF84          STX     MTX1            ;WILL NEED LATER
 0E39 A607          LDA     #NDGM1
 0E3B B788          STA     MC1             ;MUST DO ALL DIGITS
 0E3D 3F8A   XADA1: CLR     MF0             ;USE THIS FOR OVERFLOW DETECT
 0E3F BE83          LDX     MTX0            ;GET APPROPRIATE DIGIT
 0E41 D60107        LDA     PAGE1+NDGM1,X   ;FROM R(X)
 0E44 BE80          LDX     MTA0            ;POINT TO R(A)
 0E46 DB0107        ADD     PAGE1+NDGM1,X   ;ADD ITS VALUE
 0E49 BE83          LDX     MTX0            ;STORE IN R(X) AGN
 0E4B 2904          BHCS    XADA2           ;SEE IF HALF-CY
 0E4D A109          CMP     #9              ;OR > 9
 0E4F 2315          BLS     XADA4           ;IF NEITHER THEN DONE THIS DIGIT
 0E51 AB06   XADA2: ADD     #6              ;ELSE MUST CORRECT
 0E53 A40F   XADA3: AND     #$F             ;MASK OFF HI NYBBLE
 0E55 3C8A          INC     MF0             ;SHOW OVERFLOW THIS DIGIT
 0E57 3D88          TST     MC1
 0E59 270B          BEQ     XADA4           ;AND SKIP CY OP IF JUST DID MSD
 0E5B B78B          STA     MF1
 0E5D D60106        LDA     PAGE1+NDGM2,X   ;ELSE THIS CAUSES DECIMAL CY
 0E60 4C           INCA
 0E61 D70106        STA     PAGE1+NDGM2,X
 0E64 B68B          LDA     MF1
 0E66 D70107  XADA4: STA    PAGE1+NDGM1,X   ;REPLACE THIS DIGIT
 0E69 3A83          DEC     MTX0
 0E6B 3A80          DEC     MTA0
 0E6D 3A88          DEC     MC1             ;SEE IF MORE DIGITS
 0E6F 2ACC          BPL     XADA1           ;AND LOOP IF SO
 0E71 BE84          LDX     MTX1            ;NEED FOR .XCHK0
 0E73 3D8A   XASX:  TST     MF0             ;SEE IF WAS OVERFLOW LAST TIME
 0E75 2605          BNE     XADA5           ;THEN OVFLW EXIT
 0E77 CD0D9B        JSR     .XCHK0          ;ELSE SET/RESET Z CONDITION
 0E7A 98            CLC                     ;AND NORMAL EXIT
 0E7B 81            RTS
 0E7C CD0D9B XADA5: JSR     .XCHK0          ;SET/RESET Z
 0E7F 99            SEC                     ;AND EXIT W/OVERFLOW
 0E80 81            RTS
                    ;
                    ;
                    ;-----------------------------------------------------------
                    ;DO R(X) - R(A), RSLT TO R(X). UNDERFLOW RET CY.
                    ;USES TEMPS MTA0,MTX0,MTX1,MC1,MF0. ALSO CALLS XCHK0 SR.
                    ;-----------------------------------------------------------
 0E81 B780  .XSUDA: STA     MTA0
 0E83 BF83          STX     MTX0
```

A16

```
0EB5 BF84              STX     MTX1            ;MUST PRESERVE THIS
0EB7 A607              LDA     #NDGM1
0E89 B788              STA     MC1             ;MUST DO ALL DIGITS
0EBB 3F8A    XSBA1:    CLR     MF0             ;WILL SHOW UNDRFLW EACH DGT
0EBD BE83              LDX     MTX0            ;GET APPROPRIATE DIGIT
0EBF D60107            LDA     PAGE1+NDGM1,X   ;FROM R(X)
0EC2 BE80              LDX     MTA0            ;POINT TO R(A)
0EC4 D00107            SUB     PAGE1+NDGM1,X   ;SUBTRACT ITS VALUE
0EC7 BE83              LDX     MTX0            ;STORE IN R(X) AGN
0EC9 AA00              ORA     #0              ;RESTORE FLAGS
0ECB 2A15              BPL     XSBA4
0ECD A006              SUB     #6              ;ELSE MUST CORRECT
0ECF A40F              AND     #$F             ;MASK MSNYBBLE
0ED1 3C8A              INC     MF0             ;UNDRFLW THIS DIGIT
0ED3 3D88              TST     MC1             ;SEE IF THIS WAS MSD
0ED5 270B              BEQ     XSBA4
0ED7 B78B              STA     MF1
0ED9 D60106            LDA     PAGE1+NDGM2,X
0EDC 4A                DECA
0EAD D70106            STA     PAGE1+NDGM2,X   ;ELSE THIS CAUSES DECIMAL BW
0EB0 B68B              LDA     MF1
0EB2 D70107  XSBA4:    STA     PAGE1+NDGM1,X   ;REPLACE THIS DIGIT
0EB5 3A83              DEC     MTX0
0EB7 3A80              DEC     MTA0
0EB9 3A88              DEC     MC1
0EBB 2ACE              BPL     XSBA1           ;SEE IF MORE DIGITS
0EBD BE84              LDX     MTX1            ;AND LOOP IF SO
0EBF 20B2              BRA     XASX            ;NEED FOR .XCHK0
                                               ;GOTO COMMON EXIT
        ;
        ;
        ;-----------------------------------------------------------
        ;MULTIPLY R(X) * R(A), RESULT TO R(X). RESULT IS EXPECTED TO FIT
        ;INTO ONE 10-DIGIT REGISTER. ON RETURN Z SET MEANS OK, NO OVERFLOW.
        ;Z CLEAR MEANS WAS OVERFLOW. IF SO, THE HIGH-ORDER 10 DIGITS WILL
        ;BE IN FPROD. USES BYTE TEMPS MTX2,CSXMA,MF2. USES BCD TEMPS
        ;MLPLR, MLCND,PPROD,FPROD. ALSO CALLS .XCPYA, .XCLR, .XADDA,
        ;.XSHL, AND .XCHK0 SUBROUTINES.
        ;-----------------------------------------------------------
0EC1 BF85    .XMLTA:   STX     MTX2            ;SAVE THE INCOMING MULTIPLICAND
0EC3 97                TAX
0EC4 A650              LDA     #MLPLR-PAGE1    ;COPY R(A) VALUE TO MLPLR
0EC6 CD0D65            JSR     .XCPYA          ;(THIS IS MULTIPLIER)
0EC9 BE85              LDX     MTX2
0ECB A658              LDA     #MLCND-PAGE1    ;COPY R(X) VALUE TO MLCND
0ECD CD0D65            JSR.    .XCPYA          ;(THIS IS THE MULTIPLICAND)
0ED0 AE60              LDX     #PPROD-PAGE1
0ED2 CD0DAB            JSR     .XCLR           ;CLEAR PPROD TO RECEIVE RESULTS
0ED5 A607              LDA     #NDGM1          ;(NO NEED TO CLR FPROD CUZ SHIFTS)
0ED7 B789              STA     MC2             ;DO FOLLOWING ALL TIMES
0ED9 3F8C    XMA1:     CLR     MF2             ;KEEP TRACK ADD OVERFLOW EACH DIGIT
0EDB BE89    XMA3:     LDX     MC2
```

A17

```
0EDD D60150            LDA    MLFLR,X
0EE0 4A                DECA
0EE1 D70150            STA    MLFLR,X      ;SEE IF DONE THIS DIGIT
0EE4 2B0D              BMI    XMA33        ;THEN SKIP
0EE6 AE60              LDX    #FPROD-PAGE1 ;ELSE REPEATED ADD OF MLCND TO FPROD
0EE8 A658              LDA    #MLCND-PAGE1
0EEA CD0E33            JSR    .XADDA
0EED 24EC              BCC    XMA3
0EEF 3C8C              INC    MF2          ;IF NO ADD OVERFLOW CONTINUE
0EF1 20E8              BRA    XMA3         ;ELSE MARK IT IN FLAG
0EF3 B68C       XMA33: LDA    MF2          ;CONTINUE THIS DIGIT
0EF5 AE60              LDX    #FPROD-PAGE1 ;NOW HAS #CYS FRM THIS DIGIT
0EF7 CD0DF6            JSR    .XROR
0EFA AE68              LDX    #FPROD-PAGE1 ;CONTENT OF MF2 TO MSD OF FPROD
0EFC CD0DF6            JSR    .XROR        ;& ROTATE PPROD INTO FPROD
0EFF 3A89              DEC    MC2
0F01 2AD6              BPL    XMA1         ;SEE IF MORE DIGITS TO DO
0F03 AE68              LDX    #FPROD-PAGE1 ;YES, DO NEXT DIGIT
0F05 B685              LDA    MTX2         ;NOW MOVE RSLT FPROD TO ORIG MCND
0F07 CD0D65            JSR    .XCPYA
0F0A AE60              LDX    #PPROD-PAGE1
0F0C CC0D9B            JMP    .XCHK0       ;SEE IF ANY FINAL OVERFLOW
                                           ;WILL RTN Z IF OK, ELSE NZ
;
;-------------------------------------------------------------
;DIVIDE R(X) / R(A), RESULT TO R(X). WILL RETURN QUOTIENT IN R(X).
;Z CLR ON RETURN MEANS THERE IS A REMAINDER... IT WILL BE IN
;DIVDD REGISTER. THIS USES BYTE TEMPS MTX2,MTA1. USES BCD TEMPS
;DIVSR,DIVDD,FQUOT,FQUOT. ALSO CALLS .XCHK0, .XCMPA, .XCLR, .XINC,
;.XCPYA, .XSHL, AND .XSUBA SUBROUTINES.
;-------------------------------------------------------------
0F0F BF85      .XDIVA: STX    MTX2         ;SAVE INPUT DIVIDEND
0F11 B781              STA    MTA1         ;SAVE INPUT DIVISOR
0F13 97                TAX
0F14 CD0D9B            JSR    .XCHK0       ;SEE IF DIVISOR=0
0F17 2601              BNE    XDA11
0F19 81                RTS                 ;DIVSR=0! JUST RETURN NOW.
0F1A BE85       XDA11: LDX    MTX2         ;ELSE SEE WHICH IS BIGGER
0F1C B681              LDA    MTA1
0F1E CD0E14            JSR    .XCMPA
0F21 2611              BNE    XDA1         ;(OR PERHAPS SAME)
0F23 BE85              LDX    MTX2
0F25 CD0DAB            JSR    .XCLR        ;DIVIDEND=DIVISOR! QUOTIENT
0F28 BE85              LDX    MTX2         ; =1, REMAINDER =ZERO.
0F2A CD0DB9            JSR    .XINC
0F2D AE58              LDX    #DIVDD-PAGE1 ;FORCE QUOT (R(X))=1
0F2F CD0DAB            JSR    .XCLR        ;FORCE REMAINDER=0
0F32 2070              BRA    XDAX         ;AND DONE.
0F34 240E       XDA1:  BCC    XDA2
0F36 BE85              LDX    MTX2         ;DIVIDEND < DIVISOR
0F38 CD0DAB            JSR    .XCLR        ;FORCE QUOTIENT=0
```

```
            0F3B BE81                  LDX     MTA1
            0F3D A658                  LDA     #DIVDD-PAGE1    ;DIVISOR TO REMAINDER
            0F3F CD0D65                JSR     .XCPYA
            0F42 2060                  BRA     XDAX            ;AND DONE.
                            ;NORMAL DIVIDE. DIVIDEND   DIVISOR
            0F44 BE85       XDA2:      LDX     MTX2
            0F46 A658                  LDA     #DIVDD-PAGE1    ;MOVE DIVIDEND TO DIVDD
            0F48 CD0D65                JSR     .XCPYA
            0F4B AE60                  LDX     #FQUOT-PAGE1    ;USE FQUOT FOR INTERMEDIATE WORK
            0F4D CD0DAB                JSR     .XCLR
            0F50 AE68                  LDX     #FQUOT-PAGE1    ;QUOTIENT WILL FORM IN FQUOT
            0F52 CD0DAB                JSR     .XCLR
                            ;HERE ONLY FIRST TIME THRU FOLLOWING LOOP:
            0F55 3FBC       XDA5:      CLR     MF2             ;THIS WILL KEEP TRACK OF SHIFTS
            0F57 BE81                  LDX     MTA1
            0F59 A650                  LDA     #DIVSR-PAGE1    ;PUT ORIG DIVSR IN DIVSR
            0F5B CD0D65                JSR     .XCPYA
            0F5E C60150     XDA51:     LDA     DIVSR           ;SEE IF MSD DIVSR HAS DIGIT
            0F61 2614                  BNE     XDA52           ; THEN SKIP
            0F63 AE50                  LDX     #DIVSR-PAGE1
            0F65 CD0DD6                JSR     .XSHL
            0F68 3CBC                  INC     MF2             ;ELSE SHIFT DIVSR LEFT 1
            0F6A 20F2                  BRA     XDA51           ; KEEPING TRACK OF TIMES DONE
                            ;HERE SUCCEEDING TIMES THRU LOOP:    ; AND CHECK AGAIN
            0F6C 3DBC       XDA54:     TST     MF2             ;IF ANY SHIFTS REMAINING...
            0F6E 272D                  BEQ     XDA6
            0F70 AE50                  LDX     #DIVSR-PAGE1    ; SHFT DIVSR BACK RIGHT ONE PLACE
            0F72 CD0DF5                JSR     .XSHR
            0F75 3ABC                  DEC     MF2             ; AND KEEP TRACK RIGHT SHIFTS
                            ;HERE IF WILL BE DIGIT TO RSLT. CALC IT.
            0F77 AE58       XDA52:     LDX     #DIVDD-PAGE1    ;DIVDD IS = DIVSR...
            0F79 A660                  LDA     #FQUOT-PAGE1    ; CALC THIS RSLT DGT BY REPEATED SUBS
            0F7B CD0D65                JSR     .XCPYA          ;USE FQUOT FOR TEMP CALCS
            0F7E 3FBD                  CLR     MF3             ;THIS WILL ACCUMULATE SUBS/DIGIT
            0F80 AE60       XDA8:      LDX     #FQUOT-PAGE1
            0F82 A650                  LDA     #DIVSR-PAGE1
            0F84 CD0E81                JSR     .XSUBA          ;HOW MANY TIMES GOZINTA
            0F87 250B                  BCS     XDA7
            0F89 3CBD                  INC     MF3             ;KEEP TRACK THEREOF
            0F8B AE60                  LDX     #FQUOT-PAGE1
            0F8D A658                  LDA     #DIVDD-PAGE1
            0F8F CD0D65                JSR     .XCPYA          ;UPDATE DIVIDEND
            0F92 20EC                  BRA     XDA8
                            ;HERE TO PUT THIS DIGIT INTO RESULT:
            0F94 B68D       XDA7:      LDA     MF3             ;AND PUT #TIMES INTO QUOT
            0F96 AE68                  LDX     #FQUOT-PAGE1
            0F98 CD0DD7                JSR     .XROL
            0F9B 20CF                  BRA     XDA54           ;AND REPEAT
                            ;HERE WHEN DIVISOR SHIFTED BACK TO ORIG POSITION
            0F9D AE68       XDA6:      LDX     #FQUOT-PAGE1
            0F9F B685                  LDA     MTX2
```

```
0FA1 CD0D65              JSR     .XCPYA
0FA4 AE58        XDAX:   LDX     #DIVDD-PAGE1        ;MOVE QUOTIENT TO ORIG DIVIDEND
0FA6 CC0D9B              JMP     .XCHK0              ;WILL RETURN NZ IF ANY REMAINER
                 ;
                 ;-----------------------------------------------------
                 ;THIS CONVERTS AND TRANSFERS THE CONTENTS OF A 2-BYTE BINARY REGISTER
                 ;PER X INTO ANY OF THE 8-DIGIT BCD REGISTERS PER A. RETURN Z SET IF
                 ;VALUE IS ZERO. DO NOT DESTROY ORIGINAL BYTE VALUE. THIS USES THE BDT
                 ;2-BYTE-BINARY TEMP, AND BYTE TEMPS MTA1,MTA2, AND BCD TEMPS BTAT0,BTAT1.
                 ;ALSO CALLS .XCLR, .XINC, .XADDA, AND .XCPYA SRS. ALL (AND ONLY) BINARY
                 ;BYTE REGISTERS ARE ON PAGE 0!
                 ;-----------------------------------------------------
0FA9 B781        .BXDA:   STA     MTA1                ;SAVE INDEX TO RCVNG BCD REGISTER
0FAB BF82                 STX     MTA2                ; AND TO INCOMING BINARY REGISTER
0FAD BE81                 LDX     MTA1
0FAF CD0DAB               JSR     .XCLR               ;CLEAR THE RCVNG BCD REG
0FB2 BE82                 LDX     MTA2
0FB4 F6                   LDA     ,X                  ;CHECK BINARY INPUT FOR ZERO...
0FB5 EA01                 ORA     1,X
0FB7 2601                 BNE     BXA4
0FB9 81                   RTS                         ;CAN QUIT NOW IF ALL ZERO.
0FBA F6          BXA4:    LDA     ,X                  ;ELSE MAKE COPY OF BINARY...
0FBB B78E                 STA     BDT
0FBD E601                 LDA     1,X
0FBF B78F                 STA     BDT+1
0FC1 AE50                 LDX     #BTAT0-PAGE1
0FC3 CD0DAB               JSR     .XCLR               ;SEED THE BTAT0 REGISTER
0FC6 AE50                 LDX     #BTAT0-PAGE1
0FC8 CD0DB9               JSR     .XINC               ;WITH "1"
0FCB AE0F                 LDX     #15                 ;PREP TO LOOP 16 TIMES
0FCD BF82                 STX     MTA2
0FCF 348E        BXA2:    LSR     BDT
0FD1 368F                 ROR     BDT+1
0FD3 2407                 BCC     BXA3                ;CHECK LSD OF BINARY VALUE
0FD5 BE81                 LDX     MTA1                ;SKIP AHEAD IF THIS DIGIT NOT ON
0FD7 A650                 LDA     #BTAT0-PAGE1        ; ELSE ADJUST DECIMAL RESULT
0FD9 CD0E33               JSR     .XADDA
0FDC AE50        BXA3:    LDX     #BTAT0-PAGE1
0FDE A658                 LDA     #BTAT1-PAGE1
0FE0 CD0D65               JSR     .XCPYA
0FE3 AE50                 LDX     #BTAT0-PAGE1
0FE5 A658                 LDA     #BTAT1-PAGE1
0FE7 CD0E33               JSR     .XADDA              ;DOUBLES BTAT1 VALUE
0FEA 3A82                 DEC     MTA2                ;DONE 16 TIMES?
0FEC 2AE1                 BPL     BXA2                ;AGN IF NOT
0FEE 81                   RTS                         ;ELSE ALL DONE.
                 ;
```

```
                    ;-----------------------------------------------------------
                    ;THIS IS THE INVERSE OF ABOVE. IT CONVERTS AND TRANSFERS THE CONTENTS
                    ;OF A 8-DIGIT BCD REGISTER PER X INTO A 2-BYTE BINARY REGISTER PER A.
                    ;USES BDT BINARY TEMP. RETURN Z SET IF VALUE IS ZERO. NO ERROR CHECKING!
                    ;ASSUME BCD# <65536. DO NOT DESTROY ORIGINAL BCD VALUE.
                    ;ALL BINARY REGISTERS ARE ON PAGE 0.
                    ;-----------------------------------------------------------
OFEF B7B1   .DXBA:  STA     MTA1            ;SAVE the binary index...
OFF1 BFB4           STX     MTX1            ; AND THE BCD INDEX...
OFF3 BEB1           LDX     MTA1
OFF5 7F            CLR     ,Y
OFF6 6F01           CLR     1,Y             ;CLEAR RCVNG BINARY
OFF8 BEB4           LDX     MTX1
OFFA CD0D9B         JSR     .XCHEQ          ;SEE IF INCOMING = 0
OFFD 2601           BNE     DXA1
OFFF 81             RTS                     ;IS ZERO, CAN QUIT NOW
1000 BEB4   DXA1:   LDX     MTX1
1002 A650           LDA     #BTAT0-PAGE1
1004 CD0D65         JSR     .XCPYA          ;ELSE COPY BCD INTO TEMP...
1007 AE50           LDX     #BTAT0-PAGE1
1009 BFB4           STX     MTX1            ;SAVE THE WORKING BCD INDEX...
100B 7FBE           CLR     BDT
100D A601           LDA     #1              ;SEED TEMP WITH 1
100F B7BF           STA     BDT+1
1011 CD103B         JSR     DBSUB           ;ADD 1'S DIGIT TO RESULT
1014 A60A           LDA     #10             ;SEED TEMP WITH 10
1016 B7BF           STA     BDT+1
1018 CD103B         JSR     DBSUB           ;ADD 10'S DIGIT TO RESULT
101B A664           LDA     #100            ;SEED TEMP WITH 100
101D B7BF           STA     BDT+1
101F CD103B         JSR     DBSUB           ;ADD 100'S DIGIT TO RESULT
1022 A603           LDA     #HIGH 1000
1024 B7BE           STA     BDT
1026 A6E8           LDA     #LOW 1000       ;SEED TEMP WITH 1000
1028 B7BF           STA     BDT+1
102A CD103B         JSR     DBSUB           ;ADD 1000'S DIGIT TO RESULT
102D A627           LDA     #HIGH 10000
102F B7BE           STA     BDT
1031 A610           LDA     #LOW 10000
1033 B7BF           STA     BDT+1           ;SEED TEMP WITH 10000
1035 CD103B         JSR     DBSUB           ;ADD 10000'S DIGIT TO RESULT
1038 A601           LDA     #1              ;SO NOT RETURN Z
103A 81             RTS                     ;AND DONE.
                    ;THIS SUB-SUBROUTINE USED ONLY BY DXBA: (NO ERROR CHECKS)
103B BEB4   DBSUB:  LDX     MTX1
103D CD0DF5         JSR     .XSHR           ;LSD FROM BCD TO A
1040 AA00           ORA     #0              ;SEE IF IT'S ZERO
1042 2712           BEQ     DBS3            ;THEN SKIP AHEAD
1044 B7B2           STA     MTA2            ;ELSE MOVE TO TEMP
1046 BEB1           LDX     MTA1            ;GET INDEX TO RCVND REG
1048 E601   DBS2:   LDA     1,X             ;AND ADD BDT TEMP TO IT
```

```
104A BB8F            ADD    BDT+1
104C E701            STA    1,X
104E F6              LDA    ,X               ;(BOTH BYTES)
104F B98E            ADC    BDT
1051 F7              STA    ,X
1052 3A82            DEC    MTA2             ;NEED MORE OF THIS DIGIT?
1054 26F2            BNE    DBS2             ;THEN DO AGAIN
1056 81      DBS3:   RTS                     ;AND DONE THIS DIGIT
             ;
             ;                   END         ;OF INCLUDE
             ;
             ;
             ;**********************************************
             ;ROUTINES TO GATHER DATA FROM THE KEYPAD...
             ;**********************************************
                     INCLUD C:SCNKYS.INC     ;NUMERIC KEYPAD FUNCTIONS
             ;THIS DOES EVERYTHING NECESSARY TO INPUT NUMERIC DATA FROM THE KEYPAD,
             ;PLACING IT IN RG0 AND DISPLAYING IT IN THE rightMOST POSITIONS OF THE
             ;LOWER LINE OF THE LCD. EXITS WITH CY-CLR FOR OK/FINE, CY-SET FOR CANCEL.
1057 A607    DGNI:   LDA    #%00000111
1059 B701            STA    PPB
105B AE31            LDX    #49              ;KEY PBLY STILL DN...
105D B600    WNFK:   LDA    PPA              ; WAIT TILL ALL RELEASED
105F A40F            AND    #%00001111
1061 26F4            BNE    DGNI
1063 5A              DECX
1064 2AF7            BPL    WNFK
             ;NOW SCAN THE NUMERIC KEYS:
1066 AE0C    DGN1:   LDX    #12              ;KEY I.D. COUNTER
1068 BFAE            STX    WDGK
106A AE31            LDX    #49              ;DEBOUNCE COUNTER
106C A604            LDA    #%00000100       ;START WITH 9 0 .
             ;DO THE FOLLOWING FOR EACH ROW OF 4 KEYS:
106E B701    DGN4:   STA    PPB              ;ACTIVATE ROW OF 4 KEYS
1070 3AAE            DEC    WDGK
1072 070008          BRCLR  3,PPA,DGN5       ;SKIP IF 4 8 / COLUMN INACTIVE
1075 0700EE  DGN8:   BRCLR  3,PPA,DGN1       ;FOUND 4 8 / COLUMN ACTIVE. DNRCE IT.
1078 5A              DECX
1079 2AFA            BPL    DGN8
107B 202E            BRA    .DKDN            ;GOT SOLID HIT. DO ACTION.
107D 3AAE    DGN5:   DEC    WDGK
107F 050008          BRCLR  2,PPA,DGN6       ;SKIP IF 3 7 . COLUMN INACTIVE
1082 0500E1  DGN9:   BRCLR  2,PPA,DGN1       ;FOUND 3 7 . COLUMN ACTIVE. DNRCE IT.
1085 5A              DECX
1086 2AFA            BPL    DGN9
1088 2021            BRA    .DKDN            ;GOT SOLID HIT. DO ACTION.
108A 3AAE    DGN6:   DEC    WDGK
108C 030008          BRCLR  1,PPA,DGN7       ;SKIP IF 2 6 0 COLUMN INACTIVE
108F 0300D4  DGNA:   BRCLR  1,PPA,DGN1       ;FOUND 2 6 0 COLUMN ACTIVE. DNRCE IT.
1092 5A              DECX
1093 2AFA            BPL    DGNA
```

```
 1095 2014              BRA   .DKDN       ;GOT SOLID HIT. DO ACTION.
 1097 3AAE       DGN7:  DEC   WDGH
 1099 010008            BRCLR 0,FFA,DGNR  ;SKIP IF 1 5 9 COLUMN INACTIVE
 109C 010007     DGNC:  BRCLR 0,FFA,DGN1  ;FOUND 1 5 9 COLUMN ACTIVE. DBNCE IT.
 109F 5A                DECX
 10A0 2AFA             BPL   DGNC
 10A2 2007             BRA   .DKDN
 10A4 3DAE       DGNR:  TST   WDGH        ;GOT SOLID HIT. DO ACTION.
 10A6 27BE             BEQ   DGN1         ;SEE IF TIME TO RESTART SCAN
 10A8 44               LSRA               ;THEN REDO FROM
 10A9 20C3             BRA   DGN4         ;ELSE CONTINUE SCAN NEXT ROW
                ;
                ;THIS IS USED ONLY BY THE ABOVE ROUTINE, AFTER A VALID KEYPRESS.
                ;WAIT LONG ENUFF TO REGISTER AN INTERRUPT IN CASE WAS FKEY...
 10AB AE14      .DKDN:  LDX   #20
 10AD 3FA9      DKD50:  CLR   GFT0
 10AF 0EA709    DKD51:  BRSET 7,FFF,DKD8   ;GOT INTERRUPT. WAS FKEY
 10B2 3AA9             DEC   GFT0          ;ELSE DELAY SOME MORE
 10B4 26F9             BNE   DKD51
 10B6 5A               DECX
 10B7 26F4             BNE   DKD50         ;MAKES ABOUT 50MSEC TOTAL
 10B9 206A             BRA   DKD7          ;IF NO INTERRUPT
                                           ;THEN WAS NKEY
                ;
                ;KEYPRESS WAS A FUNCTION KEY. FIND WHICH ONE...
                ;
 10BB 3FA7      DKD8:  CLR   FFF          ;WAS FKEY. RESET FLAG
 10BD 01A63E           BRCLR 0,FKEYS,DKD5 ;TEST FOR ENTER
                ;KEYPRESS WAS ENTER. IF DECIMAL WAS NOT ALLOWED. EXIT NOW.
                ;IF DECIMAL WAS ALLOWED, NORMALIZE TO E-3 AND EXIT...
                ;NEVER ACCEPT ZERO AS A VALID ENTRY...
 10C0 0EBA17    DKDZ:  BRSET 7,IDPF,DKDV   ;SKIP IF DP NOT ALLOWED
 10C3 06BA02           BRSET 3,IDPF,DKDG   ; ELSE NORMALIZE
 10C6 3CBA             INC   IDPF
 10C8 B6BA      DKDG:  LDA   IDPF
 10CA A40F             AND   #$F
 10CC B7BB             STA   IDF1
 10CE B6BA      DKDW:  LDA   IDPF         ;SAVE INITIAL DP POSTN
 10D0 A40F             AND   #$F
 10D2 B7BA             STA   IDPF
 10D4 A105             CMP   #5
 10D6 250B             BLO   DKDX         ;IDEAL DP POSITION FOR E-3
 10D8 221B             BHI   DKDY
 10DA AE0B      DKDV:  LDX   #RG0-PAGE1   ;ALL EXIT THRU HERE
 10DC CD0D9B           JSR   .XCHK0       ;DONT ALLOW ZERO ENTRY
 10DF 2720             BEQ   .DGNTR       ; (JUST MAKE START ENTRY AGN)
 10E1 98               CLC                ;ELSE = OK
 10E2 81               RTS
 10E3 AE0B      DKDX:  LDX   #RG0-PAGE1
 10E5 CD0DF9           JSR   .XSHR        ;TOO MANY PLACES RIGHT...
 10E8 A105             CMP   #5           ;ADJUST WITH ROUNDOFF...
 10EA 2505             BLO   OGLE
```

A23

```
10EC AE08              LDX     #RG0-PAGE1
10EE CD0DB9            JSR     .XINC
10F1 3CBA     OGLE:    INC     IDPP
10F3 20D9              BRA     DKDW              ;...TILL OK
10F5 AE08     DKDY:    LDX     #RG0-PAGE1
10F7 CD0DD6            JSR     .XSHL             ;TOO MANY PLACES LEFT...
10FA 3ABA              DEC     IDPP
10FC 20D0              BRA     DKDW              ;ADJUST TILL OK
              ;
10FE 03A61F   DKD5:    BRCLR   1,FKEYS,DKD6      ;TEST FOR CLEAR
              ;KEYPRESS WAS CLEAR. START FRESH WITH RG0...
              ;(THIS IS ALSO THE ENTRY POINT FOR THE WHOLE ROUTINE.)
1101 AE08     .DGNTR:  LDX     #RG0-PAGE1        ;WAS CLEAR.
1103 CD0DAB            JSR     .XCLR             ;CLR THE RG0 VALUE
1106 A604     .DGNOV   LDA     #%00000100        ;PREPARE THE LCD...
1108 CD11E3            JSR     .WDCTL            ;SET DSP DEC NTRY MODE
110B A60D              LDA     #%00001101
110D CD11E3            JSR     .WDCTL            ;TURN ON BLINK
1110 A6E7              LDA     #$C0+39
1112 CD11E3            JSR     .WDCTL            ;SET CP 40TH POS BTM LINE
1115 B6BA              LDA     IDPP
1117 A480              AND     #$80
1119 AA08              ORA     #8
111B B7BA              STA     IDPP
111D CD115F            JSR     .DGDSP            ;INIT DP-POSITION STUFF
1120 3FA7     DKD6:    CLR     FKF               ;FINALLY DSPLY RG0
1122 CC1057            JMP     DGNI              ;AND CONTINUE
              ;
              ;KEYPRESS WAS ONE OF THE NON-FUNCTION KEYS...
1125 B6AE     DKD7:    LDA     WDGP              ;RETRV KEYCODE
1127 A10A              CMP     #10               ;WAS DECIMAL OR BACKSPACE?
1129 2518              BLO     DKD2              ;SKIP AHEAD IF WAS DIGIT
112B 220A              BHI     DKD1              ;SKIP AHEAD IF WAS BACKSPACE
              ;
              ;KEYPRESS WAS DECIMAL POINT...
112D 0EBA2C            BRSET   7,IDPP,DKD5       ;DP MAY NOT BE ALLOWED AT ALL
1130 07BA29            BRCLR   3,IDPP,DKD5       ;ELSE ONLY 1 DP ALLOWED
1133 3ABA              DEC     IDPP              ;ELSE PUT A DP HERE
1135 2022              BRA     DKDR              ;DISPLAY AND DONE
              ;
              ;KEYPRESS WAS BACKSPACE...
1137 AE08     DKD1:    LDX     #RG0-PAGE1
1139 CD0DF5            JSR     .XSHR             ;DROP THE LSD OF RG0
113C 06BA1A            BRSET   3,IDPP,DKDR       ;TEST FOR DP...
113F 3CBA              INC     IDPP              ; IS DP, MOVE IT RIGHT...
1141 2016              BRA     DKDR              ;DISPLAY AND DONE.
              ;
              ;KEYPRESS WAS NUMBER 0-9. PUT IT INTO RG0...
1143 06BA08   DKD2:    BRSET   3,IDPP,DKD3       ;TEST FOR DP...
1146 3ABA              DEC     IDPP              ; IS DP, MOVE IT LEFT...
```

A24

```
1148 2604              BPL    DKD3
114A 3CBA              INC    IDFP                  ; BUT DONT ALLOW FAST Q
114C 200E              BRA    DKDS
114E 4C      DKD3:     INCA                         ;MUST XLATE KEY CUZ FUNNY MATRIX...
114F A10A              CMP    #10
1151 2501              BLO    DKD0
1153 4F                CLRA
1154 AE08    DKD0:     LDX    #RG0-PAGE1
1156 CD0DD7            JSR    .XROL                 ;MOVE DIGIT INTO LSD OF RG0
1159 CD115F  DKDR:     JSR    .DGDSP                ;DISPLAY FROM RG0
115C CC1057  DKDS:     JMP    DGNI                  ;AND GET ANOTHER KEY
             ;
             ;THIS IS USED ONLY BY THE ABOVE ROUTINES. IT DISPLAYS THE NUMBER FROM
             ;RG0 IN THE LOWER DISPLAY LINE. HANDLE LEAD-ZERO BLANKING.
             ;CURSOR IS ALRDY IN POSITION RIGHT OF LAST DIGIT...
115F A67F    .DGDSP:   LDA    #$7F
1161 CD11EF            JSR    .WDDAT                ;PUT A " "
1164 AE08              LDX    #RG0-PAGE1
1166 5F                CLRX
1167 D60108  DGD2:     LDA    RG0,X                 ;LEAD-ZERO BLANK SCAN
116A 260D              BNE    DGD5                  ;STOP BLANKING NON-ZERO DGT
116C A307              CPX    #7
116E 2709              BEQ    DGD5                  ;STOP BLANKING LSD DGT
1170 B3BA              CPX    IDFP
1172 2602              BNE    DGD1
1174 2003              BRA    DGD5                  ;STOP BLANKING DP DGT
1176 5C      DGD1:     INCX
1177 20EE              BRA    DGD2
1179 BFA9    DGD5:     STX    GPT0
117B AE07              LDX    #7
117D B3BA    DGD6:     CPX    IDFP                  ;TIME FOR DP?
117F 2605              BNE    DGD3
1181 A62E              LDA    #'.'                  ;YES. PUT IT.
1183 CD11EF            JSR    .WDDAT
1186 D60108  DGD3:     LDA    RG0,X                 ;NOW PUT DIGIT
1189 AA30              ORA    #'0'
118B CD11EF            JSR    .WDDAT
118E 5A                DECX
118F 2B04              BMI    DGDD
1191 B3A9              CPX    GPT0                  ;IN CASE ALL 8 SHOWN
1193 24E8              BHS    DGD6                  ;DSPLY DGTS UNBLANKED
1195 5C      DGDD:     INCX                         ;CUZ MIGHT BE DP
1196 A620    DGDX:     LDA    #' '                  ;FILL TO LEFT WITH BLANKS
1198 CD11EF            JSR    .WDDAT
119B 5A                DECX
119C 2AF9              BPL    DGDX
119E A6E7              LDA    #$C0+39
11A0 CD11E3            JSR    .WDCTL                ;SET CP 40TH POS BTM LINE AGAIN
11A3 81                RTS
             ;
             ;
```

A25

```
                        END                         ;OF INCLUDE
                    ;
                    ;
                    ;*************************************
                    ;ROUTINES TO DISPLAY DATA ON THE LCD...
                    ;*************************************
                        INCLUD   C:SCDISP.INC    ;ROUTINES FOR LCDS
                    ;These supercal routines are responsible for formatting data for
                    ;the dot-matrix display, and transmitting the data to it. THESE FIRST 2
                    ;basic routines MAKE USE OF A TINY SUBROUTINE THAT GETS INSTALLED INTO
                    ;RAM AT INIT. THIS ACTS LIKE AN INDEXED INDIRECT LDA INSTRUCTION...
                    ;
                    ;THIS IS MOVED INTO RAM BY INIT, THEN RUN FROM THERE AS .IILA
11A4 D60800         IILA:   LDA     ROMBAS,X
11A7 81                     RTS
                    ;
                    ;
                    ;EVERYTHING ELSE STAYS IN ROM...
                    ;
                    ;LOCATE A MESSAGE IN ROM...
                    ;ENTER WITH IILA INSTRUCTION ALRDY ADJUSTED TO START OF
                    ;MESSAGE TABLE. VARIABLE MNO ALRDY SET TO MESSAGE # (BASE 0)
11A8 5F             ;EXIT WITH A=HIGH MBASE, X=LOW MBASE. VARIABLE MLG=LNGTH
11A9 CD0200         .MLOC:  CLRX
11AC 2703           ML00:   JSR     .IILA           ;COUNT CHARS IN X
11AE 5C                     BEQ     ML01            ;GET NXT CHAR VIA IILA IN RAM
11AF 20FB                   INCX                    ;EXIT IF END CODE
11B1 3AB3                   BRA     ML00
11B3 2B11           ML01:   DEC     MNO             ;ELSE KEEP LOOKING FOR END CODE
11B5 5C                     BMI     ML02            ;OUR MESSAGE?
11B6 9F                     INCX                    ; THEN EXIT
11B7 CB0202                 TXA                     ;ELSE SCAN NEXT MESSAGE
11BA C70202                 ADD     .IILA+2
11BD 4F                     STA     .IILA+2         ;AFTER ADJUST MESSAGE BASE
11BE C90201                 CLRA
11C1 C70201                 ADC     .IILA+1
11C4 20E2                   STA     .IILA+1
11C6 BFB5                   BRA     .MLOC
11C9 C60201         ML02:   STX     MLG             ;STORE MESSAGE LENGTH
11CB CE0202                 LDA     .IILA+1         ;MAKE A=HIGH MBASE
11CE 81                     LDX     .IILA+2         ; AND X=LOW MBASE
                            RTS                     ;AND DONE.
                    ;
                    ;DISPLAY CHARACTERS FROM ROM TO LCD...
                    ;ENTER WITH "CURSOR" POSITION ALRDY SET AT END CHAR, ADDRESS IN
                    ;.IILA INSTRUCTION ALREADY ADJUSTED TO FIRST CHAR OF MSG.
                    ;X=MSG LNG-1 (I.E. X POINTS TO END CHAR IN MSG)
                    ;THIS WRITES FROM RIGHT TO LEFT... CHARS IN REV ORDER...
1CF A604            .XMSG:  LDA     #%00000100
1D1 CD11E3                  JSR     .WDCTL          ;SET TO DEC CP
```

A26

```
11D4 A60C            LDA      #%00001100
11D6 CD11E3          JSR      .WDCTL             ;TURN CURSOR OFF
11D9 CD0200    XMS0: JSR      .IILA              ;GET ROM DATA BYTE
11DC CD11EF          JSR      .WDDAT             ;DISPLAY A CHARACTER
11DF 5A              DECX
11E0 2AF7            BPL      XMS0               ;CONTINUE FOR ALL 32 CHARS
11E2 81              RTS
                     ;
                     ;
                     ;
                     ;THESE ARE ELEMENTARY 1-CHARACTER DISP ROUTINES. .WDCTL WAITS FOR
                     ;NOT BUSY, THEN SENDS A CONTROL BYTE FROM A. DCTL DOES THIS IMMED.
11E3 CD11FB   .WDCTL: JSR     .WDNB              ;WAIT FOR NOT BUSY, VIA SUBR
11E6 B701     DCTL:  STA      PPB                ;PUT DATA ON PPB LINES
11E8 1900            BCLR     4,PPA              ;RS LOW FOR CTRLS
11EA 1A00            BSET     5,PPA              ;PULSE THE ENABLE LINE
11EC 1B00            BCLR     5,PPA
11EE 81              RTS
                     ;
                     ;.WDDAT WAITS FOR NOT BUSY, THEN SENDS A DATA BYTE FROM A.
                     ;DDAT DOES THIS IMMEDIATELY.
11EF CD11FB   .WDDAT: JSR     .WDNB              ;WAIT FOR NOT BUSY VIA SUBR
11F2 B701     DDAT:  STA      PPB                ;PUT DATA ON PPB LINES
11F4 1800            BSET     4,PPA              ;RS HIGH FOR DATA
11F6 1A00            BSET     5,PPA              ;PULSE ENABLE LINE
11F8 1B00            BCLR     5,PPA
11FA 81              RTS
                     ;
                     ;THIS IS USED BY BOTH ABOVE. IT WAITS UNTIL THE LCD IS NOT BUSY
11FB B7B0     .WDNB: STA      LXT0               ;SAVE A REGISTER
11FD 3F05            CLR      DDRB               ;MUST MAKE PPB INPUTS
11FF 1900            BCLR     4,PPA              ;WILL READ CTRL REGISTER
1201 1C00            BSET     6,PPA              ;R/W HIGH TO READ FROM LCD
1203 1A00     WNB0:  BSET     5,PPA              ;SET ENABLE HIGH
1205 B601            LDA      PPB                ;GET THE LCD DATA
1207 1B00            BCLR     5,PPA              ;DEENABLE
1209 4D              TSTA
120A 2BF7            BMI      WNB0               ;BUSY AS LONG AS B7=1
120C 1D00            BCLR     6,PPA              ;R/W LOW TO WRITE AGAIN
120E 3A05            DEC      DDRB               ;PPB REVERTS TO OUTPUTS
1210 B6B0            LDA      LXT0               ;RESTORE A
1212 81              RTS                         ;READY TO XMIT
                     ;
                     ;
                     ;THIS JUST CLEARS THE UPPER MESSAGE LINE TO ALL BLANK
1213 A680     UCLR:  LDA      #$80
1215 2002            BRA      XDC0               ;GOTO COMMON ROUTINE
                     ;THIS CLEARS THE LOWER LINE DITTO...
1217 A6C0     LCLR:  LDA      #$C0
                     ;COMMON EXIT FOR BOTH ABOVE...
1219 CD11E3   XDC0:  JSR      .WDCTL             ;SET CURSOR BEGIN LINE
```

```
121C A606              LDA      #%00000110
121E CD11E3            JSR      .WDCTL        ;SET CP MOVE RIGHT
1221 A60C              LDA      #%00001100
1223 CD11E3            JSR      .WDCTL        ;TURN CURSOR OFF
1226 A620              LDA      #' '          ;BLANK CHAR
1228 AE27              LDX      #LLM1         ;LINE-LNGTH - 1
122A CD11EF    XDC1:   JSR      .WDDAT        ;STORE THE CHARACTER
122D 5A                DECX
122E 2AFA              BPL      XDC1          ;CONTINUE WHOLE LINE
1230 81                RTS                    ;THEN DONE.
                       ;
                       ;
                       ;THIS ROUTINE DISPLAYS ONE OF THE GENERIC MESSAGES CENTERED ON THE
                       ;UPPER DISPLAY LINE. ENTER WITH A = MESSAGE #.
1231 B7B3      .DGM:   STA      MNO           ;STORE MSG NO.
1233 A608              LDA      #HIGH .ULM    ;MESSAGE-TABLE BASE
1235 AE3C              LDX      #LOW .ULM
1237 2008              BRA      DUX           ;GOTO COMMON EXIT
                       ;LIKE ABOVE, BUT DISPLAYS ONE OF THE FLUID/model# MESSAGES PER FLTP
1239 86A8      .DFT:   LDA      FLTP
123B B7B3              STA      MNO
123D A60B              LDA      #HIGH .FTM
123F AE13              LDX      #LOW .FTM
                       ;COMMON EXIT FOR BOTH ABOVE... CENTERS & DSPLYS MESSAGE
1241 C70201    DUX:    STA      .IILA+1       ;ADJUST ADDR IN RAM ROUTINE
1244 CF0202            STX      .IILA+2
1247 CD11A8            JSR      .MLOC
124A C70201            STA      .IILA+1       ;LOCATE THE MESSAGE IN TABLE
124D CF0202            STX      .IILA+2       ;PUT MSG BASE IN DSP ROUTINE
1250 A693              LDA      #$80+19
1252 B7B6              STA      DCP
1254 CD1213            JSR      UCLR          ;DCP = CTR TOP LINE
1257 2022              BRA      DXX           ;CLEAR UPPER LINE
                                              ;GOTO COMMON EXIT
                       ;
                       ;
                       ;SIMILAR TO ABOVE, BUT DISPLAYS ONE OF THE KEY-LABEL MESSAGES ON
                       ;THE LOWER LINE. ENTER WITH X=MSG# BASE 0, A=LABEL# BASE 0...
                       ;ASSUMES AREA IS ALREADY BLANK.
1259 BFB3      DLKL:   STX      MNO           ;SAVE MSG#
125B B7B6              STA      DCP
125D 48                LSLA
125E 48                LSLA                   ;MULT LBL # * 10
125F 48                LSLA
1260 BBB6              ADD      DCP
1262 BBB6              ADD      DCP
1264 ABC4              ADD      #$C0+4
1266 B7B6              STA      DCP           ;DCP = CTR DESIRED LABEL
1268 A60A              LDA      #HIGH .FLM
126A C70201            STA      .IILA+1
126D A6C1              LDA      #LOW .FLM
126F C70202            STA      .IILA+2
```

A28

```
1272 CD11A8              JSR     .MLOC           ;FIND THE MESSAGE
1275 C70201              STA     .IILA+1         ;PUT MSG BASE IN DSP ROUTINE
1278 CF0202              STX     .IILA+2
               ;COMMON EXIT FOR ABOVE ROUTINES...
127B B6B5       DXX:     LDA     MLG             ;CALC POS LAST CHAR
127D 44                  LSRA
127E BBB6                ADD     DCP
1280 CD11E3              JSR     .WDCTL          ;SET "CURSOR" POSITION
1283 BEB5                LDX     MLG             ;MAKE X=END CHAR OFFSET
1285 5A                  DECX
1286 CC11CF              JMP     .XMSG           ;AND DISPLAY IT.
               ;
               ;
               ;THIS WILL DISPLAY ALL FOUR OF THE KEY LABELS, INCLUDING ANY
               ;BLANK ONES. ENTER WITH A(HI)=LBL# FOR KEY#1, A(LO)=LBL# FOR KEY#2,
               ;X(HI)=LBL# FOR KEY#3, AND X(LO)=LBL# FOR KEY#4
1289 B7A4       .D4KL:   STA     GBT             ;SAVE INDEX
128B BFA5                STX     GBT+1
128D CD1217              JSR     LCLR            ;CLEAR THE LOWER LINE
1290 3FB4                CLR     KLN
1292 4F         D4K0:    CLRA
1293 AE03                LDX     #3
1295 38A5       D4K1:    LSL     GBT+1
1297 39A4                ROL     GBT
1299 49                  ROLA
129A 5A                  DECX
129B 2AF8                BPL     D4K1
129D 97                  TAX                     ;MAKE X=MSG#
129E B6B4                LDA     KLN             ; AND MAKE A=LBL#
12A0 CD1259              JSR     D1KL            ; AND DSPLY 1 LABEL
12A3 3CB4       D4K2:    INC     KLN             ;NEXT LABEL POS.
12A5 05B4EA              BRCLR   2,KLN,D4K0      ; 4 OF THEM
12A8 81                  RTS                     ; AND DONE.
               ;
               ;THIS IS USED ONLY TO DISPLAY THE SIGN-ON MESSAGE...
12A9 A6A7       .DSO:    LDA     #$80+LLM1
12AB CD11E3              JSR     .WDCTL          ;SET CP END TOP LINE
12AE AE27                LDX     #LLM1
12B0 D60D15     DSO1:    LDA     SOU,X
12B3 CD11EF              JSR     .WDDAT          ;WRITE TOP MESSAGE
12B6 5A                  DECX
12B7 2AF7                BPL     DSO1
12B9 A6E7                LDA     #$C0+LLM1
12BB CD11E3              JSR     .WDCTL          ;SET CP END BOT LINE
12BE AE27                LDX     #LLM1
12C0 D60D3D     DSO2:    LDA     SOL,X
12C3 CD11EF              JSR     .WDDAT          ;WRITE BOTTOM MESSAGE
12C6 5A                  DECX
12C7 2AF7                BPL     DSO2
12C9 81                  RTS
               ;
```

```
                        END             ;OF INCLUDE

;***************************************************
        ;ROUTINES TO ACTUALLY GENERATE THE CAL-RUN PULSES...
        ;***************************************************
                  INCLUD   C:SCCRUN.INC    ;ACTUAL PULSE-OUT ROUTINES
                  ;THIS DOES EVERYTHING NECESSARY TO DO A PULSE-GEN RUN. THE
                  ;COUNT AND RATE VALUES ARE IN CNT1 AND RAT1 BINARY REGISTERS.
12CA A600         .DOCRN: LDA    #0
12CC AE00                 LDX    #0
12CE CD1289               JSR    .D4KL           ;DSPLY BLANK LOWER LINE
                  ;FOR PROTO ONLY, PUT COUNT & RATE VALUES ON DISPLAY
12D1 A604                 LDA    #%00000100
12D3 CD11E3               JSR    .WDCTL          ;SET DISP TO DECREMENT
12D6 A6E7                 LDA    #$C0+39         ;SET CP RIGHT END 2ND ROW
12D8 CD11E3               JSR    .WDCTL
12DB AE92                 LDX    #RAT1
12DD A608                 LDA    #RG0-PAGE1
12DF CD0FA9               JSR    .BXDA           ;CNVT RAT1 TO BCD IN RG0
12E2 AE02                 LDX    #2
12E4 D6010D       VV0:    LDA    RG0+5,X
12E7 AA30                 ORA    #'0'
12E9 CD11EF               JSR    .WDDAT          ;DSPLY 3 DGTS RAT1 FROM RG0
12EC 5A                   DECX
12ED 2AF5                 BPL    VV0
12EF A620                 LDA    #' '
12F1 CD11EF               JSR    .WDDAT          ;DSPLAY BLANK TO SEPARATE
12F4 AE90                 LDX    #CNT1
12F6 A608                 LDA    #RG0-PAGE1
12F8 CD0FA9               JSR    .BXDA           ;CNVT CNT1 TO BCD IN RG0
12FB AE04                 LDX    #4
12FD D6010B       VV1:    LDA    RG0+3,X
1300 AA30                 ORA    #'0'
1302 CD11EF               JSR    .WDDAT          ;DSPLY 5 DGTS CNT1 FROM RG0
1305 5A                   DECX
1306 2AF5                 BPL    VV1
                  ;ALL ABOVE FOR PROTO ONLY, NOW MAIN PGM
1308 AE92                 LDX    #RAT1
130A A608                 LDA    #RG0-PAGE1
130C CD0FA9               JSR    .BXDA           ;CNVT RAT1 TO BCD IN RG0
130F AE10                 LDX    #RG1-PAGE1
1311 CD0DAB               JSR    .XCLR
1314 A605                 LDA    #5
1316 C70110               STA    RG1             ;MAKES RG1=50000000
1319 AE10                 LDX    #RG1-PAGE1
131B A608                 LDA    #RG0-PAGE1
131D CD0F0F               JSR    .XDIVA          ;MAKES RG1=50000000/RAT1
1320 AE1C                 LDX    #BTICK-ROMBAS
```

A30

```
1322 A608            LDA     #RG0-PAGE1      ;MAKES RG0=00000447
1324 CD0D80          JSR     .XROMA          ; FOR (TICK. SEC E-7) @ /32
1327 AE10            LDX     #RG1-PAGE1
1329 A608            LDA     #RG0-PAGE1
132B CD0F0F          JSR     .XDIVA          ;MAKES RG1=CLOCK COUNT E1
132E AE10            LDX     #RG1-PAGE1
1330 CD0DF5          JSR     .XSHR           ;MAKES RG1=CLOCK COUNT
1333 A105            CMP     #5              ;SEE IF ROUNDUP NEEDED
1335 2505            BLO     DOC1
1337 AE10            LDX     #RG1-PAGE1
1339 CD0DB9          JSR     .XINC           ;THEN DO IT
133C AE10   DOC1:    LDX     #RG1-PAGE1
133E A6A4            LDA     #GBT            ;CNVT BACK TO BINARY
1340 CD0FEF          JSR     .DXBA           ; IN GBT TEMP
1343 A60D            LDA     #TC32           ;TRY TO USE /32 CLOCK
1345 3DA4            TST     GBT             ; IF COUNT ONLY 1 BYTE
1347 2718            BEQ     DOC2
1349 A60E            LDA     #TC64           ;ELSE TRY TO USE /64
134B 34A4            LSR     GBT             ;AND HALF THE COUNT
134D 36A5            ROR     GBT+1
134F 3DA4            TST     GBT             ; IF COUNT ONLY 1 BYTE
1351 270E            BEQ     DOC2
1353 A60F            LDA     #TC128          ;ELSE MUST USE /128
1355 34A4            LSR     GBT             ;AND HALF THE COUNT
1357 36A5            ROR     GBT+1
1359 3DA4            TST     GBT             ;IN CASE STILL TOO BIG
135B 2704            BEQ     DOC2
135D AEFF            LDX     #$FF            ;THEN FORCE TO 255 COUNTDOWN
135F BFA5            STX     GBT+1
1361 B7B8   DOC2:    STA     TCTL
1363 B6A5            LDA     GBT+1
1365 B7B9            STA     TDAT            ;PUT IN TIMER PRIVATE REG.
;BINARY REGISTER TDAT NOW HAS THE REQUIRED COUNT TO PUT INTO THE
;TIMER COUNTDOWN REGISTER TO PRODUCE AN INTERRUPT AT HALF THE REQUIRED
;PERIOD. BINARY REGISTER PAIR CNT1 HAS THE REQUIRED PULSE COUNT.
;THE FOLLOWING CALCULATES THE NUMBER OF SYMBOLS NEEDED FOR THE ACTIVITY
;INDICATOR, DISPLAYS IT, AND PREPARES TO DECREMENT IT...
1367 3FB7            CLR     AICNT           ;CLEAR COUNTER TEMP
1369 AE90            LDX     #CNT1
136B A6A0            LDA     #AITMP
136D CD1418          JSR     .WCPY           ;MAKE COPY OF CNT1 TO USE
1370 A60F            LDA     #%00001111
1372 B7A2            STA     AIMSK
1374 A6FF            LDA     #%11111111
1376 B7A3            STA     AIMSK+1         ;SEED AIMSK TO 0000111111111111
1378 AE03            LDX     #3
137A 38A1   IAI1:    LSL     AITMP+1         ;FIND 4 HI BITS CNT1, PUT THEM
137C 39A0            ROL     AITMP           ; INTO 4 LO BITS OF AICNT
137E 2506            BCS     IAI8
1380 34A2            LSR     AIMSK           ;SHIFT MASK AT SAME TIME TO
1382 36A3            ROR     AIMSK+1         ; MATCH 4 MSBS OF AICNT
```

```
1384 20F4                BRA     IAI1
1386 39B7       IAI8:    ROL     AICNT           ;FINISH SHFTNG 4 MSBS INTO AICNT
1388 5A         IAI3:    DECX
1389 2B08                BMI     IAI2
138B 38A1                LSL     AITMP+1
138D 39A0                ROL     AITMP
138F 39B7                ROL     AICNT
1391 20F5                BRA     IAI3
                ;AICNT NOW HAS # OF STARS TO PUT ON DISPLAY. SHOW THEM.
1393 CD1487     IAI2:    JSR     .SETAI          ;SET UP THE STARS
                ;THE FOLLOWING CODE ACTUALLY GENERATES THE OUTPUT PULSE STREAM.
1396 CD1581              JSR     .TSTT           ;INIT & START TIMEE VIA SUBROUTINE
1399 8F                  WAIT                    ;BE SURE FIRST CYCLE IS FULL TIME
139A 1E00       DOC5:    BSET    7,PPA           ;LEADING EDGE TO DRIVE COIL
139C 8F                  WAIT                    ;WAIT NOW TIL MID CYCLE
139D 1F00                BCLR    7,PPA           ;TRAILING EDGE TO DRIVE COIL
                ;SEE IF TIME TO HIT ACTIVITY INDICATOR BY USING MASK ON CNT1...
139F B691                LDA     CNT1+1          ;LO BYTE FIRST
13A1 B4A3                AND     AIMSK+1
13A3 260B                BNE     DOC8            ;NON-ZERO = NOT TIME YET
13A5 B690                LDA     CNT1            ;ELSE MUST LOOK AT HI BYTE TOO
13A7 B4A2                AND     AIMSK
13A9 2605                BNE     DOC8
13AB A62D                LDA     #'-'            ;TIME TO SHOW ACTIVITY. WRITE A
13AD CD11EF              JSR     .WDDAT          ; BLANK TO THE DISPLAY.
13B0 3D91       DOC8:    TST     CNT1+1          ;DECREMENT CNT1 & CHK FOR ZERO
13B2 2606                BNE     DOC3
13B4 3D90                TST     CNT1
13B6 2707                BEQ     DOC4            ;BOTH BYTES ZERO IF DONE
13B8 3A90                DEC     CNT1            ;DECREMENT HI BYTE
13BA 3A91       DOC3:    DEC     CNT1+1          ;DECREMENT LO BYTE
13BC 8F                  WAIT                    ;WAIT NOW TILL FULL CYCLE
13BD 20DB                BRA     DOC5            ;COMPLETES ONE PULSE CYCLE
13BF CD158A     DOC4:    JSR     .TSTP           ;COUNT=0, ALL DONE. DISABLE TIMER
13C2 98                  CLC                     ;OK EXIT. MUST RTN WITH C CLR
13C3 81                  RTS                     ;AND FINISHED WITH RUN
                ;
                ;
                ;THESE USED TO PREPARE AND DO CALIBRATION OR CHECK RUNS...
13C4 A60D       .RCHK:   LDA     #$D             ;SAY "RNNG CHK STD BY"
13C6 AD16                BSR     RCKX            ;RUN CAL CHK PER CNT1/RATI
13C8 A60A       RCK1:    LDA     #10
13CA CD15C1              JSR     .ADLY           ;WAIT A SEC
13CD A60E                LDA     #$E
13CF CC143A              JMP     .BLOT           ;GET EDM RDNG...
                ;
13D2 A602       .RCL11:  LDA     #2              ;SAY "RNNG 1 OF 1"
13D4 200E                BRA     RCLX
                ;
13D6 A603       .RCL12:  LDA     #3              ;SAY "RNNG 1 OF 2"
13D9 200A                BRA     RCLX
```

A32

```
17DA A604            .RCL22: LDA    #4
17DC 201E                    BRA    RNX2              ;SAY "RNNG 2 OF 2"
                     ;
17DE B7AF            RCKX:   STA    CTXT
17E0 A60C                    LDA    #$C
17E2 2004                    BRA    RUNX              ;SAY "CLR EDM BTCH TTL"
                     ;
17E4 B7AF            RCLX:   STA    CTXT
17E6 A601                    LDA    #1
                     ;                                ;DSPLY "PLCE EDM INTO CAL MODE"
17E8 CD1231          .RUNX:  JSR    .DGM              ;MSG# ALRDY IN A
17EB A630                    LDA    #$30
17ED AE00                    LDX    #0
17EF CD1289                  JSR    .D4PL             ; AND "OK   "
17F2 CD1403          RNX1:   JSR    .WFKP             ;WAIT FOR OK OR CANCEL
17F5 00A602                  BRSET  0.FKEYS,RNX0      ;GOT "OK," RUN THE CAL(S)
17F8 20F8                    BRA    RNX1              ;OTHER FKEYS NOT DEFINED HERE.
                     ;CORRECT VALUES ALREADY PRESENT IN CNT1 AND RAT1 BINARY WORK REGISTERS.
17FA B6AF            RNX0:   LDA    CTXT
17FC CD1231          RNX2:   JSR    .DGM              ;DISPLAY "RNNG X OF X STD BY"
17FF CD12CA                  JSR    .DOCRN            ;DO THE RUN VIA A SUBROUTINE
1402 81                      RTS                      ;RETURN C CLR IF OK
                     ;
                     ;
                             END                      ;OF INCLUDE
                     ;
                     ;*********************
                     ;"OTHER" ROUTINES...
                     ;*********************
                             INCLUD C:SCMISC.INC      ;MISC SUBROUTINES
                     ;these miscellaneous subroutines are for the supercalibrator...
                     ;
                     ;WAIT FOR A FUNCTION-KEYPRESS & RETURN WITH THE VALUE IN FKEYS
1403                         IF     UDL
1403                 .WFKP:  NOP                      ;THIS VERSION FOR UDL TESTING
1403                         TST    FKP
1403                         BPL    .WFKP
1403                         CLR    FKP
1403                         RTS
1403                         ELSE
1403 8E              .WFKP:  STOP                     ;THIS VERSION FOR EPROM
1404 3FA7                    CLR    FKP
1406 81                      RTS
1407                         ENDIF
                     ;
                     ;COME HERE AFTER CHANGING THE ROM-FLUID/model #. DO WRAP IF NEEDED.
1407 B6A8            .FTCHK  LDA    FLTP              ;FLUID/MODEL...
1409 2B05                    BMI    FTC0              ;CHK FOR UNDERFLOW
140B A118                    CMP    #MAXFT            ;CHK FOR OVERFLOW
```

A33

```
140D 2206                BHI     FTC1
140F 81                  RTS                     ;OK AS IS. DONE.
1410 A618       FTC0:    LDA     #MAXFT          ;WAS UNDERFLOW...
1412 B7A8                STA     FLTP            ; MAKE MAX TYPE
1414 81                  RTS                     ; AND DONE.
1415 3FA8       FTC1:    CLR     FLTP            ;OVERFLOW... MAKE 0
1417 81                  RTS                     ; AND DONE.
                ;
                ;
                ;A SIMPLE BINARY-WORD COPY ROUTINE. ASSUMES SOURCE AND DEST
                ;ON PG0. ENTER WITH X=SOURCE ADDR, A=DEST ADDR
1418 B7A4       .WCPY:   STA     GBT
141A F6                  LDA     ,X
141B B7A5                STA     GBT+1
141D E601                LDA     1,X
141F BEA4                LDX     GBT
1421 E701                STA     1,X
1423 B6A5                LDA     GBT+1
1425 F7                  STA     ,X
1426 81                  RTS
                ;
                ;THIS TRANSFERS CNT2/RAT2 TO CNT1/RAT1, USED TWEEN CAL RUNS...
1427 AE94       .XFCR:   LDX     #CNT2
1429 A690                LDA     #CNT1
142B ADEB                BSR     .WCPY
142D AE96                LDX     #RAT2           ;XFER CNT2 TO CNT1
142F A692                LDA     #RAT1
1431 20E5                BRA     .WCPY           ;AND RAT2 TO RAT1
                ;
                ;THESE IS USED SEVERAL TIMES FOR DISPLAY FUNCTIONS...
1433 1EBA       .BLAT:   BSET    7,IDPP          ;DISALLOW DP ENTRY
1435 CD1231              JSR     .DGM
1438 200A                BRA     BLT0            ;DSPLY GEN MSG FER A
143A 1FBA       .BLOT:   BCLR    7,IDPP          ;ALLOW DP ENTRY
143C CD1231              JSR     .DGM
143F AE08                LDX     #RG0-PAGE1      ;DSPLY GEN MSG FER A
1441 CD0DAB              JSR     .XCLR
1444 A69A       BLT0:    LDA     #$9A            ;ALSO CLEAR FIRST
1446 AE00                LDX     #0
1448 CD1289              JSR     .D4KL           ;DSPLY "ENTER CLEAR   "
144B CC1106              JMP     .DGNOV          ;ALWAYS GOTO DGT ENTRY SR
                ;
144E A608       .RESHA   LDA     #RG0-PAGE1
1450 CC0FA9              JMP     .BXDA
                ;
                ;THIS IS USED TO XFER COUNT/RATE TO SHADOW REGISTERS...
1453 AE07       .TOSHA:  LDX     #7
1455 E690       TOS1     LDA     CNT1,X
1457 E798                STA     OOC1,X
1459 5A                  DECX
145A 2AF9                BPL     TOS1
```

```
145C 81                          RTS
                                 ;
                                 ;THIS IS THE INVERSE OF ABOVE...
145D AE07                .FRSHA: LDX      #7
145F E698                FRS1    LDA      OOC1,X
1461 E790                        STA      CNT1,X
1463 5A                          DECX
1464 2AF9                        BPL      FRS1
1466 81                          RTS
                                 ;
                                 ;THIS IS USED TWICE TO MULTIPLY RG0 = 1000...
1467 AE02                .R0E3:  LDX      #2
1469 BFA9                        STX      GPT0
146B AE08                RE30:   LDX      #RG0-PAGE1
146D CD0DD6                      JSR      .XSHL             ;SHIFT RG0 LFT 3X
1470 3AA9                        DEC      GPT0
1472 2AF7                        BPL      RE30
1474 81                          RTS
                                 ;
                                 ;THIS USED TWICE DURING TWEAK DATA-INPUT...
1475 AE2C                .GETCT: LDX      #DCCT-ROMBAS
1477 A608                        LDA      #RG0-PAGE1        ;GET cal-chk pulsecount FROM ROM
1479 CC0DB0                      JMP      .XROMA            ;TO RG0
                                                            ;RG0 NOW HAS cal-chk pulsecount
                                 ;
                                 ;THIS USED TWICE DURING TWEAK DATA-INPUT...
147C AE07                .CPYCR: LDX      #7                ;INIT XFER COUNTER
147E D60824              CCR0:   LDA      TCCK,X            ;GET VAL FROM ROM
1481 E790                        STA      CNT1,X            ;AND STORE TO RAM
1483 5A                          DECX
1484 2AF8                        BPL      CCR0
1486 81                          RTS                        ;DO THIS 7 MORE TIMES
                                 ;
                                 ;THIS SETS UP THE ACTIVITY INDICATOR IN BOTTOM LINE PER # IN AICNT
1487 A606                .SETAI: LDA      #%00000110
1489 CD11E3                      JSR      .WDCTL            ;SET DISP TO INCREMENT
148C A6C0                        LDA      #%11000000        ;SET BASE LEFT END 2ND ROW
148E CD11E3                      JSR      .WDCTL
1491 A6FF                        LDA      #$FF              ;"STAR"
1493 CD11EF              SAI0:   JSR      .WDDAT            ;WRITE THE STARS...
1496 3AB7                        DEC      AICNT
1498 2AF9                        BPL      SAI0
149A A604                        LDA      #%00000100
149C CD11E3                      JSR      .WDCTL            ;SET TO DECREMENT AGAIN TO ERASE STARS
149F A620                        LDA      #' '
14A1 CC11EF                      JMP      .WDDAT
                                 ;
                                 ;THIS DOES THE CORRECTION-FACTOR ADJUSTMENT DURING TWK-AGN PROCESS.
                                 ;IF (CF1<1 AND CF2>1 AND PERCENT DIF>5) OR (CF1>1 AND CF2<1 AND
                                 ;PERCENT DIF>5) THEN TO CF2 = CF2 * CF2, ELSE LEAVE ALONE.
                                 ;ON ENTRY X POINTS TO CF1 E-3, RG0 HAS CF2 E-3, RG6=1E-3
14A4 BFA9                .TWADJ: STX      GPT0              ;SAVE INDEX TO CF1
```

```
14A6 AE38          LDX    #RG6-PAGE1      ;INIT RG6 TO 1E-3
14A8 CD0DAB        JSR    .XCLR
14AB A601          LDA    #1
14AD C7013C        STA    RG6+4
14B0 AE08          LDX    #RG0-PAGE1      ;COMPARE CF2-1.000
14B2 A638          LDA    #RG6-PAGE1
14B4 CD0E14        JSR    .XCMPA
14B7 252F          BCS    TAD0
14B9 2603          BNE    TAD2
14BB CC1580        JMP    TADX
14BE BEA9    TAD2: LDX    GPT0            ;NO CORRECT IF CF2=1.000
14C0 A638          LDA    #RG6-PAGE1      ;CF2 1. SEE IF CF1 ALSO.
14C2 CD0E14        JSR    .XCMPA
14C5 2403          BCC    TAD3
14C7 CC1580        JMP    TADX
14CA BEA9    TAD3: LDX    GPT0            ;NO ADJUST IF CF2 1 AND CF1 1
14CC A640          LDA    #RG7-PAGE1      ;HAVE CF2 1 AND CF1 1...
14CE CD0D65        JSR    .XCPYA
14D1 AE40          LDX    #RG7-PAGE1      ;COPY CF1 TO C1DIF (RG7)
14D3 A638          LDA    #RG6-PAGE1
14D5 CD0EB1        JSR    .XSUBA
14D8 AE08          LDX    #RG0-PAGE1      ;MAKE C1DIF(RG7)=CF1-1
14DA A648          LDA    #RG8-PAGE1
14DC CD0D65        JSR    .XCPYA
14DF AE48          LDX    #RG8-PAGE1      ;COPY CF2 TO C2DIF (RG8)
14E1 A638          LDA    #RG6-PAGE1
14E3 CD0EB1        JSR    .XSUBA
14E6 2028          BRA    TAD1            ;MAKE C2DIF(RG8)=CF2-1
14E8 BEA9          LDX    GPT0            ;TO COMMON PROCESSING
14EA A638    TAD0: LDA    #RG6-PAGE1      ;CF2 1. SEE IF CF1 ALSO
14EC CD0E14        JSR    .XCMPA
14EF 2503          BCS    TAD6
14F1 CC1580        JMP    TADX
14F4 AE38          LDX    #RG6-PAGE1      ;NO ADJUST IF CF2 1 AND CF1 1
14F6 A640    TAD6: LDA    #RG7-PAGE1      ;HAVE CF2 1 AND CF1 1...
14F8 CD0D65        JSR    .XCPYA
14FB AE40          LDX    #RG7-PAGE1      ;MOVE 1.000 TO C1DIF (RG7)
14FD B6A9          LDA    GPT0
14FF CD0EB1        JSR    .XSUBA
1502 AE38          LDX    #RG6-PAGE1      ;MAKE C1DIF(RG7)=1.00-CF1
1504 A648          LDA    #RG8-PAGE1
1506 CD0D65        JSR    .XCPYA
1509 AE48          LDX    #RG8-PAGE1      ;MOVE 1.00 TO C2DIF (RG8)
150B A608          LDA    #RG0-PAGE1
150D CD0EB1        JSR    .XSUBA
1510 AE40    TAD1: LDX    #RG7-PAGE1      ;MAKE C2DIF(RG8)=1-CF2
1512 CD0D9B        JSR    .XCMP0
1515 2605          BNE    TAD7
1517 A601          LDA    #1
1519 C70141        STA    RG7+1
151C A601    TAD7: LDA    #1              ;ALWAYS CORRECT IF C1DIF(RG7)=0
```

```
151E B7A9              STA    GPT0
1520 AE48       TAD4:  LDX    #RG8-PAGE1
1522 CD0DD6            JSR    .XSHL
1525 3AA9              DEC    GPT0
1527 2AF7              BPL    TAD4                  ;MAKES CODIF(E-5) IN RG8
1529 AE48              LDX    #RG8-PAGE1
152B A640              LDA    #RG7-PAGE1
152D CD0F0F            JSR    .XDIVA                ;MAKE PCTDIF(E-2) IN RG8
1530 A600              LDA    #0
1532 C7013C            STA    RG6+4
1535 A602              LDA    #2
1537 C7013E            STA    RG6+6                 ;MAKE RG6=00000020
153A AE48              LDX    #RG8-PAGE1
153C A638              LDA    #RG6-PAGE1
153E CD0E14            JSR    .XCMPA                ;COMPARE PCTDIF(E-2)-00000020
1541 253D              BCS    TADX                  ;SKIP ADJUST IF PCTDIF<00000020
1543 AE08              LDX    #RG0-PAGE1            ;DO CF2^2
1545 A640              LDA    #RG7-PAGE1
1547 CD0D65            JSR    .XCPYA                ;COPY CF2 TO RG7
154A AE08              LDX    #RG0-PAGE1
154C A640              LDA    #RG7-PAGE1
154E CD0EC1            JSR    .XMLTA                ;DO CF2(RG0)=CF2*CF2 (SQUARED)
1551 A602              LDA    #2
1553 B7A9              STA    GPT0
1555 AE08       TADS:  LDX    #RG0-PAGE1            ;CORRECT DP AFTER SQUARING
1557 CD0DF5            JSR    .XSHR
155A 3AA9              DEC    GPT0
155C 2AF7              BPL    TADS
155E A604              LDA    #4
1560 C7013E            STA    RG6+6                 ;make rg6=00000040
1562 AE48              LDX    #RG8-PAGE1
1565 A638              LDA    #RG6-PAGE1
1567 CD0E14            JSR    .XCMPA                ;COMPARE PCTDIF(E-2)-00000040
156A 2514              BCS    TADX                  ;SKIP ADJUST IF PCTDIF<00000040
156C AE08              LDX    #RG0-PAGE1
156E A640              LDA    #RG7-PAGE1
1570 CD0EC1            JSR    .XMLTA                ;DO CF2(RG0)=CF2*CF2 AGAIN (CUBED)
1573 A602              LDA    #2
1575 B7A9              STA    GPT0
1577 AE08       TADC:  LDX    #RG0-PAGE1            ;CORRECT DP AFTER CUBING
1579 CD0DF5            JSR    .XSHR
157C 3AA9              DEC    GPT0
157E 2AF7              BPL    TADC
1580 81         TADX:  RTS                          ;AND DONE
                       ;
                       ;
                       END                          ;OF INCLUDE
                       ;
                       ;
```

```
                    ;************************************************
                    ;END OF SUBROUTINES. NEXT ARE INTERRUPT HANDLERS...
                    ;************************************************
                        INCLUD  C:SCTIME.INC        ;TIMER-INTERRUPT HANDLER(S)
                    ;The timer routines for this program are used during the pulse-train-
                    ;output functions, AND MISC TIMEOUTS. The PRESCALE value will be assumed
                    ;constant, and the COUNT value will be assumed valid in zpg variable
                    ;TDT.
                    ;
                    ;INITIALIZE THE TIMER AND START IT. CLEAR TIMER INT BIT,
                    ;ENABLE TIMER INT, SET FOR INTERNAL CLOCK, RESET PRESCALER AND SET DIV
                    ;RATIO PER TCTL, SET COUNTDOWN PER TDAT. THIS IS A SUBROUTINE, NOT AN
                    ;INTERRUPT HANDLER.
                    ;--------------------------------------------------
 1581 B6B8          .TSTT:  LDA     TCTL            ;ASSUME ALRDY HAS CTRL VALUE
 1583 B709                  STA     TIMCTL          ;SET TCR
 1585 B6B9                  LDA     TDAT            ;COUNT VALUE FROM VARIABLE
 1587 B708                  STA     TIMDAT          ;SET COUNT
                    ;(TIMER NOW RUNNING AND ITS INTERRUPT ENABLED)
 1589 81                    RTS                     ;RTN TO CALLER
                    ;
                    ;
                    ;THIS DISABLES THE TIMER BY SETTING ITS INTERRUPT MASK.
                    ;THIS IS A SUBROUTINE, NOT AN INTERRUPT HANDLER.
                    ;--------------------------------------------------
 158A B6B8          .TSTP:  LDA     TCTL            ;SAME VALUE AS ABOVE,
 158C AA40                  ORA     #%01000000      ; XCPT SET INT MASK
 158E B709                  STA     TIMCTL          ;DO IT
                    ;(TIMER CANNOT PRODUCE INTERRUPTS ANYMORE)
 1590 81                    RTS                     ;RTN TO CALLER
                    ;
                    ;
                    ;************************************************
                    ;THE SUPERCAL TIMER VECTOR POINTS HERE. COME HERE WHEN TIMER HITS
                    ;ZERO. THIS IS AN INTERRUPT SERVICE ROUTINE ONLY. THE TIMER WILL
                    ;RUN ON THE SYSTEM BUS-CYCLE CLOCK, WHICH WITH A 3.58 MHZ CRYSTAL
                    ;IS ABOUT 1.4 USEC. WILL COME HERE AT SOME MULTIPLE OF THIS AS
                    ;SPECIFIED BY THE COUNTER DATA.
                    ;************************************************
 1591 B6B8          .TICK:  LDA     TCTL            ;JUST LIKE STARTING TIMER
 1593 B709                  STA     TIMCTL          ; OVER AGAIN
 1595 B6B9                  LDA     TDAT
 1597 B708                  STA     TIMDAT          ;MAKES A 25MSEC INT INTERVAL
                    ;(TIMER NOW RUNNING AND ITS INTERRUPT ENABLED)
 1599 9A                    CLI
 159A 80                    RTI                     ;READY TO INTERRUPT PROC AGAIN
                    ;
                    ;THIS WAITS 15 SECONDS WITH INDICATOR, USED BETWEEN 2-PT CAL RUNS...
 159B A612          .W15:   LDA     #$12            ;SAY "TIME DLY... STD BY"
 159D CD1231                JSR     .DGM
 15A0 A600                  LDA     #0              ;AND BLANK BOTTOM LINE
```

A38

```
          15A2 AE00              LDX     #0
          15A4 CD1289            JSR     .D4HL
          15A7 A60E              LDA     #14
          15A9 B7B7              STA     AICNT
          15AB CD1487            JSR     .SETAI          ;SET UP ACTIVITY INDICATOR
          15AE A60E              LDA     #14             ;TIME 15 SECS
          15B0 B7A9              STA     GFI0
          15B2 A60A     W151:    LDA     #10
          15B4 CD15C1            JSR     .ADLY           ;IN 1-SEC INCREMENTS
          15B7 A62D              LDA     #'-'
          15B9 CD11EF            JSR     .WDDAT
          15BC 3AA9              DEC     GFI0            ;DEC THE ACTIVITY INDICATOR
          15BE 2AF2              BPL     W151            ;SEE IF MORE
          15C0 81               RTS                      ;ELSE DONE
                        ;
                        ;THIS SUBROUTINE WAITS FOR THE # OF tenths of SECONDS IN A...
                        ;I.E. IF NEED 10 SECONDS, ENTER WITH A=100. USES TIMER.
                        ;THIS SETS THE TIMER DIVIDE VARIABLE TO 128.
          15C1 B7B1     .ADLY    STA     ADT0            ;SAVE ENTRY VALUE
          15C3 A60F              LDA     #TC128          ;SET FOR /128
          15C5 B7B8              STA     TCTL
          15C7 A638              LDA     #TX10
          15C9 B7B9              STA     TDAT
          15CB A609     ADL1:    LDA     #9              ;WILL RSLT IN 10-MSEC TICK
          15CD B7B2              STA     ADT1            ;10 * 10MSEC = 0.1SEC
          15CF CD1581   ADL0:    JSR     .TSTT           ;START THE TIMER
          15D2 8F               WAIT                     ;HERE TILL TICK
          15D3 3AB2              DEC     ADT1            ;HAS BEEN 10 MSEC
          15D5 2AF8              BPL     ADL0
          15D7 3AB1              DEC     ADT0
          15D9 26F0              BNE     ADL1            ;HAS BEEN .1 SEC
          15DB CD158A            JSR     .TSTP           ;DONE OK. STOP TIMER,
          15DE 81               RTS                      ;AND DONE.
                        ;
                        ;
                                END                      ;OF INCLUDE
                        ;
                                INCLUD  C:SCIRQ.INC     ;EXT IRQ HANDLER(S)
                        ;************************************************
                        ;COME HERE IF EXTERNAL SUPERCAL INTERRUPT (EXTIV HERE)
                        ;************************************************
                        ;on supercalibrator external interrupt is caused by one of the
                        ;four function keys being pressed. This has already been debounced,
                        ;so all needed is to read PA, clear the 4 highest bits (not involved
                        ;with the keys), and store this in a database variable.
          15DF B600     .DDEXT:  LDA     PPA             ;READ ALL INPUT BITS AT ONCE
          15E1 A40F              AND     #%00001111      ;DON'T CARE ABOUT B4-B7
          15E3 B7A6              STA     FKEYS           ;PUT IN VARIABLE & DONE
          15E5 1EA7              BSET    7,FKF           ;ALSO SET A FLAG
          15E7 80               RTI
                        ;
```

A39

```
                        END                     ;OF INCLUDE
                ;
                ;************************************************
                ;END OF HANDLERS. NEXT PWR-UP/INIT SECTION...
                ;************************************************
                ;(COME HERE AT POWER-UP OR RESET)
                        INCLUD  C:SCINIT.INC    ;PWR-UP/RESET INIT
                ;THESE ARE THE POWER-UP/RESET OPERATIONS FOR THE GPI SUPERCALIBRATOR.
                ;RESET VECTOR POINTS HERE. THIS CODE INITS EVERYTHING FOR NORMAL OP-
                ;ERATION.
                ;
                ;PIA PORT FUNCTIONS AS FOLLOWS:
                ;PA0-PA3 ARE ALWAYS INPUTS FOR THE KEYPAD MATRIX...
                ;       PA0 = 0, 4, 8, F1
                ;       PA1 = 1, 5, 9, F2
                ;       PA2 = 2, 6, ., F3
                ;       PA3 = 3, 7, ., F4
                ;PA4-PA6 ARE ALWAYS OUTPUTS FOR THE LCD CONTROL LINES...
                ;       PA4 = LCD RS (HI=DATA, LO=CTRL)
                ;       PA5 = LCD ENA (PULSE HI TO STROBE)
                ;       PA6 = LCD R/W (HI=READ FRM LCD, LO=WRITE TO LCD)
                ;PA7 IS ALWAYS AN OUTPUT FOR THE CAL-COIL DRIVE SIGNAL
                ;       PA7 = CAL-COIL DRIVE
                ;
                ;PB0-PB2 ALWAYS OUTPUTS SHARED BY LCD DATA & KEYPAD STROBES...
                ;       PB0 = LCD D0 & KEYPAD STROBE 0, 1, 2, 3
                ;       PB1 = LCD D1 & KEYPAD STROBE 4, 5, 6, 7
                ;       PB2 = LCD D2 & KEYPAD STROBE 8, 9, .,
                ;PB3-PB7 ALWAYS OUTPUTS FOR REST OF LCD DATA...
                ;       PB3 = LCD D3
                ;       PB4 = LCD D4
                ;       PB5 = LCD D5
                ;       PB6 = LCD D6
                ;       PB7 = LCD D7
                ;
15E8 9B         .PINIT: SEI                     ;NO INTERRUPTS ALLOWED NOW
15E9 A600               LDA     #%00000000      ;LCD CTRLS & COIL INACTIVE
15EB B700               STA     PPA
15ED A6F0               LDA     #%11110000      ;AND SET PPA DATA DIRECTION
15EF B704               STA     DDRA            ;AS HALF IN, HALF OUT
15F1 A600               LDA     #%00000000      ;SET ALL OF PB LOW
15F3 B701               STA     PPB
15F5 A6FF               LDA     #%11111111
15F7 B705               STA     DDRB            ;AND INIT PPB AS OUTPUTS
                ;
                ;INITIALIZE THE TIMER VARIABLES. SET THE TIMER TO INTERRUPT
                ;AFTER 20MSEC, THEN START IT...
                ;(FOR LCD INIT, SPEC SAYS "MORE THAN 15 MSEC")...
15F9 A60F               LDA     #TCL09          ;SET UP /128 CTRL VALUE
```

```
15FB B7B8                       STA     TCTL
15FD A670                       LDA     #112
15FF B7B9                       STA     TDAT            ;COUNTDOWN VAL FOR 20MSEC @ /128
1601 CD1581                     JSR     .TSTT
                        ;
1604 9A                         CLI                     ;ENABLE MASTER INTERRUPT NOW
                        ;
                        ;MOVE THE DISPLAY SUBROUTINE INTO RAM, WHERE IT WILL BE RUN...
1605 AE03                       LDX     #3              ;MOVE 4 BYTES
1607 D611A4             MOV0:   LDA     IILA,X          ;FROM IILA IN ROM...
160A D70200                     STA     .IILA,X         ; TO .IILA IN RAM
160D 5A                         DECX
160E 2AF7                       BPL     MOV0
                        ;
                        ;NOW WAIT FOR THE END OF THE 20MSEC TIME PERIOD, STILL GOING ON.
1610 8F                         WAIT
                        ;
                        ;SEND THE FIRST INIT COMMAND TO THE LCD...
1611 A638                       LDA     #%00111000
1613 CD11E6                     JSR     DCTL            ;XMIT IMMEDIATELY
                        ;
                        ;SET THE TIMER TO INTERRUPT IN 5MSEC, THEN START IT & WAIT
                        ;(FOR LCD INIT, SPEC SAYS "MORE THAN 4.1 MSEC)...
1616 A61C                       LDA     #28             ;COUNTDOWN VAL FOR 5MSEC @ /128
1618 B7B9                       STA     TDAT
161A CD1581                     JSR     .TSTT
161D 8F                         WAIT
                        ;
                        ;SEND THE SECOND INIT COMMAND TO THE LCD...
161E A638                       LDA     #%00111000
1620 CD11E6                     JSR     DCTL            ;XMIT IMMEDIATELY
                        ;
                        ;SET THE TIMER TO INTERRUPT IN 200USEC, THEN START IT & WAIT
                        ;(FOR LCD INIT, SPEC SAYS "MORE THAN 100 US")...
1623 A601                       LDA     #1              ;COUNTDOWN VAL FOR 179USEC @ /128
1625 B7B8                       STA     TCTL
1627 CD1581                     JSR     .TSTT
162A 8F                         WAIT
                        ;
                        ;SEND THE THIRD INIT COMMAND TO THE LCD...
162B A638                       LDA     #%00111000
162D CD11E6                     JSR     DCTL            ;XMIT IMMEDIATELY
                        ;
                        ;SET THE TIMER TO INTERRUPT IN 200USEC, THEN START IT & WAIT
                        ;(FOR LCD INIT, SPEC SAYS "MORE THAN 100 US")...
1630 A601                       LDA     #1              ;COUNTDOWN VAL FOR 179USEC @ /128
1632 B7B8                       STA     TCTL
1634 CD1581                     JSR     .TSTT
1637 8F                         WAIT
                        ;
                        ;THE LCD IS NOW READY FOR THE REST OF THE INIT COMMANDS. DO THEM...
```

A41

```
                        ;(PER THE LCD SPEC)
1638 A638              LDA       #%00111000
163A CD11E6            JSR       DCTL              ;FUNCTION-SET IMMEDIATELY
163D A608              LDA       #%00001000
163F CD11E3            JSR       .WDCTL            ;DSP OFF AFTER BUSY
1642 A601              LDA       #%00000001
1644 CD11E3            JSR       .WDCTL            ;CLR DSP AFTER BUSY
1647 A604              LDA       #%00000100
1649 CD11E3            JSR       .WDCTL            ;SET ENTRY MODE DEC. NO SHFT
164C A60C              LDA       #%00001100
164E CD11E3            JSR       .WDCTL            ;DSP ON, NO CURSOR, NO BLINK
                    ;
                    ;THE LCD IS NOW READY TO RECIEVE DATA.
1651 CD158A            JSR       .TSTP             ;DISABLE TIMER INTERRUPT NOW
1654 3FA7              CLR       FKF               ;CLEAR ANY F-KEY REQUESTS
                    ;
                    ;
                    ;PUT SIGN-ON MESSAGE ON THE DISPLAY & WAIT 5 SEC
                    ;(BUT WATCH FOR FKEY, GO AHEAD IF HIT)
1656 CD12A9            JSR       .DSO              ;SHOW SIGN-ON MSG
1659 A631              LDA       #49               ;DELAY
165B B7A9              STA       GPT0
165D A601         SOD: LDA       #1                ;DELAY FOR 100 MSEC
165F CD15C1            JSR       .ADLY
1662 3DA7              TST       FKF               ;WATCH FOR FKEYPRESS
1664 2604              BNE       .STG1             ;CUT SHORT IF GOT ANY FKEY
1666 3AA9              DEC       GPT0              ;ELSE KEEP TIMING
1668 2AF3              BPL       SOD               ;FOR 5 SECONDS
                    ;
                    ;
                       END                         ;OF INCLUDE
                    ;
                    ;
```

A42

```
        ;*******************************************
        ;INIT ALL DONE! NOW BEGIN MAIN PROGRAM
        ;*******************************************
        ;TOP ENTRY POINT. CLEAR THE CNT/RAT VARIABLES & DFLT TO 1-PT CAL
        ;SAY "SET CAL PROCEDURE", ASK FOR "NEW" OR "TWEAK."
166A 9C      .STG1:  RSP
166B 3FA7            CLR     FKF             ;CLEAR FKEY FLAG
166D 3FAD            CLR     NPTS            ;1-PT DEFAULT
166F 3FBC            CLR     TAF             ;NEW TWK DEFAULT
1671 AE07            LDX     #7
1673 6F90    ST11:   CLR     CNT1,X          ;CLEAR THE CNT/RAT VARIABLES
1675 5A              DECX
1676 2AFB            BPL     ST11
1678 A600            LDA     #0
167A CD1231          JSR     .DGM            ;DSPLY "SEL CAL PROC"
167D A612            LDA     #$12
167F AEB0            LDX     #$B0
1681 CD1289          JSR     .D4KL           ; AND "FACCAL TWK TWKAGN"
        ;WAIT NOW FOR FUNCTION-KEY PRESS (DON'T COME BACK TILL GOT ONE.)
1684 CD1403  ST10:   JSR     .WFKP           ;VIA SUBROUTINE
        ;GOT FKEY. SEE WHICH...
1687 00A60C          BRSET   0,FKEYS,.NEWP   ;IF NEW CAL...
168A 03A603          BRCLR   1,FKEYS,ST12
168D CC17A8          JMP     .TWKP
1690 05A6F1  ST12:   BRCLR   2,FKEYS,ST10    ;IF REGULAR TWEAK...
1693 CC177C          JMP     .TWKA           ;IF TWK AGAIN...
        ;
        ;COME HERE AFTER GUY HIT F1 AT STEP 1 (I.E. WANTS NEW CALIBRATION)
        ;SAY fluid/model DESIG AND  SEL   CNCL...
1696 3FA8    .NEWP:  CLR     FLTP            ;START W/FIRST fluid/model
1698 A645            LDA     #$45
169A AE60            LDX     #$60
169C CD1289          JSR     .D4KL           ;DISPLAY FKEY LEGENDS "< S  >"
169F CD1239  NEW0:   JSR     .DFT            ;DISPLAY THE fluid/model DESIG
16A2 CD1403          JSR     .WFKP           ;WAIT FOR FKEYPRESS
16A5 00A608          BRSET   0,FKEYS,.BAKUP  ;WAS F1. PREVIOUS fluid/model.
16A8 02A615          BRSET   1,FKEYS,.SELCT  ;WAS F2. SELECT THIS fluid/model.
16AB 04A60A          BRSET   2,FKEYS,.AHEAD  ;WAS F3. NEXT fluid/model.
16AE 20EF            BRA     NEW0            ;F4 UNDEFINED HERE.
        ;
        ;COME HERE IF GUY WANTS PREVIOUS fluid/model...
16B0 3AA8    .BAKUP: DEC     FLTP            ;BACK UP ONE TYPE...
16B2 CD1407          JSR     .FTCHK          ;MAY HAVE TO WRAP AROUND
16B5 CC169F          JMP     NEW0            ;AND REDISPLAY
        ;
        ;COME HERE IF GUY WANTS NEXT fluid/model...
16B8 3CA8    .AHEAD: INC     FLTP            ;ADVANCE ONE TYPE...
16BA CD1407          JSR     .FTCHK          ;MAY HAVE TO WRAP AROUND
16BD CC169F          JMP     NEW0            ;AND REDISPLAY
        ;
        ;COME HERE IF GUY SELECTS DISPLAYED TYPE...
```

A43

```
                    ;(THIS MEANS PROCEED TO NEXT STEP)
                    ;MUST SEE IF WANTS DO NEW fluid/model (FLTP=MAXFT)
16C0 A618   .SELCT: LDA     #MAXFT
16C2 B1A8           CMP     FLTP
16C4                IF FLUID
16C4                        BEQ     SELNF            ;IF WANTS NEW TYPE
16C4 2703           ELSE
16C6                        BEQ     SCTP             ;IF WANTS NEW TYPE
16C6 CC1732         ENDIF
                            JMP     SELOF            ;IF WANTS EXISTING TYPE
16C9        ;*** HAS SELECTED NEW fluid/model. MUST GET DATA FROM KEYBOARD. ***
                    IF FLUID
            ;following step deleted from MODEL-# program...
16C9        SELNF:  LDA     #6
16C9                JSR     .DGM
16C9                LDA     #$20                     ;DSPLY "WILL NEED DATA"
16C9                LDX     #0
16C9        SNF0:   JSR     .D4KL                    ;AND "OK  "
16C9                JSR     .WFKP                    ;WAIT FOR FKEY
16C9                BRSET   0,FKEYS,SCTP             ;GOT "OK". NEXT STEP
16C9                BRA     SNF0                     ;OTHER FKEYS UNDEFINED HERE.
                    ENDIF
            ;MAKE CHOOSE 1PT OR 2PT...
16C9 A607   SCTP:   LDA     #7
16CB CD1231         JSR     .DGM
16CE A678           LDA     #$78                     ;DSPLY "SEL CAL TYPE"
16D0 AE00           LDX     #0
16D2 CD1289         JSR     .D4KL                    ; AND "1PT 2PT  "
16D5 3FAD   STP0:   CLR     NPTS                     ;DEFAULT TO 1-POINT
16D7 CD1403         JSR     .WFKP                    ;GET A FKEY
16DA 00A607         BRSET   0,FKEYS,NF1P             ;GUY WANTS 1-POINT CAL
16DD 3CAD           INC     NPTS                     ;SET TO 2-POINT CAL
16DF 02A602         BRSET   1,FKEYS,NF1P             ;GUY WANTS 2-POINT CAL
16E2 20F1           BRA     STP0                     ;OTHER FKEYS UNDEFINED HERE.
            ;FLAG NPTS NOW SET FOR 1PT (=0) OR 2PT (=1)
            ;MUST ENTER FIRST DATA PAIR REGARDLESS WHETHER 1PT OR 2PT...
            ;*** THIS HAS BEEN CHANGED ***
            ;to enter count, rate, count, rate:
16E4 AE98   NF1P:   LDX     #00C1
16E6 CD144E         JSR     .RESHA                   ;restore shadow for display
16E9 A608           LDA     #8
16EB CD1433         JSR     .BLAT                    ;DSPLY "ENTER COL-A VAL"
16EE AE08           LDX     #RG0-PAGE1               ; AND "0 ENTR CLR" & GET NUM
16F0 A690           LDA     #CNT1
16F2 CD0FEF         JSR     .DXBA
16F5 AE9A           LDX     #00R1                    ;CNVT COUNT TO BINARY IN CNT1
16F7 CD144E         JSR     .RESHA                   ;restore shadow for display
16FA A609           LDA     #9
16FC CD1433         JSR     .BLAT                    ;DSPLY "ENTER COL B VALUE"
16FF AE08           LDX     #RG0-PAGE1               ; AND "000 ENTR CLR"
1701 A692           LDA     #RAT1
```

```
1703 CD0FEF              JSR     .DXBA           ;CNVT RATE TO BINARY IN RAT1
                  ;NOW IF TO DO 2-PT CAL MUST GET OTHER SET OF VALUES FROM KEYPAD
1706 3DAD                TST     NPTS            ;NON-ZERO MEANS 2-PT
1708 2603                BNE     NF14
170A CC1757              JMP     .RUNCX          ;ONE POINT... GO AHEAD
                  ;MUST GET 2ND SET OF VALUES FOR 2-PT CAL...
                  ;*** THIS HAS BEEN CHANGED ***
                  ;to enter count, rate, count, rate:
170D AE9C         NF14:  LDX     #00C2
170F CD144E              JSR     .RESHA          ;restore shadow for display
1712 A60A                LDA     #$A             ;DSPLY "ENTER COL-D VALUE"
1714 CD1433              JSR     .BLAT           ; AND "000 ENTR CLR"
1717 AE08                LDX     #RG0-PAGE1
1719 A694                LDA     #CNT2
171B CD0FEF              JSR     .DXBA           ;CNVT RATE TO BINARY IN RAT2
171E AE9E                LDX     #00R2
1720 CD144E              JSR     .RESHA          ;restore shadow for display
1723 A60B                LDA     #$B             ;DSPLY "ENTER COL-D VALUE"
1725 CD1433              JSR     .BLAT           ; AND "000 ENTR CLR"
1728 AE08                LDX     #RG0-PAGE1
172A A696                LDA     #RAT2
172C CD0FEF              JSR     .DXBA           ;CNVT COUNT TO BINARY IN CNT2
172F CC1757              JMP     .RUNCX          ;RDY TO CALIBRATE ;COME HERE IF GUY SELECTS A ROM fluid/model.
                  ;FIRST GET THE COUNT1 AND RATE1 VALUES PER THE VALUE IN FLTP...
                  ;they are stored in ROM as CNT1,RAT1,CN2,RAT2, 2 bytes each.
                  ;transfer all 8 bytes, even tho 2nd pair may be unneeded...
1732 3FAD         SELOF: CLR     NPTS            ;DFLT TO 1-PT CAL
1734 BEA8                LDX     FLTP            ;GET fluid/model NUMBER
1736 58                  LSLX
1737 58                  LSLX
1738 58                  LSLX
1739 BFAB                STX     NNDX            ;MULT *8 TO FORM INDEX
173B BFA9                STX     GPT0            ;SAVE THIS FOR LATER USE
173D 3FAA                CLR     GPC0            ;WILL MODIFY THIS
173F BEA9         RRC0:  LDX     GPT0            ;INIT XFER COUNTER
1741 D60C55              LDA     .TFND,X
1744 BEAA                LDX     GPC0            ;GET VAL FROM ROM
1746 E790                STA     CNT1,X
1748 3CA9                INC     GPT0            ;AND STORE TO RAM
174A 3CAA                INC     GPC0
174C 07AAF0              BRCLR   3,GPC0,RRC0     ;DO THIS 7 MORE TIMES
                  ;SEE IF COUNT2 IS ZERO. IF SO, MEANS 1-POINT CAL THIS TIME
174F B694                LDA     CNT2
1751 BA95                ORA     CNT2+1
1753 2702                BEQ     .RUNCX          ;2 BYTES
1755 3CAD                INC     NPTS            ;SET FOR 2-POINT IF NON-0
```

A45

```
                    ;ALL ABOVE PROCS CONVERGE HERE.
                    ;DATA NOW LOADED INTO CNT/RAT. PREP TO RUN CAL(S)...
                    ;FIRST update the shadow registers...
1757 CD1453        .RUNCX: JSR     .TOSHA
                    ;THIS IS FOR REPEAT FUNCTION...
175A CD143D        RPT1:   JSR     .FRSHA
                    ;NOW TEST FOR 1-PT OR 2-PT AND ACT ACCORDINGLY
175D 3DAD                  TST     NPTS
175F 2609                  BNE     RC12                    ;NON-0 MEANS 2-PT ;SAYS 1-PT. DO CAL RUN #1 OF 1...
1761 CD13D2                JSR     .RCL11
1764 CD1907                JSR     .ALDON                  ;GOTO COMMON EXIT
1767 CC175A                JMP     RPT1                    ;IF HERE REPEAT THIS
                    ;
                    ;SAYS 2-PT. DO CAL RUN 1 OF 2...
176A CD13D6        RC12:   JSR     .RCL12
176D CD159B                JSR     .W15                    ;WAIT 15 SEC BEFORE 2ND RUN
                    ;NOW PREPARE AND DO 2ND CAL RUN
1770 CD1427                JSR     .XFCR                   ;XFER CNT2, RAT2 TO CNT1, RAT1
1773 CD13DA                JSR     .RCL22                  ;DO CAL RUN 2 OF 2
1776 CD1907                JSR     .ALDON                  ;SUCCESS. GOTO COMMON EXIT.
1779 CC175A                JMP     RPT1                    ;IF HERE REPEAT THIS
                    ;
                    ;THE "TWEAK-AGAIN" COMMAND FROM STEP 1 COMES HERE.
177C 1EBC          .TWKA:  BSET    7,TAF                   ;MARK FLAG FOR TWK-AGN
177E A613                  LDA     #$13
1780 CD1231                JSR     .DGM                    ;DSPLY "WILL NEED PREV CFS"
1783 A630                  LDA     #$30
1785 AE00                  LDX     #0
1787 CD1289                JSR     .D4KL                   ;AND "OK"
178A CD1403        TWA0:   JSR     .WFKP                   ;WAIT FOR FKEY
178D 01A6FA                BRCLR   0,FKEYS,TWA0            ;MUST BE "OK"
1790 A614                  LDA     #$14
1792 CD143A                JSR     .BLOT                   ;SAY "GET PREV LO-FLO CF"
1795 AE09                  LDX     #RG0-PAGE1
1797 A62B                  LDA     #RG4-PAGE1
1799 CD0D65                JSR     .XCPYA                  ;PREV LO CF NOW IN RG0
179C A615                  LDA     #$15                    ;MOVE IT TO RG4
179E CD143A                JSR     .BLOT                   ;SAY "GET PREV HI-FLO CF"
17A1 AE08                  LDX     #RG0-PAGE1
17A3 A630                  LDA     #RG5-PAGE1              ;PREV HI CF NOW IN RG0
17A5 CD0D65                JSR     .XCPYA                  ;MOVE IT TO RG5
                    ;
                    ;NOW PROCEED WITH TWEAK PROCEDURE...
                    ;
                    ;THE "TWEAK" COMMAND FROM STEP 1 COMES HERE.
17A8 CD147C        .TWKP:  JSR     .CPYCR                  ;COPY CNT-RAT FROM ROM
17AB CD13C4                JSR     .RCHK                   ;RUN THE FIRST CAL CHECK
17AE AE08                  LDX     #RG0-PAGE1              ;RG0 NOW HAS LO READING E-?
17B0 A618                  LDA     #RG2-PAGE1
```

A46

```
17B2 CD0D65            JSR     .XCPYA              ;XFER FIRST READING TO RG2
               ;FIRST OF TWO CAL-CHECK RUNS NOW DONE. EDM READING IN RG2 AS E-3
17B5 CD1427            JSR     .XFCR               ;XFER CNT2, RAT2 TO CNT1, RAT1
17B8 CD13C4            JSR     .RCHK               ;RUN THE 2ND CAL CHECK
17BB AE08              LDX     #RG0-PAGE1
17BD A620              LDA     #RG3-PAGE1
17BF CD0D65            JSR     .XCPYA              ;XFER 2ND READING TO RG3
               ;SECOND OF TWO CAL-CHECK RUNS NOW DONE. EDM READING IN RG3 AS E-3
               ;*** NEW REV 1.3 ***
               ;IF THE READING HAD NO DP, THEN EDM HAS =100 STRAP. MUST COMPENSATE BY
               ;SHIFTING BOTH RG2 AND RG3 RIGHT 2 PLACES.
17C2 B6BB              LDA     IDP1
17C4 A108              CMP     #8
17C6 260C              BNE     Z0
17C9 AE18              LDX     #RG2-PAGE1
17CA CD0DF5            JSR     .XSHR
17CD AE20              LDX     #RG3-PAGE1
17CF CD0DF5            JSR     .XSHR
17D2 2004              BRA     Z1
               ;IF THE READING HAD 1 DIGIT RIGHT OF DP, THEN EDM HAS =10 STRAP. MUST
               ;COMPENSATE BY SHIFTING RG2 AND RG3 RIGHT 1 PLACE.
17D4 A107       Z0:    CMP     #7
17D6 260A              BNE     Z2
17D8 AE18       Z1:    LDX     #RG2-PAGE1
17DA CD0DF5            JSR     .XSHR
17DD AE20              LDX     #RG3-PAGE1
17DF CD0DF5            JSR     .XSHR
               ;CAN NOW DECIDE IF NEED 1 OR 2 CAL RUNS BY COMPARING RG2/RG3.
               ;ALLOW A DIFFERENCE OF +/- 2 IN THE LSD IF OTHERWISE EQUAL.
               ;!!BUT FORCE 2 RUNS IF TAF SET, PER TWK-AGN!!
17E2 A601       Z2:    LDA     #1                  ;FORCE 2-PTS IF...
17E4 B7AD              STA     NPTS
17E6 0EBC69            BRSET   7,TAF,TWR1          ;DOING "TWK-AGN"
17E9 3AAD              DEC     NPTS                ;ELSE ASSUME 1-PT FIRST...
17EB AE18              LDX     #RG2-PAGE1
17ED A620              LDA     #RG3-PAGE1
17EF CD0E14            JSR     .XCMPA              ;COMPARE THE 2 READINGS
17F2 275E              BEQ     TWR1                ;GO AHEAD IF 2 READINGS SAME
17F4 250D              BCS     UU0                 ;UNEQUAL. MUST SEE HOW MUCH
17F6 AE18              LDX     #RG2-PAGE1          ;RG2 IS BIGGER...
17F8 A608              LDA     #RG0-PAGE1
17FA CD0D65            JSR     .XCPYA              ;COPY 2 TO 0, 3 TO 1
17FD AE20              LDX     #RG3-PAGE1
17FF A610              LDA     #RG1-PAGE1
1801 200B              BRA     UU1
1803 AE20       UU0:   LDX     #RG3-PAGE1          ;RG3 IS BIGGER...
1805 A608              LDA     #RG0-PAGE1
1807 CD0D65            JSR     .XCPYA              ;COPY 3 TO 0, 2 TO 1
180A AE18              LDX     #RG2-PAGE1
180C A610              LDA     #RG1-PAGE1
180E CD0D65     UU1:   JSR     .XCPYA              ;MAKES RG0 BIG, RG1 SMALL
```

A47

```
1811 AE07              LDX     #7
1813 D60108    UU2:    LDA     RG0,X
1816 DA0110            ORA     RG1,X
1819 2605              BNE     UU3                     ;FIND COMMON LSD OF 2 REGS
181B 5A                DECX                            ;GO ON WHEN FOUND
181C 2AF5              BPL     UU2
181E 2032              BRA     TWR1
1820 BFA9      UU3:    STX     GPT0                    ;SHLD NEVER BE HERE
1822 B6A9      UU4:    LDA     GPT0                    ;THIS IS POS OF REAL LSD
1824 A107              CMP     #7                      ;SHIFT BOTH RGS RIGHT...
1826 240E              BHS     UU5                     ; TO GET RID OF 0 LSDS
1828 AE08              LDX     #RG0-PAGE1
182A CD0DF5            JSR     .XSHR
182D AE10              LDX     #RG1-PAGE1
182F CD0DF5            JSR     .XSHR
1832 3CA9              INC     GPT0
1834 20EC              BRA     UU4
1836 AE08      UU5:    LDX     #RG0-PAGE1
1838 A610              LDA     #RG1-PAGE1
183A CD0E81            JSR     .XSUBA                  ;GET DIFF RG0-RG1=>RG0
183D AE10              LDX     #RG1-PAGE1
183F CD0DAB            JSR     .XCLR
1842 A603              LDA     #3
1844 C70117            STA     RG1+7                   ;MAKES RG1=3
1847 AE08              LDX     #RG0-PAGE1
1849 A610              LDA     #RG1-PAGE1
184B CD0E14            JSR     .XCMPA                  ;FINALLY DO RG0 CMP RG1
184E 2502              BCS     TWR1                    ;C SET MEANS DIFF < 3, 1PT
1850 3CAD              INC     NPTS                    ;ELSE DIFF >= 3, 2PT
               ;
               ;NEED 1-PT CAL FOR SURE.
               ;CALCULATE CURRENT PULSES/UNIT FACTOR FOR LOW POINT...
1852 CD1475    TWR1:   JSR     .GETCT                  ;GET cal-chk pulse ct...
1855 AE08              LDX     #RG0-PAGE1              ;from ROM to RG0 as E-3
1857 A618              LDA     #RG2-PAGE1
1859 CD0F0F            JSR     .XDIVA                  ;RG0 NOW HAS cal-chk-ct/READING=PP/UNIT
185C CD1467            JSR     .R0E3                   ;SHIFT LFT 3X TO MAKE (PP/UNIT)E-3
185F AE08              LDX     #RG0-PAGE1
1861 A618              LDA     #RG2-PAGE1
1863 CD0D65            JSR     .XCPYA                  ;COPY TO RG2, RG2 NOW PP/UNIT E-3
               ;NOW GET CORRECTION FACTOR FROM USER...
1866 3DAD              TST     NPTS                    ;SEE IF 2 POINTS FOR MESSAGE SELECTION
1868 2607              BNE     TWR10
186A A60F              LDA     #$F
186C CD143A            JSR     .BLOT                   ;SAY "GET NEW CORRECT FCTR"
186F 2005              BRA     TWR11                   ;GET KEY-IN CORRECT FCTR TO RG0 AS E-3
1871 A610      TWR10:  LDA     #$10
1873 CD143A            JSR     .BLOT                   ;SAY "GET NEW LO-FLO CORRECT FCTR"
               ;CAN NOW COMPUTE THE NEW COUNT VALUE TO USE FOR FIRST CAL RUN...
1876 0FBC05    TWR11:  BRCLR   7,TAF,TWR12
1879 AE28              LDX     #RG4-PAGE1              ;DO ADJUSTMENT IF TWR-AGAIN
```

A48

```
187B CD14A4              JSR     .TWADJ       ;ADJUSTS CF2LO IN RG0 IF NECESSARY
187E AE18        TWR12:  LDX     #RG2-PAGE1
1880 A608                LDA     #RG0-PAGE1
1882 CD0F0F              JSR     .XDIVA       ;MAKES RG2=REQD PULSES/UNIT
1885 AE34                LDX     #DCNU-ROMBAS
1887 A608                LDA     #RG0-PAGE1
1889 CD0D80              JSR     .XROMA       ;MAKES RG0=00000005
188C AE18                LDX     #RG2-PAGE1
188E A608                LDA     #RG0-PAGE1
1890 CD0EC1              JSR     .XMLTA       ;MAKES RG2=REQD n PULSES FOR LO CAL RUN
                         ;
                         ;RG2 NOW HAS REQUIRED # PULSES FOR LOW CAL RUN.
                         ;SEE IF 2 POINTS REQUIRED. IF SO, DO SAME CALCS FOR HI RUN...
1893 3DAD                TST     NPTS         ;NON-ZERO IF 2 REQUIRED
1895 2736                BEQ     TWRX         ;SKIP IF NOT
                         ;
                         ;NEED 2 POINTS. DO SAME CALCS FOR HI RUN...
1897 CD1475              JSR     .GETCT       ;GET cal-chk-count FRM ROM TO RG0
189A AE08                LDX     #RG0-PAGE1
189C A620                LDA     #RG3-PAGE1
189E CD0F0F              JSR     .XDIVA       ;RG0 NOW HAS chk-count/READING=PP/UNIT
18A1 CD1467              JSR     .R0E3        ;SHIFT LFT 3X TO MAKE (PP/UNIT)E-3
18A4 AE08                LDX     #RG0-PAGE1
18A6 A620                LDA     #RG3-PAGE1
18A8 CD0D65              JSR     .XCPYA       ;COPY TO RG3. RG3 NOW CURNT PP/UNIT
                         ;NOW GET CORRECTION FACTOR FROM USER...
18AB A611                LDA     #$11         ;SAY "GET HI-FLO CORR FCTR"
18AD CD143A              JSR     .BLOT        ;GET KEY-IN CORRECT FCTR TO RG0 AS E-3
18B0 0FBC05              BRCLR   7,TAF,TWR13
18B3 AE30                LDX     #RG5-PAGE1   ;DO ADJUSTMENT IF TWK-AGAIN
18B5 CD14A4              JSR     .TWADJ       ;ADJUSTS CF2HI IN RG0 IF NECESSARY
                         ;CAN NOW COMPUTE THE NEW COUNT VALUE TO USE FOR 2ND CAL RUN...
18B8 AE20        TWR13:  LDX     #RG3-PAGE1
18BA A608                LDA     #RG0-PAGE1
18BC CD0F0F              JSR     .XDIVA       ;MAKES RG3=REQD PULSES/UNIT
18BF AE34                LDX     #DCNU-ROMBAS
18C1 A608                LDA     #RG0-PAGE1
18C3 CD0D80              JSR     .XROMA       ;MAKES RG0=00000005
18C6 AE20                LDX     #RG3-PAGE1
18C8 A608                LDA     #RG0-PAGE1
18CA CD0EC1              JSR     .XMLTA       ;MAKES RG3=REQD n PULSES FOR HI CAL RUN
                         ;
                         ;COME HERE FOR EITHER 1-PT OR 2-PT...
                         ;COPY THE CAL-CHECK DEFAULTS TO COUNT/RATE AGAIN, AND THEN PUT
                         ;OUR NEW VALUES IN FOR COUNT1 AND COUNT2
18CD CD147C      TWRX:   JSR     .CPYCR       ;COPY DEFAULT COUNT/RATE VALUES AGAIN
18D0 AE18                LDX     #RG2-PAGE1
18D2 A690                LDA     #CNT1
18D4 CD0FEF              JSR     .DXBA        ;CNVRT NEW COUNT1 TO BINARY
18D7 3DAD                TST     NPTS         ;SEE IF NEED SECOND...
18D9 2707                BEQ     .TWCR        ;SKIP IF NOT
```

```
18DB AE20              LDX     #RG3-PAGE1
18DD A694              LDA     #CNT2
18DF CD0FEF            JSR     .DXBA               ;ELSE CNVT NEW COUNT2 TO BINARY

;NOW READY TO DO THE CAL RUNS FOR TWEAK.
                       ;FIRST DECIDE WHETHER 1 OR 2 RUNS NEEDED...

;FIRST update the shadow registers...
18E2 CD1453    .TWCR:  JSR     .TOSHA
                       ;THIS IS FOR REPEAT FUNCTION...
18E5 CD145D    RPT2:   JSR     .FRSHA
                       ;NOW SEE IF 1PT OR 2PT...
18E8 3DAD              TST     NPTS
18EA 2609              BNE     TCR2
                       ;NEED ONLY 1 POINT. DO IT.
18EC CD13D2            JSR     .RCL11              ;DO CAL RUN 1 OF 1
18EF CD1907            JSR     .ALDON              ;C CLR = SUCCESS. GOTO COMMON EXIT
18F2 CC18E5            JMP     RPT2                ;IF HERE DO AGAIN
                       ;NEED 2 POINTS. DO IT.
18F5 CD13D6    TCR2:   JSR     .RCL12              ;DO RUN 1 OF 2
18F8 CD159B            JSR     .W15                ;WAIT 15 SECONDS BEFORE SECOND RUN
18FB CD1427            JSR     .XFCR               ;TRANSFER CNT2, RAT2 TO CNT1, RAT1
18FE CD13DA            JSR     .RCL22              ;DO CAL RUN 2 OF 2
1901 CD1907            JSR     .ALDON
1904 CC18E5            JMP     RPT2                ;SUCCESS. GOTO COMMON EXIT.

;COME HERE AT SUCCESSFUL COMPLETION OF ANY PROCEDURE...
                       ;SAY "DONE, RESTORE ETC"
1907 CD159B    .ALDON  JSR     .W15                ;WAIT 15 SEC (EDM WILL FLASH)
190A A605              LDA     #5
190C CD1231            JSR     .DGM                ;THEN SHOW DONE MESSAGE
190F A6CD              LDA     #$CD
1911 AE00              LDX     #0
1913 CD1289            JSR     .D4PL               ; AND "OK"
1916 CD1403            JSR     .WFKP               ;WAIT FOR FKEY PRESS
1919 02A603            BRSET   1,FKEYS,ALD1        ;REPEAT ON FK1
191C CC166A            JMP     .STG1               ;ANY OTHER FK BACK TO TOP OF PGM.
191F 81        ALD1:   RTS

1920           PGEND   EQU     *
1120           USDROM  EQU     PGEND-ROMBAS        ;AMT OF ROM USED
06D6           FREROM  EQU     IVBAS-PGEND         ;AMT OF ROM AVAILABLE

;*********************************
```

```
                ;END OF CODE. SET UP VECTORS NOW
                ;*********************************
                ;
    1FF6        ORG     IVBAS           ;ORG OF VECTORS
                ;
    1FF6 1591   DW      .TICK           ;TIMER FROM WAIT MODE
    1FF8 1591   DW      .TICK           ;TIMER NORMAL (AWAKE)
    1FFA 15DF   DW      .DOEXT          ;EXT INTRPT (IRQ)
    1FFC 15E8   DW      .PINIT          ;SWI, NOT USED THIS PGM
    1FFE 15E8   DW      .PINIT          ;RESET
                ;
                ;
    0000        END
```

A51

| | | | | | | | | |
|---|---|---|---|---|---|---|---|---|
| | 0000 | .WCPY | 1418 | DCNU | 0834 | DSO2 | 12C0 |
| | 0000 | .WDCTL | 11E3 | DCP | 00B6 | DUMMY | 0100 |
| .ADLY | 15C1 | .WDDAT | 11EF | DCTL | 11E6 | DUX | 1241 |
| .AHEAD | 16B8 | .WDNB | 11FB | DDAT | 11F2 | DXA1 | 1000 |
| .ALDON | 1907 | .WFKP | 1403 | DDRA | 0004 | DXX | 127B |
| .BAKUP | 16B0 | .XADDA | 0E33 | DDRB | 0005 | ERAMB | 0080 |
| .BLAT | 1433 | .XCHK0 | 0D9B | DGD1 | 1176 | ERAMT | 03FF |
| .BLOT | 143A | .XCLR | 0DAB | DGD2 | 1167 | EXTIV | 1FFA |
| .BXDA | 0FA9 | .XCMPA | 0E14 | DGD3 | 1186 | FALSE | 0000 |
| .CPYCR | 147C | .XCPYA | 0D65 | DGD5 | 1179 | FKEYS | 00A6 |
| .D4KL | 1289 | .XDIVA | 0F0F | DGD6 | 117D | FFF | 00A7 |
| .DFT | 1239 | .XFCR | 1427 | DGDD | 1175 | FLTP | 00A8 |
| .DGDSP | 115F | .XINC | 0DB9 | DGDX | 1196 | FLUID | 0000 |
| .DGM | 1231 | .XMLTA | 0EC1 | DGN1 | 1066 | FPROD | 0169 |
| .DGNOV | 1106 | .XMSG | 11CF | DGN4 | 106E | FQUOT | 0168 |
| .DGNTR | 1101 | .XROL | 0DD7 | DGN5 | 107D | FREROM | 06D6 |
| .DKDN | 10AB | .XROMA | 0D80 | DGN6 | 108A | FRSI | 145F |
| .DOCRN | 12CA | .XROR | 0DF6 | DGN7 | 1097 | FTC0 | 1410 |
| .DOEXT | 15DF | .XSHL | 0DD6 | DGN8 | 1075 | FTC1 | 1415 |
| .DSO | 12A9 | .XSHR | 0DF5 | DGN9 | 1082 | GBT | 00A4 |
| .DXBA | 0FEF | .XSUBA | 0E81 | DGNA | 108F | GPC0 | 00AA |
| .FRSHA | 145D | ADL0 | 15CF | DGNB | 10A4 | GPT0 | 00A9 |
| .FTCHK | 1407 | ADL1 | 15CB | DGNC | 109C | IA11 | 137A |
| .FTM | 0B13 | ADT0 | 00B1 | DGNI | 1057 | IA12 | 1397 |
| .GETCT | 1475 | ADT1 | 00B2 | DIVDD | 0158 | IA13 | 1388 |
| .IILA | 0200 | AICNT | 00B7 | DIVSR | 0150 | IA18 | 13B6 |
| .KLM | 0AC1 | AIMSK | 00A2 | DKD1 | 1137 | IDP1 | 00B8 |
| .MLOC | 11A8 | AITMP | 00A0 | DKD2 | 1143 | IDPP | 00BA |
| .NEWP | 1696 | ALD1 | 191F | DKD3 | 114E | IILA | 11A4 |
| .PINIT | 15E8 | ANDX | 00AC | DKD5 | 10FE | IRAMB | 0010 |
| .R0E3 | 1467 | BDT | 008E | DKD50 | 10AD | IRAMT | 007F |
| .RCHK | 13C4 | BLT0 | 1444 | DKD51 | 10AF | IVBAS | 1FF6 |
| .RCL11 | 13D2 | BTAT0 | 0150 | DKD6 | 1120 | KLN | 00B4 |
| .RCL12 | 13D6 | BTAT1 | 0158 | DKD7 | 1125 | LCLR | 1217 |
| .RCL22 | 13DA | BTICK | 081C | DKD8 | 10BB | LI | 00BE |
| .RESHA | 144E | BXA2 | 0FCF | DKD9 | 10C9 | LLM1 | 00C7 |
| .RUNCX | 1737 | BXA3 | 0FDC | DKDO | 1154 | LKT0 | 00B0 |
| .SELCT | 16C0 | BXA4 | 0FBA | DKDR | 1159 | MAXFT | 0019 |
| .SETAI | 1487 | CCR0 | 147E | DKDS | 115C | MC0 | 0087 |
| .STG1 | 166A | CIOBAS | 0000 | DKDV | 10DA | MC1 | 0089 |
| .TFND | 0C35 | CNT1 | 0090 | DKDW | 10CE | MC2 | 0089 |
| .TICK | 1591 | CNT2 | 0094 | DKDX | 10E3 | MF0 | 008A |
| .TOSHA | 1453 | CTXT | 00AF | DKDY | 10F5 | MF1 | 008B |
| .TSTP | 158A | D1KL | 1259 | DKDZ | 10C0 | MF2 | 008C |
| .TSTT | 1581 | D4K0 | 1292 | DOC1 | 133C | MF3 | 008D |
| .TWADJ | 14A4 | D4K1 | 1295 | DOC2 | 1361 | MLCND | 0158 |
| .TWCR | 18E2 | D4K2 | 12A3 | DOC3 | 13BA | MLG | 00B5 |
| .TWKA | 177C | DBS2 | 1048 | DOC4 | 13BF | ML00 | 11A2 |
| .TWKP | 17A8 | DBS3 | 1056 | DOC5 | 139A | ML01 | 11B1 |
| .ULM | 083C | DBSUB | 103B | DOC8 | 13B0 | ML02 | 11C6 |
| .W15 | 159B | DCCT | 082C | DSO1 | 12B0 | MLPLR | 0150 |

A52

| | | | | | |
|---|---|---|---|---|---|
| RG0 | 0108 | TAF | 00BC | XADA2 | 0E51 |
| RG1 | 0110 | TC128 | 000F | XADA3 | 0E53 |
| RG2 | 0118 | TC32 | 000D | XADA4 | 0E66 |
| RG3 | 0120 | TC64 | 000E | XADA5 | 0E7C |
| RG4 | 0128 | TCCK | 0824 | XASX | 0E73 |
| RG5 | 0130 | TCR2 | 18F5 | XC01 | 0DA0 |
| RG6 | 0138 | TCTL | 00B8 | XCA2 | 0E29 |
| RG7 | 0140 | TDAT | 00B9 | XCL2 | 0DB0 |
| RG8 | 0148 | TIMCTL | 0009 | XCMA1 | 0E1C |
| RNX0 | 13FA | TIMDAT | 0008 | XCYA1 | 0D6D |
| RNX1 | 13F2 | TIMIV | 1FFB | XDA1 | 0F34 |
| RNX2 | 13FC | TIMWV | 1FF6 | XDA11 | 0F1A |
| ROMBAS | 0800 | TK10 | 0038 | XDA2 | 0F44 |
| RPT1 | 175A | TOSI | 1455 | XDA5 | 0F55 |
| RPT2 | 18E5 | TRUE | FFFF | XDA51 | 0F5E |
| RRC0 | 173F | TWA0 | 178A | XDA52 | 0F77 |
| RUNX | 13EB | TWR1 | 1852 | XDA54 | 0F6C |
| SAI0 | 1493 | TWR10 | 1971 | XDA6 | 0F9D |
| SCTP | 16C9 | TWR11 | 1876 | XDA7 | 0F94 |
| SELOF | 1732 | TWR12 | 187E | XDA8 | 0F80 |
| SOD | 165D | TWR13 | 18B8 | XDAX | 0FA4 |
| SOL | 0D3D | TWRX | 18CD | XDC0 | 1219 |
| SOU | 0D15 | UCLR | 1213 | XDC1 | 122A |
| ST10 | 1684 | UDL | 0000 | XIN1 | 0DBD |
| ST11 | 1673 | USDROM | 1120 | XIN3 | 0DCA |
| ST12 | 1690 | UU0 | 1803 | XMA1 | 0ED9 |
| STP0 | 16D5 | UU1 | 180E | XMA3 | 0EDB |
| SWIIV | 1FFC | UU2 | 1813 | XMA33 | 0EF3 |
| TAD0 | 14EB | UU3 | 1820 | XMS0 | 11D9 |
| TAD1 | 1510 | UU4 | 1822 | XRL2 | 0DE2 |
| TAD2 | 14BE | UU5 | 1836 | XRMA1 | 0D88 |
| TAD3 | 14CA | VV0 | 12E4 | XRR2 | 0E01 |
| TAD4 | 1520 | VV1 | 12FD | XSBA1 | 0EBB |
| TAD6 | 14F4 | W151 | 15B2 | XSBA4 | 0EB2 |
| TAD7 | 151C | WDGK | 00AE | Z0 | 17D4 |
| TADC | 1577 | WNB0 | 1203 | Z1 | 17D9 |
| TADS | 1555 | WNFK | 105D | Z2 | 17E2 |
| TADX | 1580 | XADA1 | 0E3D | | |